United States Patent [19]

Komatsu et al.

[11] Patent Number: 5,479,220
[45] Date of Patent: Dec. 26, 1995

[54] EYEGLASS LENS

[75] Inventors: Akira Komatsu; Toshiharu Katada; Osamu Yokoyama, all of Suwa, Japan

[73] Assignee: Seiko Epson Corporation, Tokyo, Japan

[21] Appl. No.: 70,302

[22] PCT Filed: Oct. 8, 1992

[86] PCT No.: PCT/JP92/01310

§ 371 Date: Jun. 3, 1993

§ 102(e) Date: Jun. 3, 1993

[87] PCT Pub. No.: WO93/07525

PCT Pub. Date: Apr. 15, 1993

[30] Foreign Application Priority Data

Oct. 9, 1991 [JP] Japan .................................. 3-262017
Apr. 24, 1992 [JP] Japan .................................. 4-106886
Apr. 27, 1992 [JP] Japan .................................. 4-108030

[51] Int. Cl.⁶ .................................................. G02C 7/02
[52] U.S. Cl. ........................................ 351/159; 351/176
[58] Field of Search .................................. 351/159, 176, 351/169

[56] References Cited

FOREIGN PATENT DOCUMENTS 3225270 10/1983 Germany.
54-131950 10/1979 Japan.
59-41164 4/1984 Japan.
64-40926 2/1989 Japan.
01050012 6/1989 Japan.
145892 10/1989 Japan.
238930 9/1990 Japan.

OTHER PUBLICATIONS

Patent Abstracts of Japan vol. 13, No. 250 (P–882) 12 Jun. 1989.
Katz, M., "Aspherical surfaces used to minimize . . . " Applied Optics, vol. 21, No. 16, Aug. 1982, N.Y. pp. 2982–2990.

Primary Examiner—Scott J. Sugarman
Attorney, Agent, or Firm—Ladas & Parry

[57] ABSTRACT

An eyeglass lens of the present invention has a surface which is a refracting surface arranged such that two coordinate axes X and Y are set to contact with the refracting surface at a determined point thereon while directions of the coordinate axes and an XY plane including the two axes are determined, that a perpendicular line is dropped toward the XY plane from an arbitrary point on the refracting surface, and then X, Y coordinates of an intersecting point between the perpendicular line and the XY plane are denoted by x and y, respectively, and the length of the perpendicular line by z, and that a value of z is expressed as follows:

$$z = \frac{C_x x^2 + C_y y^2}{1 + \sqrt{1 - (1+K_x)C_x^2 x^2 - (1+K_y)C_y^2 y^2}} + \sum_n r^n \left\{ \sum_m \sum_j A_{n,m,j} \left(\frac{x^2}{r^2}\right)^m \left(\frac{y^2}{r^2}\right)^j \right\} \quad (1)$$

where $r^2 = x^2 + y^2$;

$C_x$, $C_y$, $K_x$, $K_y$, $A_{n,m,j}$ are constants to define the shape of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left|\sum_m A_{n,m,0}\right| \leq 10^{-n}, \quad (3)$$

$$\left|\sum_j A_{n,0,j}\right| \leq -10^{-n}, \quad (4)$$

which cannot be simultaneously zero.

11 Claims, 45 Drawing Sheets

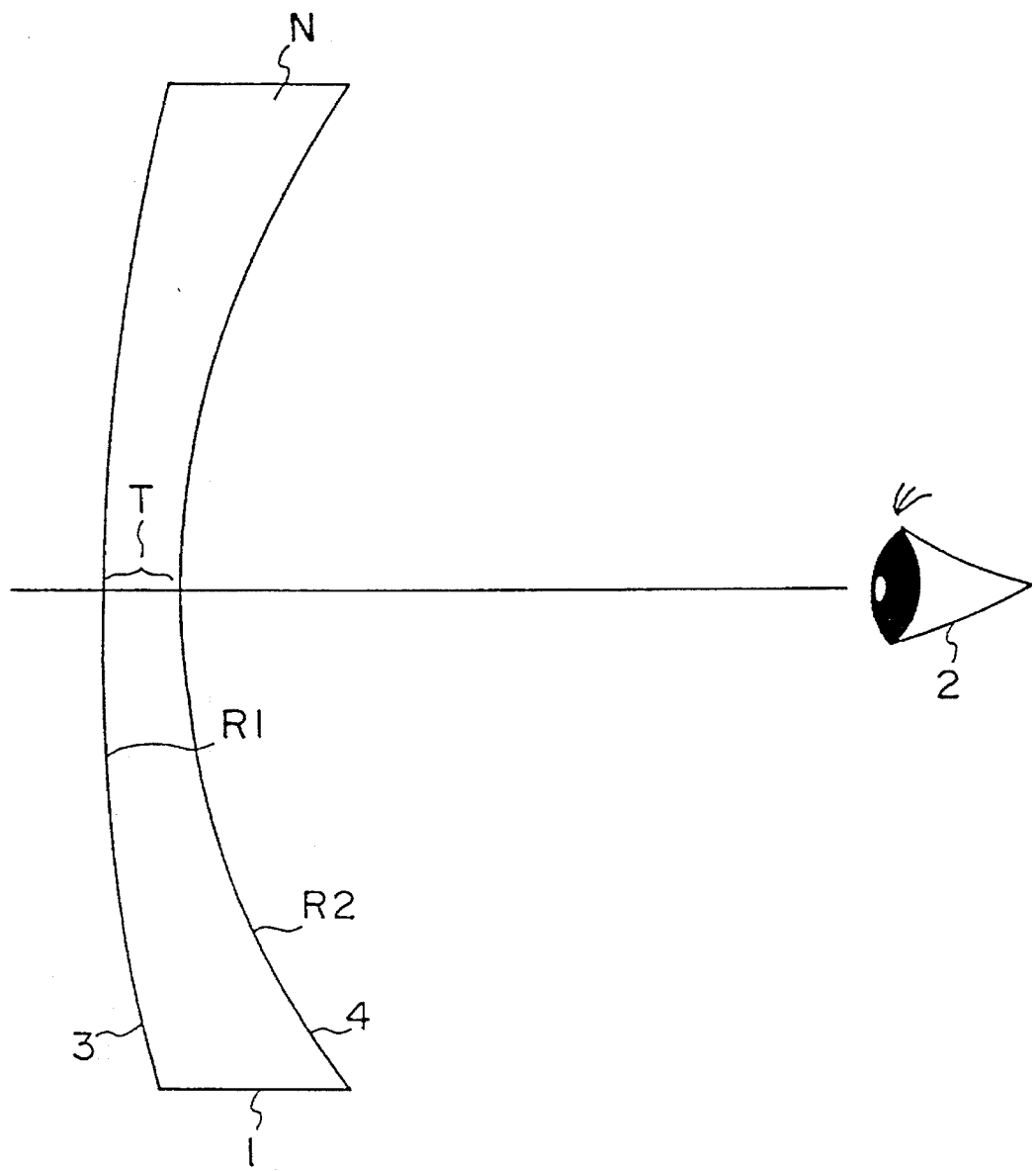
F I G. 1

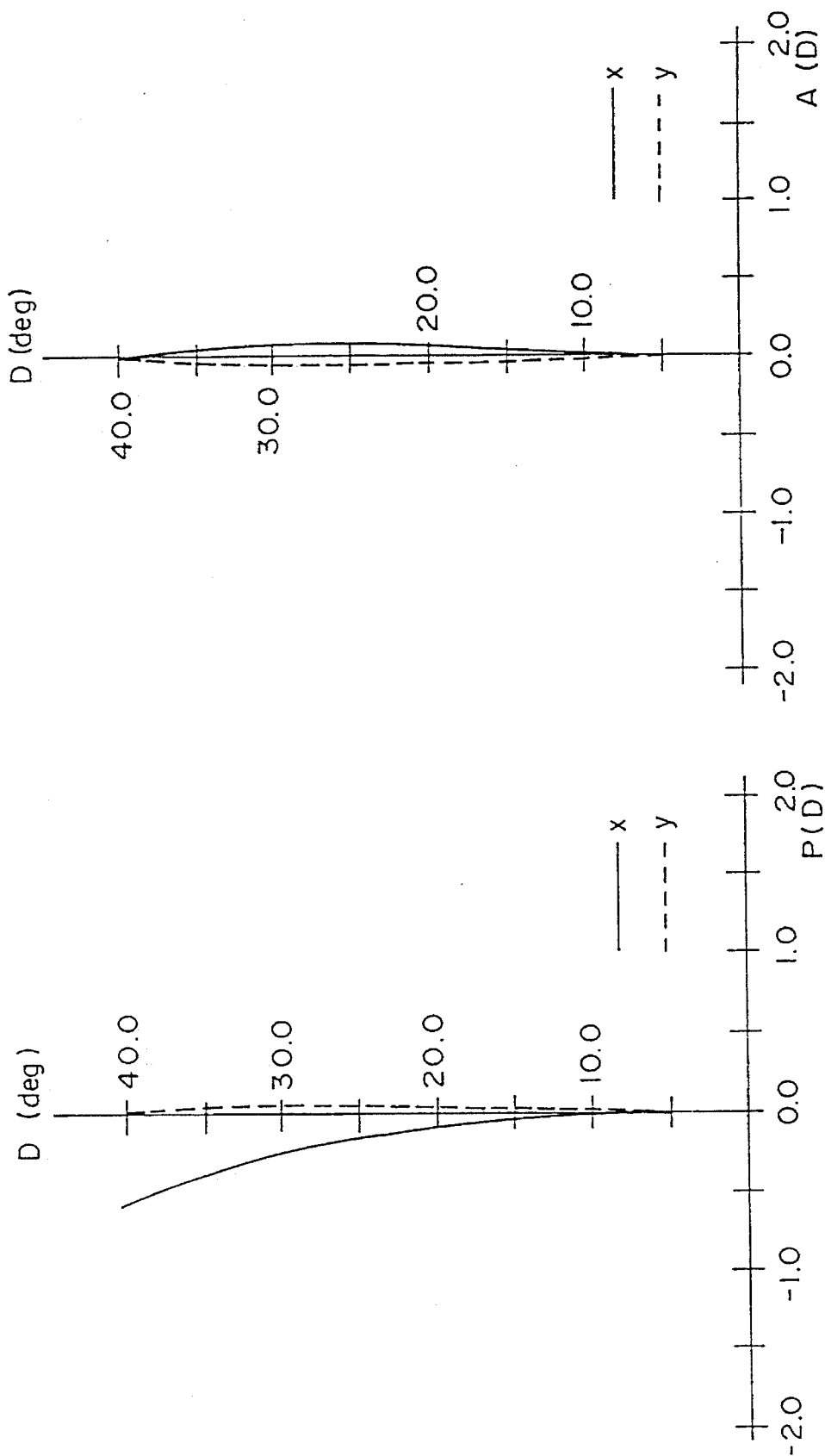

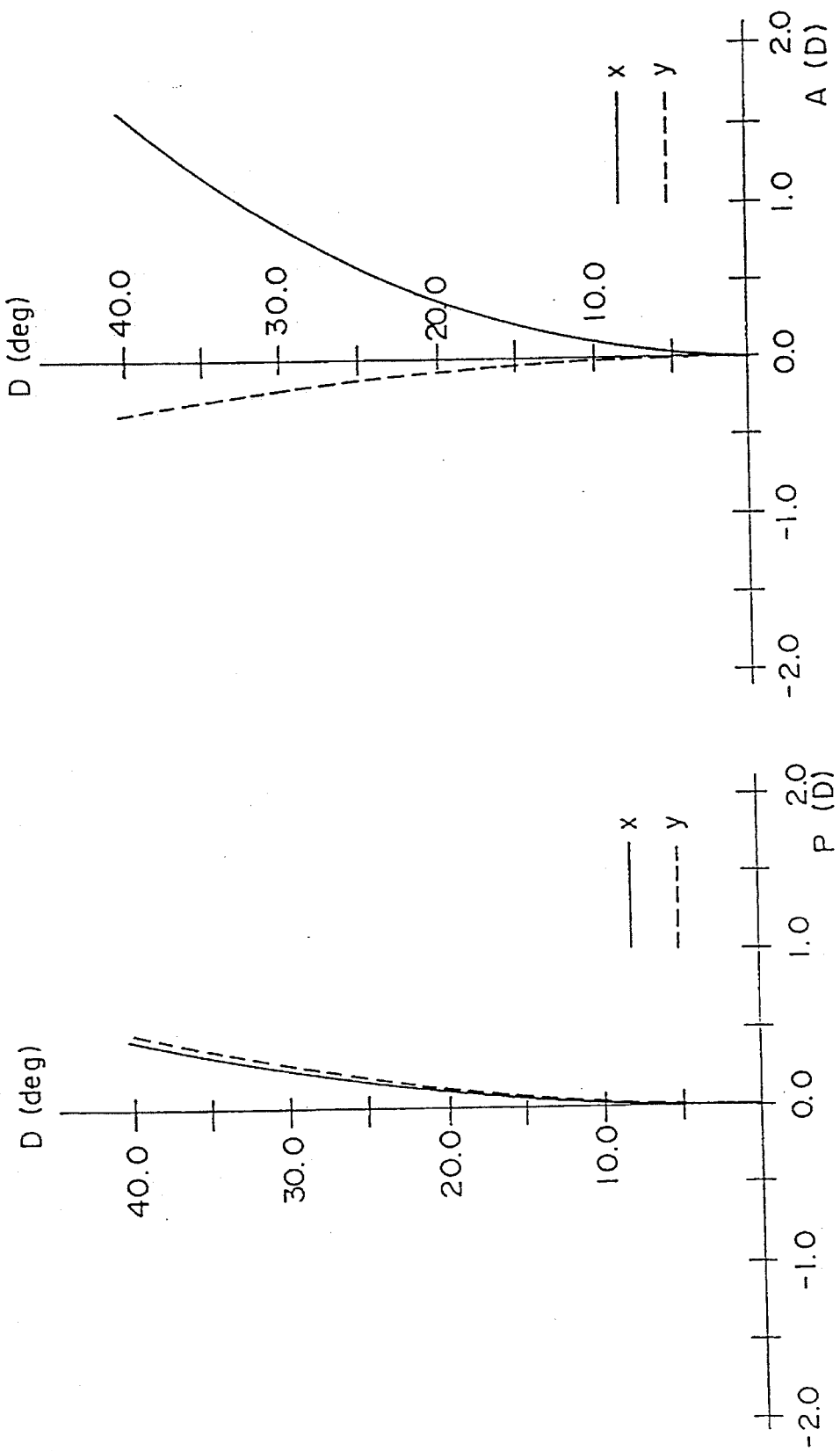
FIG. IOB PRIOR ART
FIG. IOA PRIOR ART

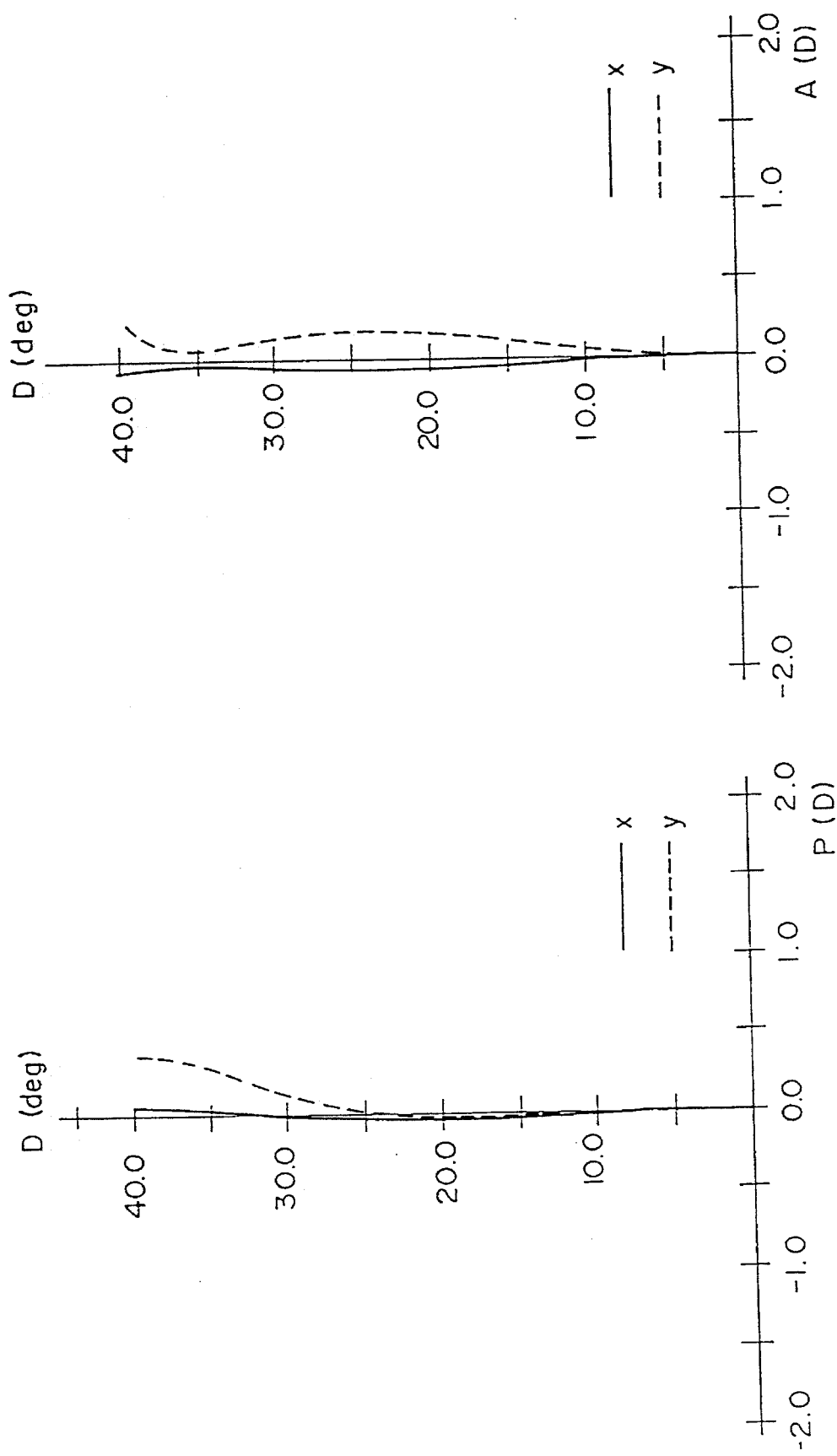

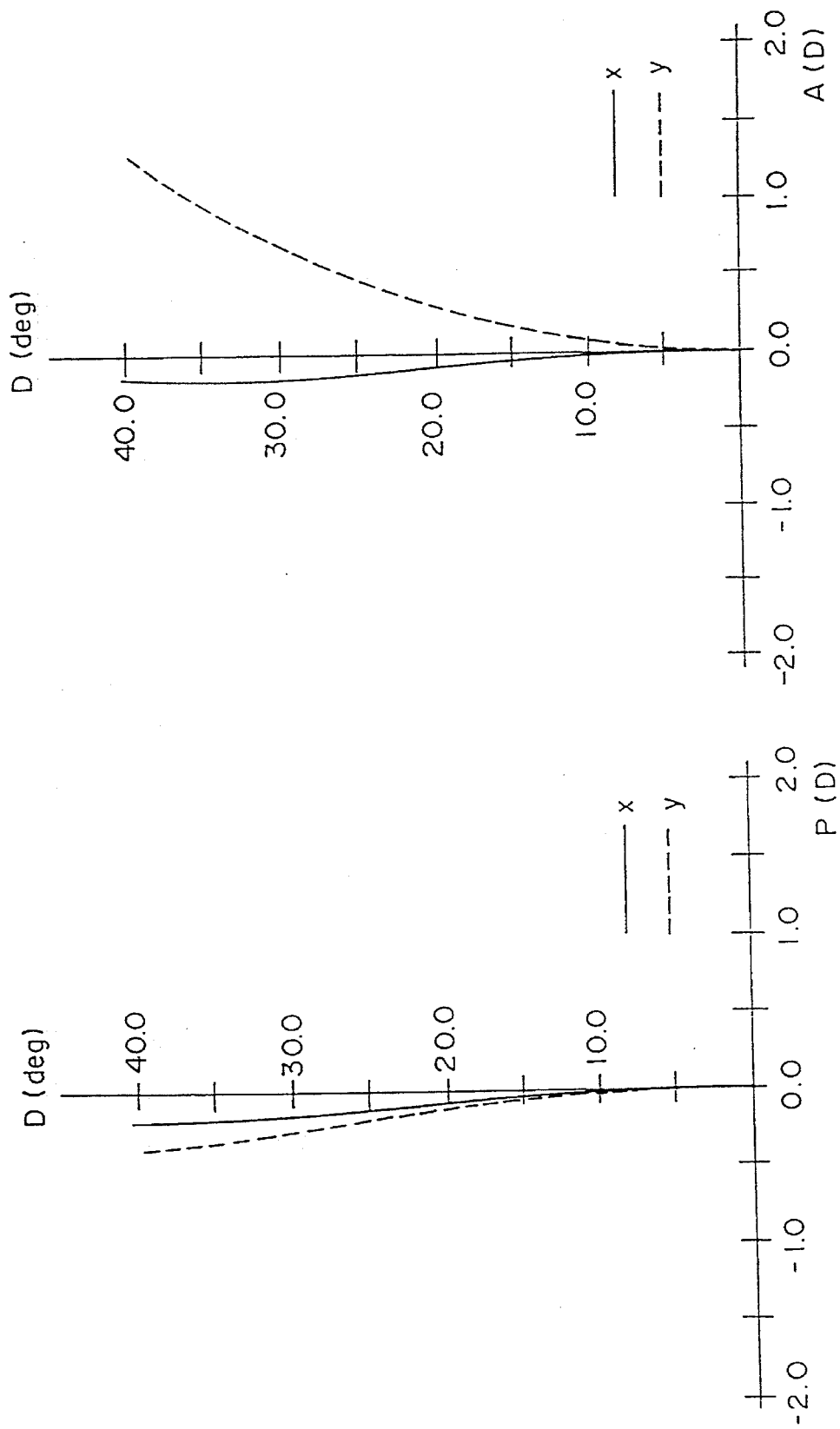

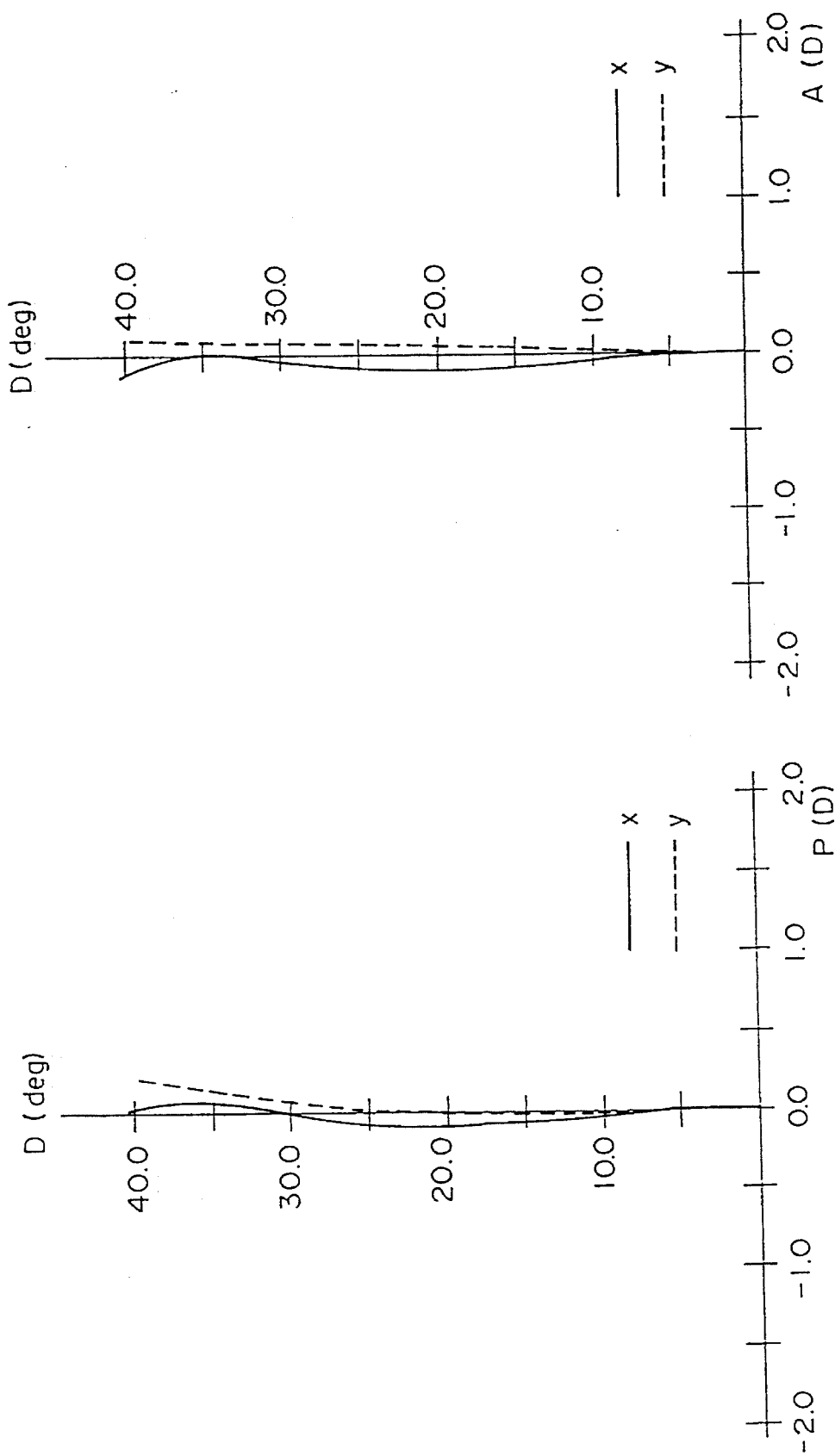

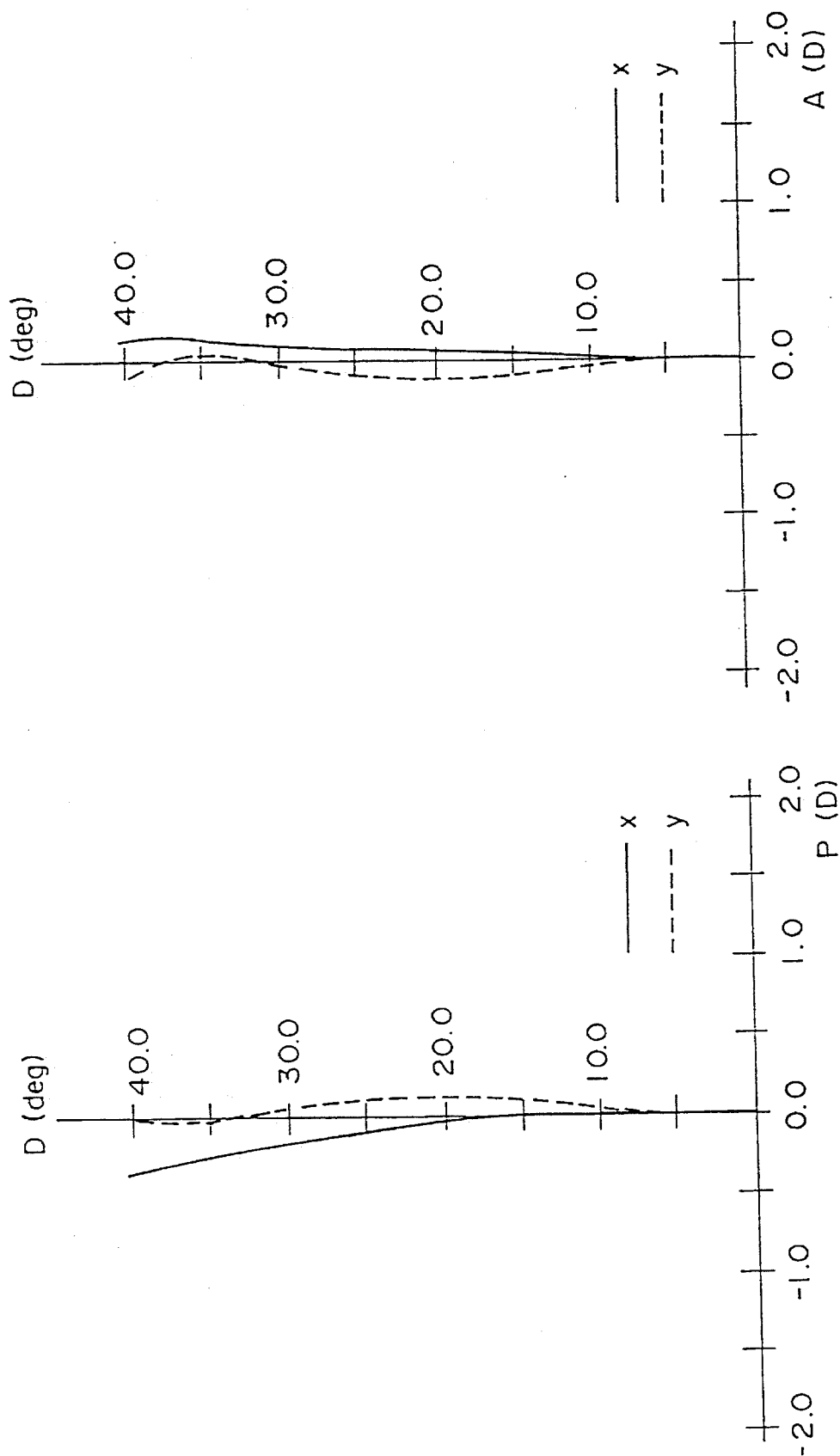

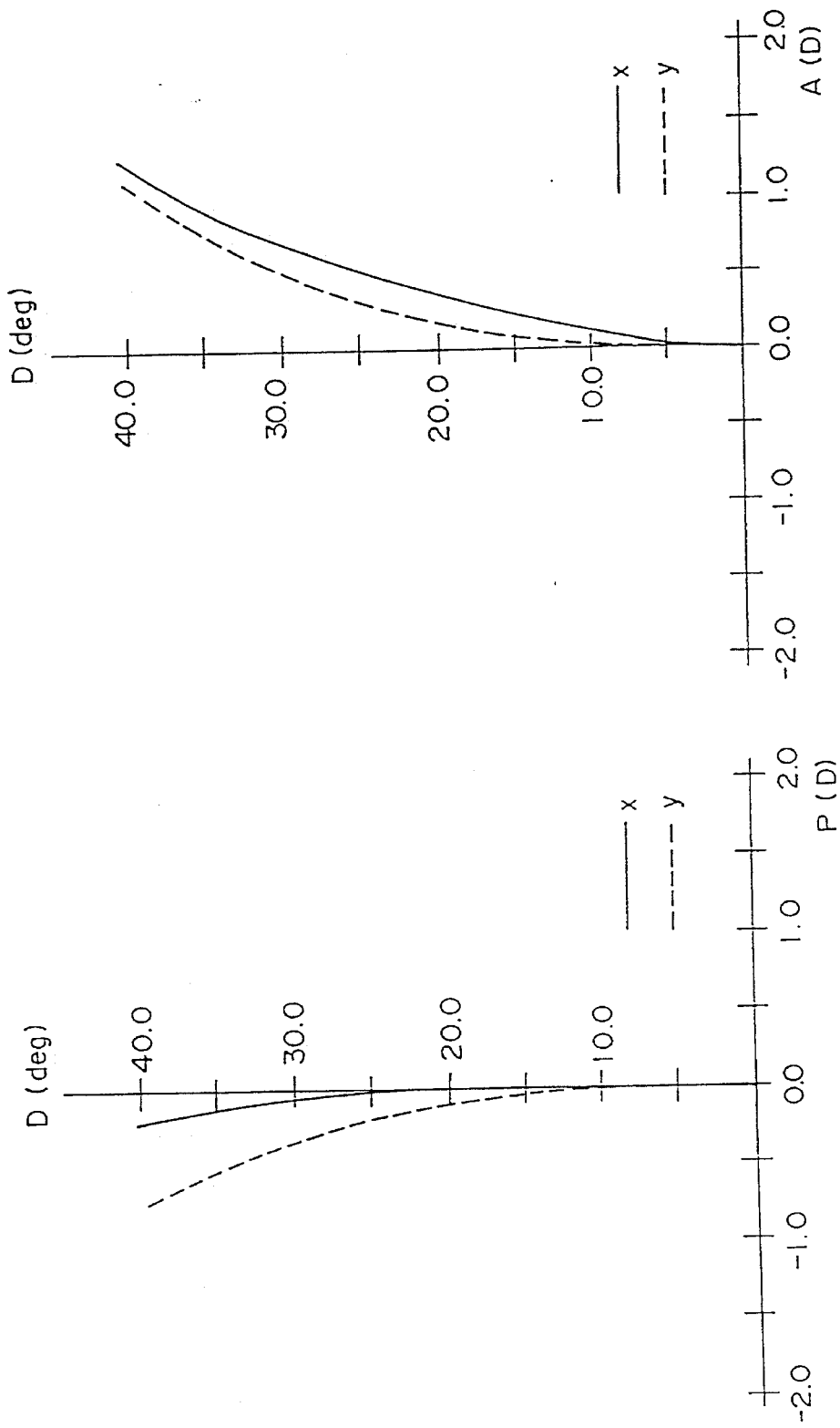

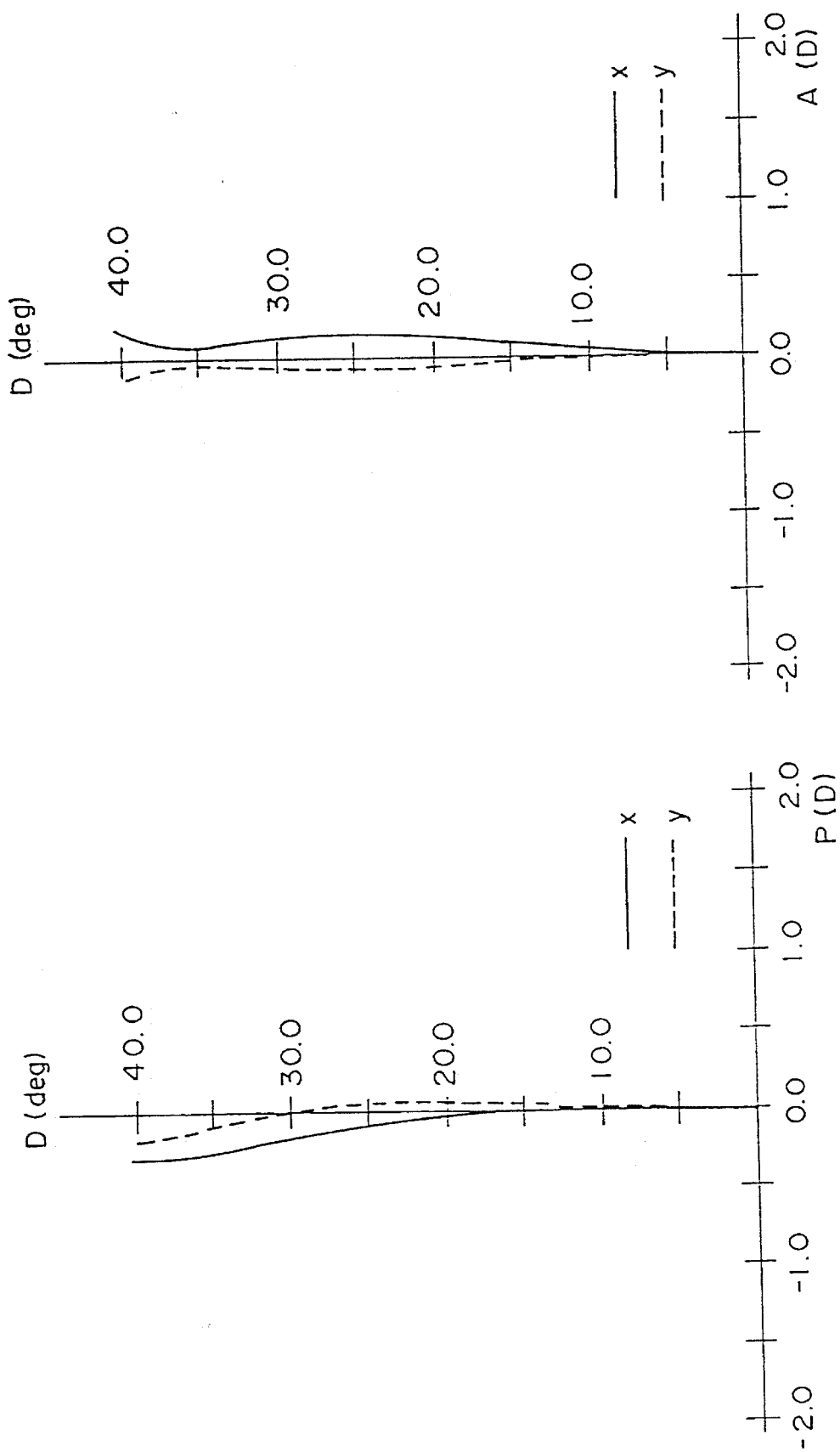

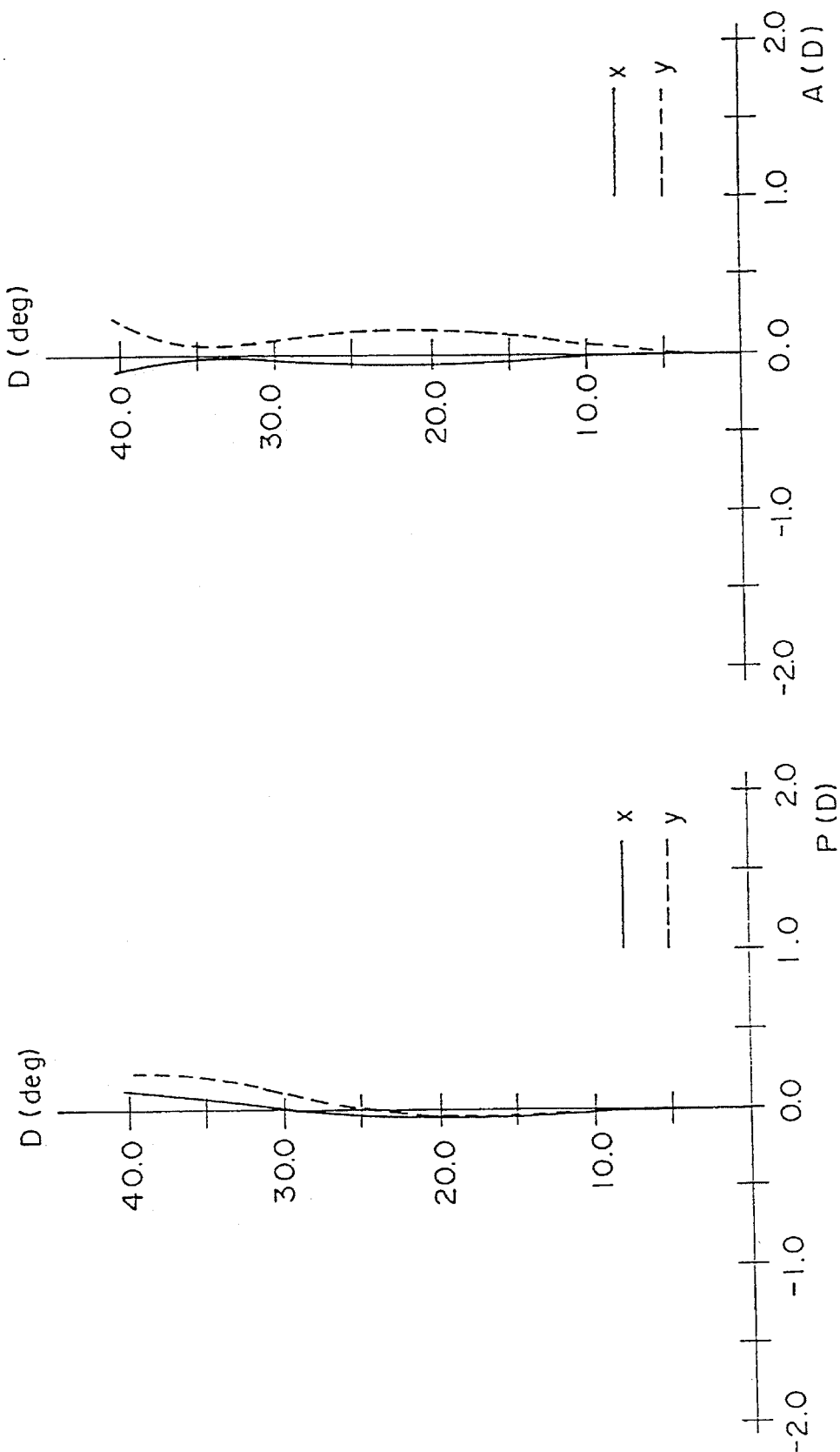

EYEGLASS LENS

BACKGROUND OF THE INVENTION

The present invention relates to an eyeglass lens, and more particularly to an eye glass lens for eyesight correction which is reduced in lens thickness thereby to decrease its weight and which is improved in optical properties by removing the aberration.

BACKGROUND ART

It is necessary for correcting astigmatic vision by an eyeglass lens that at least one surface of lens is formed as a refracting surface with curvatures different depending upon the direction, which will be called as an astigmatic surface. Conventionally, a cylindrical surface or a toric surface has been employed as the astigmatic surface. The toric surface is defined as follows (referring to FIG. 2).

Consider a curve expressed by $z=f(y)$ on the YZ plane in FIG. 2. This curve may be a circle, a quadric curve, or any of other curves. A rotation axis M parallel to the Y axis is then taken to pass through a point $R_x$ on the Z axis, and the curve $z=f(y)$ is revolved around the above rotation axis M to obtain a curved surface, which is referred to as the toric surface.

When the surface is cut by the YZ plane a curve appearing in the section is called as a Y principal meridian, whereas when the surface is cut by the XZ plane a curve appearing in the section is called as an X principal meridian. As apparent from the definition, the y principal meridian of toric surface is the curve expressed by $z=f(y)$, and the X principal meridian is a circle with radius $R_x$.

In this example the rotation axis is described as parallel to the Y axis, but in another case the rotation axis may be defined as being parallel to the X axis in the same manner.

The restriction from processing has heretofore limited the shape of toric surface actually employed only to those with $f(y)$ being a circle. There are two types of shapes in this case depending upon a relative magnitude between $R_x$ and $R_y$ and upon the direction of rotation axis. In case that $R_x<R_y$, the surface is of a barrel type (as shown in FIG. 3A) if the rotation axis M is parallel to the Y axis, while it is of a tire type (as shown in FIG. 3B) if the rotation axis M is parallel to the X axis. In case that $R_x>R_y$, the situation is reverse. Although there are the two types of shapes depending upon whether the rotation axis is made parallel to the X axis or to the Y axis with a single combination of RX and $R_y$, no other degree of freedom exists. Accordingly, provision of $R_x$ and $R_y$ completely determines the two types of surface shapes.

Also, a conventional eyeglass lens employs a combination of a spherical surface with a toric surface, which is unsatisfactory in respect of aberration correction. Thus, the combination had problems such as the uncorrectable residual aberration and a weight increase of lens. Then, there are various shapes of refracting surface proposed, trying to achieve a satisfactory aberration correction.

For example, Japanese Patent Laying-open Application No. 64-40926 discloses a low aberration eyeglass lens, which has a refracting surface expressed by the following equation with r a distance from the origin:

$$Z = \frac{Cr^2}{1+\sqrt{1-(1+K)C^2r^2}} + \sum_n A_n r^n \quad (a)$$

where n is an even number satisfying $4 \leq n \leq 10$.

If $A_n=0$ in Equation (a), the equation has only the first term, which represents a quadratic surface. C is determined with a radius of curvature at $r=0$, and the shape is determined by a value of K.

The first term in Equation (a) represents the following surfaces depending upon the value of K:

ellipsoid if $0<K$;

sphere if $K=0$;

ellipsoid if $-1<K<0$;

paraboloid if $K=-1$;

hyperboloid if $K<-1$.

FIG. 4 shows how the radius of curvature changes depending upon the value of K if Equation (a) has only the first term. As seen from FIG. 4, the radius of curvature continuously increases with $K<0$, while it continuously decreases with $K>0$.

Although it monotonously increases or decreases in case of $A_n=0$, various changes may be effected by using higher order terms.

FIG. 5 shows a change in radius of curvature with change of $A_8$ value in case of $K=-1$. As seen, the change in radius of curvature may be adjusted by values of K and $A_n$.

Japanese Patent Publication No. 1-45892 and No. 59-41164 employ odd power terms in polynomial of r. A refracting surface having such odd power terms has aberration characteristics different from those of a refracting surface expressed only by even power terms, which may be effective in aberration correction in a certain case. If n is allowed to include odd numbers, Equation (a) may express such a surface shape.

Expanding the first term in Equation (a), $$Z = \tfrac{1}{2}Cx^2 + \tfrac{1}{8}(1+K)C^3 \times x^4 + \text{(sixth and higher order terms)} \quad (b)$$

A difference dz is obtained as follows between the first term and a sphere with the same radius of curvature at origin:

$$dz = (K/8R^3)x^4 + \text{(sixth and higher order terms)} \quad (c)$$

Accordingly, the same effect is given within the range of fourth order of x in case of use of K and in case of $A_4=K/8R^3$ without use of K of the first term.

If one of the conventional toric surfaces and spherical surfaces had been employed as a refracting surface of single-focal eyeglass lens, it had been difficult to achieve a satisfactory aberration correction with little degree of freedom usable for aberration correction. Particularly, in case that the radius of curvature of the first surface is increased to obtain a thinner lens with good feeling of use, the aberration correction tends to be degraded. If one wants a certain spherical power and a certain astigmatic power and once one determines the radius of curvature of the first surface, the X-directional radius of curvature $R_x$ and the Y-directional radius of curvature $R_y$ at origin of the second surface will be uniquely determined, not allowing free selection thereof. This is also the case when the first surface is a toric surface. In a conventional toric surface, if the rotation axis is taken in the Y direction, the X principal meridian is always a circle. Thus, once $R_x$ is determined, the contour of X principal meridian is also set. Although the contour of Y principal meridian may be changeable so as not to be a circle in order to improve the aberration at periphery of lens, the X principal meridian lacks this degree of freedom, thus resulting in failure of effective aberration correction.

Conventional solutions to this problem were for example to employ a toric surface on either side of lens (as disclosed in Japanese Patent Laying-open Application No. 54-131950) and to decrease the radius of curvature, giving up making the lens thinner.

If the both surfaces of lens are formed as the toric surface, a pair of dies for toric surfaces must be prepared for each combination of spherical power and astigmatic power to be obtained, requiring the enormous number of dies so as to increase the production cost. In case that the radius of curvature is decreased, the thickness of lens increases so as to increase its weight, which is not preferable. As described, it has been difficult to achieve both the improvement of optical characteristics and the reduction of thickness in the single-focal lens.

As for a progressive power lens, it must be made according to a prescription, for example the additional power (difference between far range power and near range power), the far range power, the astigmatic power, and the direction of astigmatism axis to match each user, and therefore there exist the large number of combinations. It is thus impossible in fact that lenses are preliminarily made for all possible prescriptions and are in store. Therefore, a lens is produced according to a prescription of user after each receipt of order in actual application. For this, a lens is preformed in thickness with processing margin in addition to the shape of final product and with a progressive power surface formed by a die, which will be called as a blank. Then, the other surface than the progressive power surface is processed to be a spherical surface or a toric surface in accordance with the ordered prescription so as to obtain a final product.

The shape of progressive power surface is characterized by the far range power and the additional power, and a shape is selected based on the prescription of user. Once a progressive power surface is selected, the other surface is processed with a spherical power, an astigmatic power, and a direction of astigmatic axis thereof selected in correspondence with the selected surface. If a die for progressive surface could be used for as many prescriptions as possible, the number of dies for progressive power surface could be minimized as possible, which is preferable in production.

However, the shape of the processed surface was conventionally a spherical surface or a toric surface, which had imperfection in aberration correction in application of a progressive power surface for a wide range of power and which thus had a problem of uncorrected residual aberration. This caused an astigmatism on a side of the portion for near range or the portion for far range, which in turn caused an unfocused image. As far as the spherical surface or the toric surface was used as the shape of the processed surface, there was no solution to the problem and a sufficient aberration correction was not conventionally made.

The problems are risen from the use of refracting surface shape with little degree of freedom for designing in case of single-focal lens as well as in case of progressive power lens. In a spherical surface or a toric surface the radius of curvature cannot be changed depending upon a location on a surface. Also, an axially symmetric spherical surface cannot represent an astigmatic surface with curvatures differing depending upon the direction. Regarding the aberration correction and the reduction of thickness, the consideration only of such surfaces would result in limitation of performance.

It is necessary for solving the problem to have a surface which may have the radius of curvature at origin changeable depending upon the direction and continuously changeable depending upon a location on a curved surface. Prior art of such a surface is disclosed for example in Japanese Patent Publication No. 47-23943 or Japanese Patent Laying-open Application No. 57-10112.

The technology as disclosed in Japanese Patent Publication No. 47-23943 shows no procedure for calculating a correction amount of shape, which therefore cannot allow one to determine the shape of lens in fact. In this patent the shape of lens surface is calculated as coordinates of discrete points, and coordinates of intermediate points are given by the interpolation method. Such a designing method fails to provide necessary smoothness in application as the refracting surface of lens, thus lowering the accuracy. The most important point is as described in the specification of the patent that there are quite a few chances to fail to have a smooth surface as a whole when the correction amount is calculated for the discrete points.

A similar problem is seen in Japanese Patent Laying-open Application No. 57-10112. The conditions of aberration as described in this patent are just a desire of designer, and it is not clear whether a surface satisfying the conditions actually exists. Even if a curvature should be able to be obtained at each point on a curved surface by the aberration conditions, it is not always possible that a curved surface is constituted by the thus obtained curvatures. The above patent fails to show a specific method for constructing a curved surface, and it is thus difficult in fact to carry out it.

SUMMARY OF THE INVENTION

It is, therefore, an object of the present invention to provide an eyeglass lens which can solve the various problems as described above in the conventional technology, which is reduced in lens thickness at peripheral region so as to reduce its weight, and which is improved in optical characteristics by removing the aberration.

To achieve the above object, the present invention is an eyeglass lens at least one surface of which is a refracting surface arranged such that two coordinate axes X and Y are set to contact with the refracting surface at a determined point thereon while directions of the coordinate axes and an XY plane including the two axes are determined, that a perpendicular line is dropped toward the XY plane from an arbitrary point on the refracting surface, and then X, Y coordinates of an intersecting point between the perpendicular line and the XY plane are denoted by x and y, respectively, and the length of the perpendicular line by z, and that a value of z is expressed as follows:

$$z = \frac{C_x x^2 + C_y y^2}{1 + \sqrt{1 - (1+K_x)C_x^2 x^2 - (1+K_y)C_y^2 y^2}} + \sum_n r^n \left\{ \sum_m \sum_j A_{n,m,j} \left( \frac{x^2}{r^2} \right)^m \left( \frac{y^2}{r^2} \right)^j \right\} \quad (1)$$

where $r^2 = x^2 + y^2$;

$C_x$, $C_y$, $K_x$, $K_y$, $A_{n,m,j}$ are constants to define the shape of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left| \sum_m A_{n,m,o} \right| \leq 10^{-n}, \quad (3)$$

-continued $$\left| \sum_j A_{n,o,j} \right| \leq -10^{-n}, \quad (4)$$

which cannot be simultaneously zero.

Also, another invention in this application is an eyeglass lens at least one surface of which is a refracting surface arranged such that two coordinate axes X and Y are set to contact with the refracting surface at a determined point thereon while directions of the coordinate axes and an XY plane including the two axes are determined, that a perpendicular line is dropped toward the XY plane from an arbitrary point on the refracting surface, and then X, Y coordinates of an intersecting point between the perpendicular line and the XY plane are denoted by x and y, respectively, and the length of the perpendicular line by z, and that a value of z is expressed as follows:

$$z = \frac{C_x x^2 + C_y y^2}{1 + \sqrt{1 - (1+K_x)C_x^2 x^2 - (1+K_y)C_y^2 y^2}} + \sum_m \sum_j B_{m,j} x^{2m} y^{2j} \quad (5)$$

where $C_x$, $C_y$, $K_x$, $K_y$, $B_{m,j}$ are constants to define the shape of lens;

m, j are integers satisfying conditions of $0 \leq m$, $0 < j$, and $1 \leq m+j$;

coefficients satisfy the following conditions:

$$|B_{m,j}| \leq 10^{-2(m+j)} \quad (6)$$

which cannot be simultaneously zero.

Further, still another invention in the present application is an eyeglass lens at least one surface of which is a refracting surface arranged such that two coordinate axes X and Y are set to contact with the refracting surface at a determined point thereon while directions of the coordinate axes and an XY plane including the two axes are determined, that a perpendicular line is dropped toward the XY plane from an arbitrary point on the refracting surface, and then X, Y coordinates of an intersecting point between the perpendicular line and the XY plane are denoted by x and y, respectively, and the length of the perpendicular line by z, and that a value of z is expressed as follows:

$$z = \frac{C_x x^2 + C_y y^2}{1 + \sqrt{1 - (1+K_x)C_x^2 x^2 - (1+K_y)C_y^2 y^2}} + \sum_n (D_n x^2 + E_n y^2) r^{n-2} \quad (7)$$

where $r^2 = x^2 + y^2$;

$C_x$, $C_y$, $K_x$, $K_y$, $D_n$, $E_n$ are constants to define the shape of lens;

n is an integer satisfying a condition of $2 \leq n$ coefficients satisfy the following conditions:

$$|D_n| \leq 10^{-n} \quad (8),$$

$$|E_n| \leq 10^{-n} \quad (9)$$

which cannot be simultaneously zero.

According to the present invention, the surface shape is expressed by Equation (1), (5), or (7), whereby the refracting surface may be completely expressed by some parameters. Coordinate values, a slope, and a curvature may be calculated with necessary accuracy at an arbitrary point on a curved surface, and the surface is fully smooth. A designing subject is to determine parameters of curved surface such that the final aberration and lens thickness meet the designing conditions. For this purpose, the technique of nonlinear optimization, which is one of the OR techniques, is employed. In the technique, a target aberration is set, a difference between the target and a present aberration is used as an evaluation function of lens, and parameters of lens are adjusted to obtain a minimum value of the function. The use of optimization technique permits one to automatically obtain a lens closest to the target even if there exists no lens to completely satisfy the target of aberration. Such designing technique first becomes possible by expressing the shape of lens surface with equation.

In the present invention the refracting surface expressed by above Equation (1), (5) or (7) will be called as an extended toric surface.

Features of the extended toric surface expressed by Equation (1) will be described in respective sections of the first term and the polynomial of the second term.

(1) The first term

Equations (1), (5), and (7) have the first term in common, which is a representation equation invented by Inventor to extend the first term in Equation (a) of axially symmetric aspherical surface to the astigmatic surface and which has the following features.

① Letting a Z coordinate value on the X principal meridian be $z_x$ and using the fact that y=0 on the X principal meridian, $$z_x = \frac{C_x x^2}{1 + \sqrt{1 - (1+K_x)C_x^2 x^2}}. \quad (d)$$

Similarly, letting a Z coordinate value on the Y principal meridian be $z_y$ and using the fact that x=0, $$z_y = \frac{C_y y^2}{1 + \sqrt{1 - (1+K_y)C_y^2 y^2}}. \quad (e)$$

Namely, the value of $z_x$ is determined by $C_x$ and $K_x$, and the value of $z_y$ by $C_y$ and $K_y$. Therefore, the contours of X principal meridian and Y principal meridian may be determined independent of each other by the respective coefficients.

② As described in the description of axially symmetric aspherical surface, Equation (d) and Equation (e) respectively represent a quadratic curve, which may be a circle, an ellipse, or a hyperbola depending upon values of $K_x$ and $K_y$. A change of $K_x$ or $K_y$ value may change the X-directional radius of curvature on the X principal meridian or the Y-directional radius of curvature on the Y principal meridian.

③ If $K_x=0$ or $K_y=0$ the shape of X or Y principal meridians is circular, which is close to the conventional toric surface. According to results of numerical calculation, if the conventional toric surface has the Z coordinate value of barrel type $z_b$ and the value of tire type $z_t$, either $z_b \leq z \leq z_t$ or $z_t \leq z \leq z_b$ always stands, which ensures that the extended toric surface is a good approximation to the conventional toric surface. There are various representation equations having the above properties 1 and 2, other than the first term in Equation (1). The property 3 is a reason to select the representation equation of this application.

(2) The second term (polynomial)

The second term is a representation equation invented to extend the second term in Equation (a) of axially symmetric aspherical surface to the astigmatic surface. The second term will be described along the conception which Inventor had. (Reference is made to FIG. 6.)

1 The Z coordinate value $z_x$ on the X principal meridian and the value $z_y$ on the Y principal meridian may be defined as polynomials of x and y, for example $z_x = \Sigma a_n x^n$ $z_y = \Sigma b_n y^n$, respectively. A point is how to reasonably constitute a smooth shape at locations other than the principal meridians.

2 Then, consider a straight line L making an angle $\Theta$ to the X axis and passing through the origin, and a point P on L. When a distance between the point P and the origin is r and the Z coordinate of surface above the point P is $z_p$, it would be proper to consider that $z_p$ may be expressed as a polynomial of r, e.g. $z_p = \Sigma c_n r^n$, in the same manner as in 1. If $c_n$ is a coefficient changing depending upon $\Theta$ with $c_n = a_n$ at $\Theta = 0$ and with $c_n = b_n$ at $\Theta = \pi/2$, it may be connected to the X principal meridian and the Y principal meridian. In order that the considered curved surface is plane-symmetric with respect to the XZ plane and the YZ plane, $c_n$ must be a function of $\cos^2\Theta$ and $\sin^2\Theta$. Thus, $c_n$ may be expressed by the following polynomial of $\cos^2\Theta$ and $\sin^2\Theta$:

$$C_n = \sum_m \sum_j A_{n,m,j} (\cos^2\Theta)^m (\sin^2\Theta)^j. \tag{f}$$

Expressing $\cos\Theta$ and $\sin\Theta$ by x, y, and r, then $\cos\Theta = x/r$ and $\sin\Theta = y/r$. Then, Equation (f) turns into the following equation:

$$C_n = \sum_m \sum_j A_{n,m,j} \left(\frac{x^2}{r^2}\right)^m \left(\frac{y^2}{r^2}\right)^j \tag{g}$$

From the above consideration, the second term in Equation (1) may be obtained. As apparent from the steps of consideration, the contours of X principal meridian and Y principal meridian may be determined independent of each other, and other locations are connected to the respective principal meridians in a smooth manner.

If n is limited to even numbers as a special case of the second term in Equation (1), the second term is as follows:

$$\begin{aligned}(2\text{nd term}) &= \sum_n (x^2+y^2)^{n/2} \sum_m \sum_j A_{n,m,j} \frac{x^{2m} y^{2j}}{(x^2+y^2)^{m+j}} \\ &= \sum_n \sum_m \sum_j A_{n,m,j} x^{2m} y^{2j} (x^2+y^2)^{n/2-m-j}.\end{aligned} \tag{h}$$

Selecting n, m, j as $0 \leq n/2 - m - j$, Equation (h) becomes a polynomial of $x^2$ and $y^2$. Then, expanding Equation (h) and arranging it with respect to the coefficients, the second term in Equation (5) is obtained.

Considering only terms of m=1, j=0 and m=0, j=1, with all other coefficients being zero, Equation (g) becomes coincident with coefficients of the second term in Equation (7) with $D_n = A_{n,1,0}$ and $E_n = A_{n,0,1}$. In this case, different from the representation of polynomials of x and y such as the second term in Equation (5), n may be an odd number, and therefore Equation (7) may include odd power terms of r.

In other words, Equation (5) and Equation (7) are included in Equation (1) as a special case.

Further, if $D_n = E_n$ in Equation (7), the second term would be a function only of r as follows:

$$\begin{aligned}(2\text{nd term}) &= \sum_n D_n (x^2+y^2)^{n-2} \\ &= \sum_n D_n r^n.\end{aligned} \tag{i}$$

Also if $B_{m,j} = {}_m C_{m+j} B_{m,0}$ in Equation (5) (where ${}_m C_{m+j}$ is a binomial coefficient to represent ${}_m C_{m+j} = (m+j)!/(m!j!))$, the second term would be a function only of r. Further, if $C_x = C_y$ and $K_x = K_y$ in this case, $$z = \frac{C_x r^2}{1 + \sqrt{1 - (1+K_x) C_x^2 r^2}} + \Sigma D_n r^n \tag{j}$$

which is a function only of r as a whole to represent an axial symmetric shape.

Further, if $K_x = 0$ and $D_n = 0$, Equation (j) becomes as follows:

$$Z = \frac{C_x r^2}{1 + \sqrt{1 - C_x^2 r^2}}, \tag{k}$$

which represents a sphere with radius $R = 1/C_x$.

The features of the extended toric surface as apparent from the above description are as follows.

(1) The radius of curvature may be continuously changed depending upon a location on the refracting surface.

(2) An astigmatic surface can be expressed by it.

(3) The contours of X and Y principal meridians may be determined independent of each other.

(4) It can express the conventional spherical surfaces, toric surfaces and axially symmetric aspherical surfaces.

As described, the extended toric surface has a greater degree of freedom of shape, which is very useful in aberration correction of lens. (FIG. 7 shows the inclusion relation of the curved surfaces.) Incidentally, the coordinate axes used in the above description are employed to define the shape of each surface, it should be understood that they are not introduced to fix the positional relation between the surfaces. In other words, coordinate axes to define a surface may be moved in parallel (as in FIG. 8A), inclined (as in FIG. 8B), or rotated (as in FIG. 8C) with respect to those to define the other surface.

BRIEF DESCRIPTION OF THE DRAWINGS

FIG. 1 is a schematic drawing to show notations of lens data;

FIG. 9A is an aberration diagram to show a change of average power in the first example of the present invention;

FIG. 9B is an aberration diagram to show a change of astigmatism in the first example;

FIG. 10A is an aberration diagram to show a change of average power in a prior art example corresponding to Example 1;

FIG. 10B is an aberration diagram to show a change of astigmatism in the prior art example;

FIG. 15A is an aberration diagram to show a change of average power in the fourth example of the present invention;

FIG. 15B is an aberration diagram to show a change of astigmatism in the fourth example;

FIG. 16A is an aberration diagram to show a change of average power in a prior art example corresponding to Example 4;

FIG. 16B is an aberration diagram to show a change of astigmatism in the prior art example;

FIG. 17A is an aberration diagram to show a change of average power in the fifth example of the present invention;

FIG. 17B is an aberration diagram to show a change of astigmatism in the fifth example;

FIG. 19A is an aberration diagram to show a change of average power in the sixth example of the present invention;

FIG. 19B is an aberration diagram to show a change of astigmatism in the sixth example;

FIG. 22A is an aberration diagram to show a change of average power in a prior art example corresponding to Example 7;

FIG. 22B is an aberration diagram to show a change of astigmatism in the prior art example;

FIG. 23A is an aberration diagram to show a change of average power in the eighth example of the present invention;

FIG. 23B is an aberration diagram to show a change of astigmatism in the eighth example;

FIG. 25A is an aberration diagram to show a change of average power in the ninth example of the present invention;

FIG. 25B is an aberration diagram to show a change of astigmatism in the ninth example;

BEST MODE FOR CARRYING OUT THE INVENTION

Figure 2:
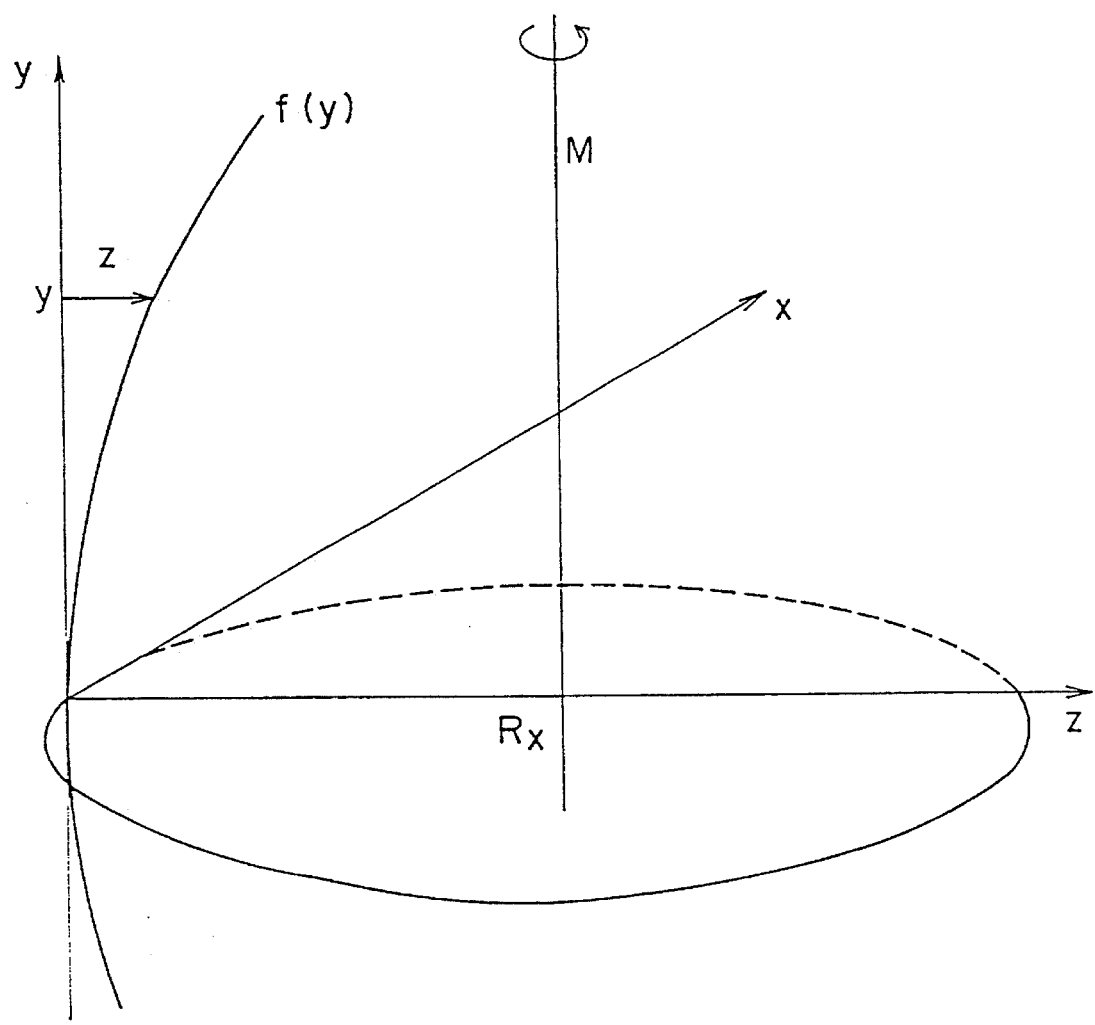
FIG. 2 is a schematic drawing to show the definition of a toric surface.
Figure 3B:
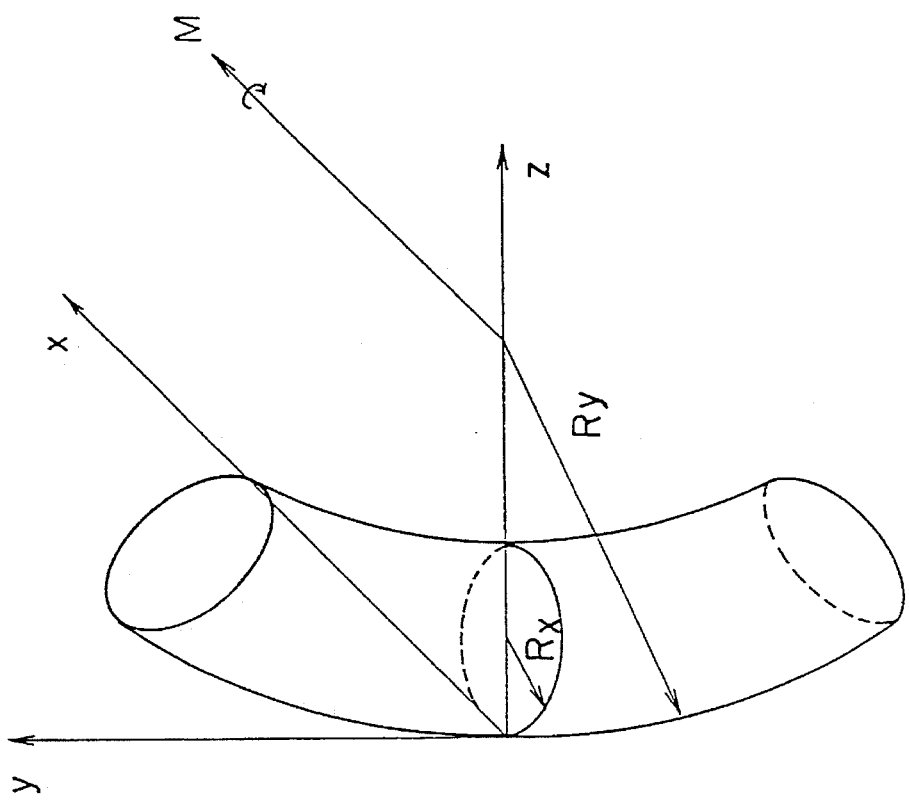
FIG. 3B is a schematic drawing to show a toric surface of tire type.
Figure 3A:
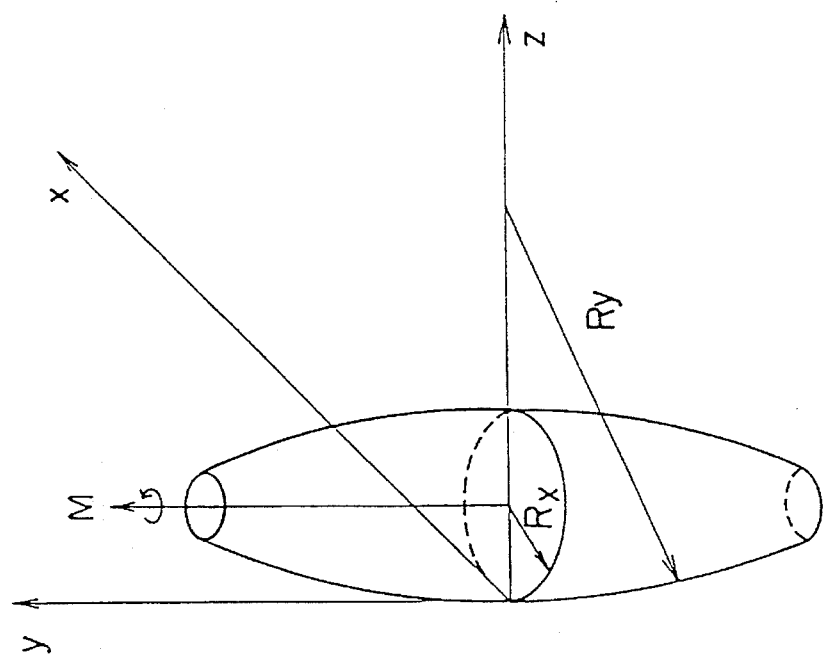
FIG. 3A is a schematic drawing to show a toric surface of barrel type.
Figure 4:
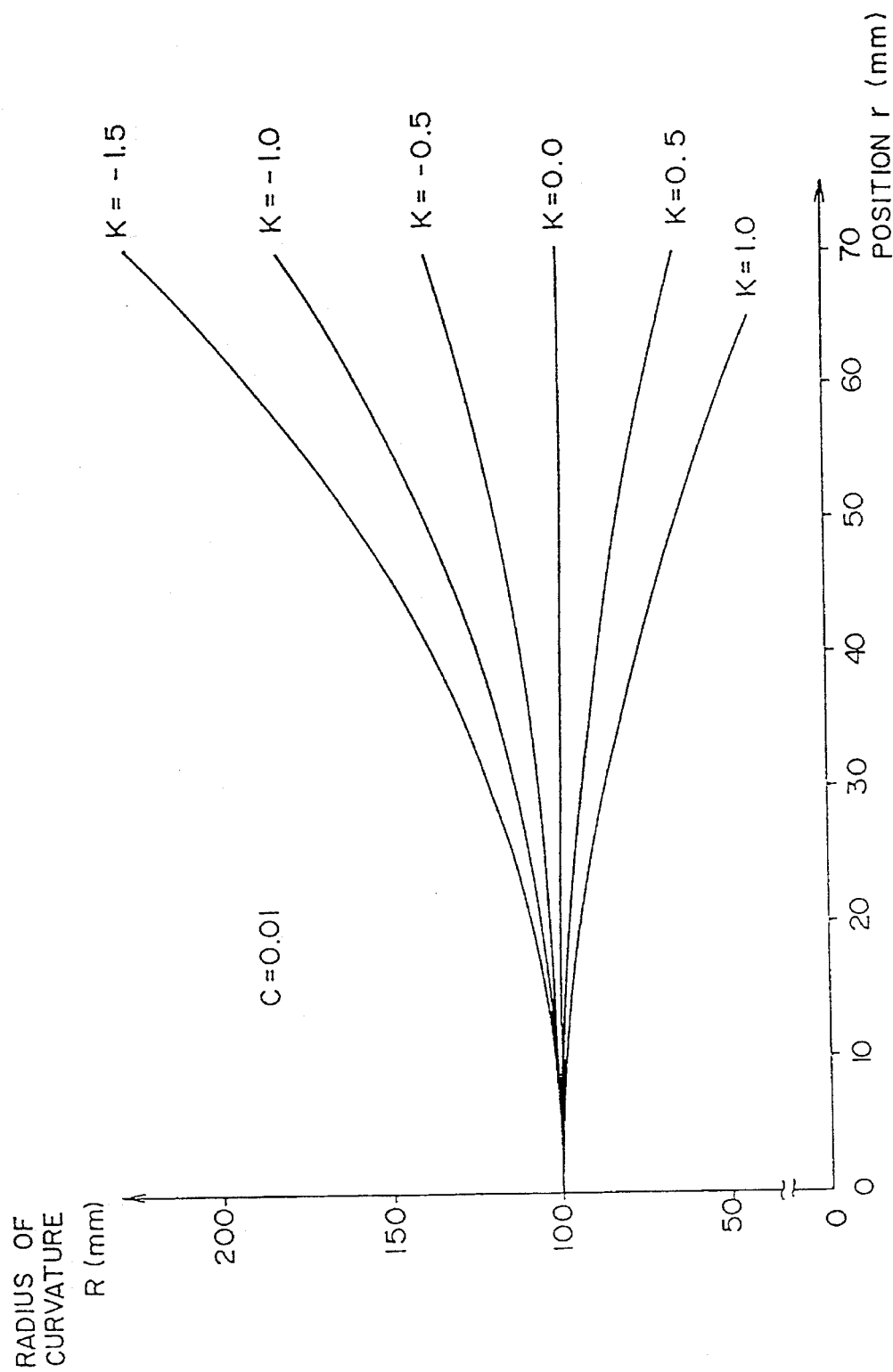
FIG. 4 is a drawing to show a change in radius of curvature with values of K.
Figure 5:
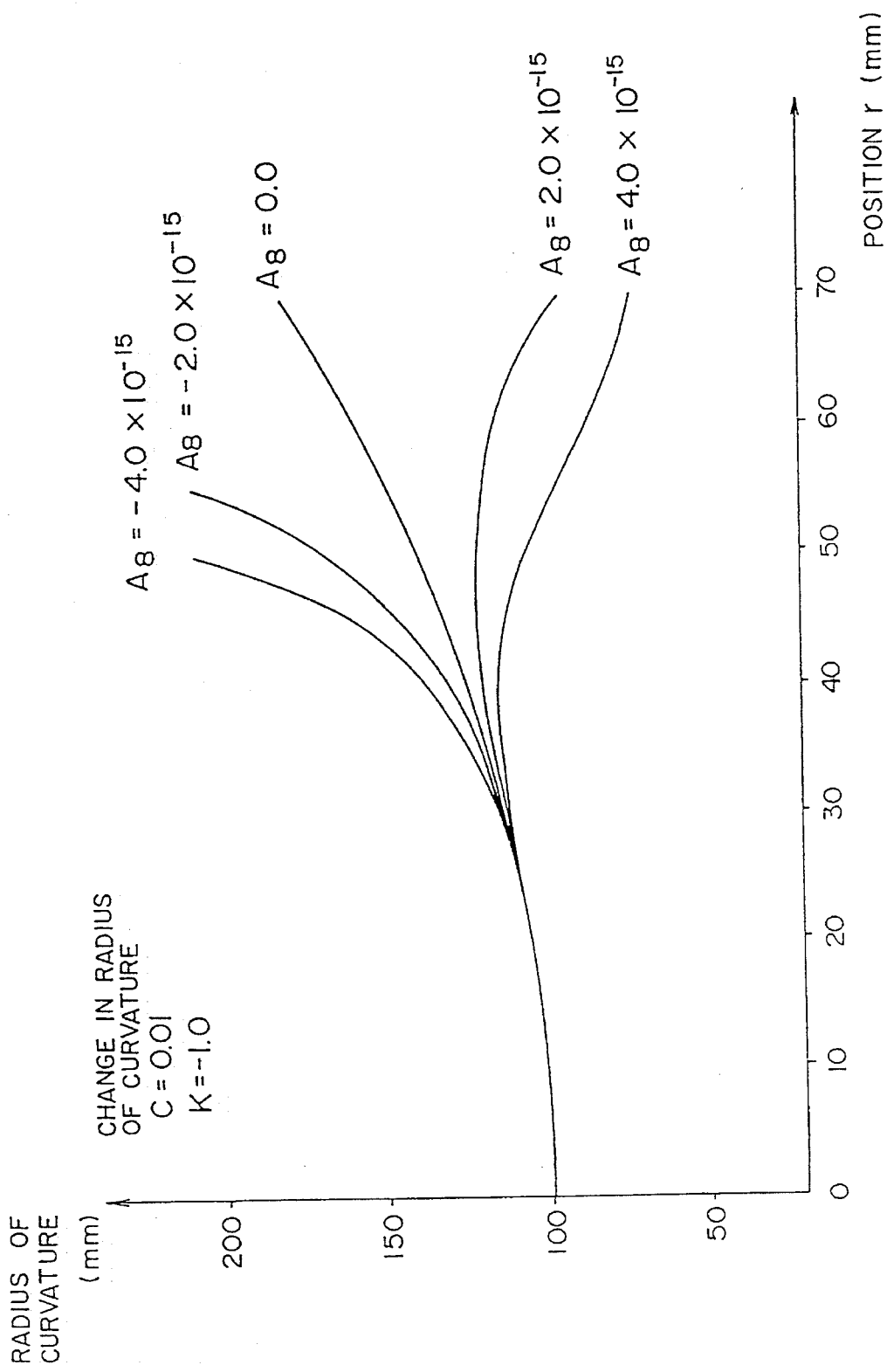
FIG. 5 is a drawing to show a change in radius of curvature with values of $A_8$.
Figure 6:
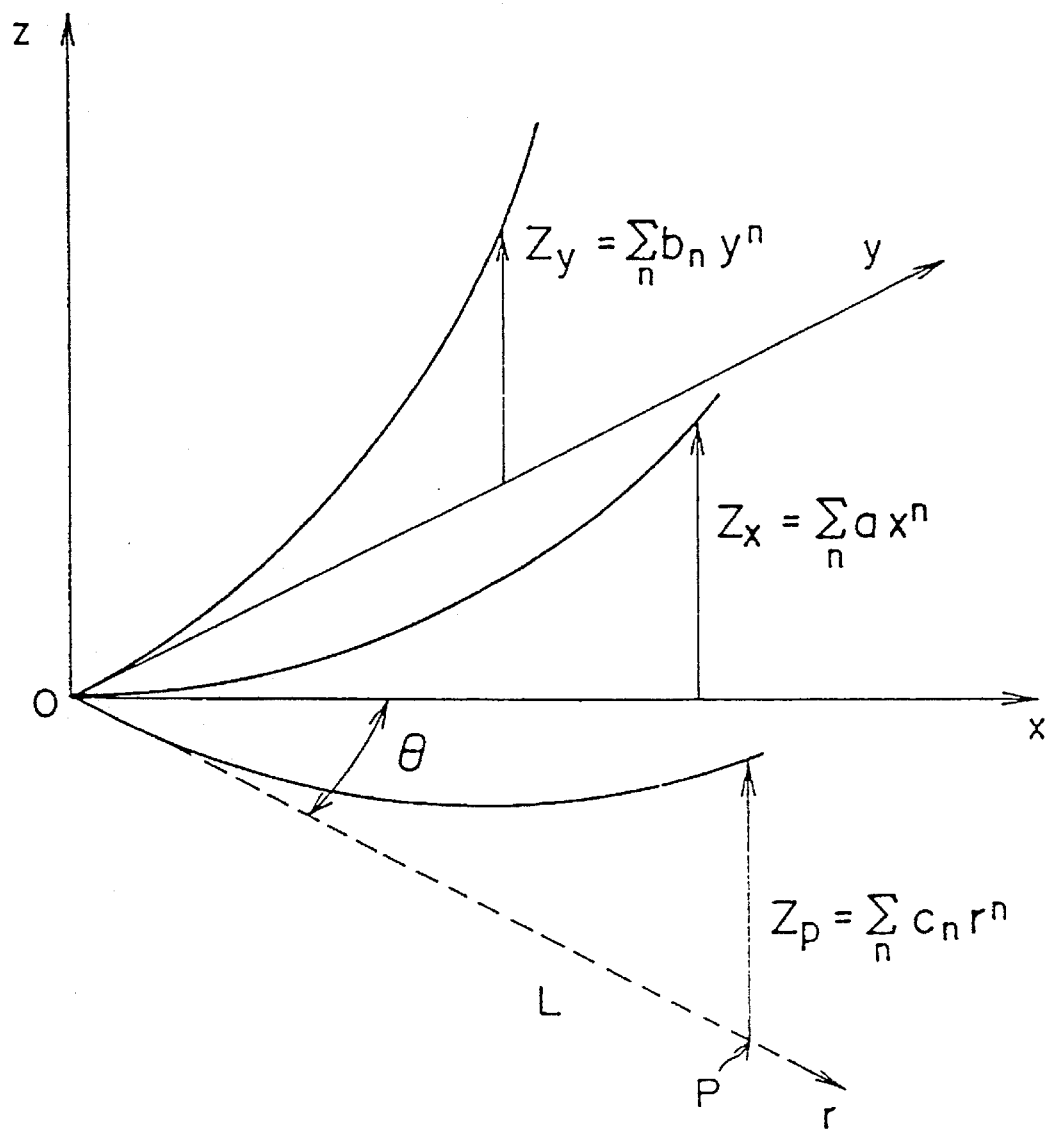
FIG. 6 is a drawing to illustrate the conception of polynomial.
Figure 7:
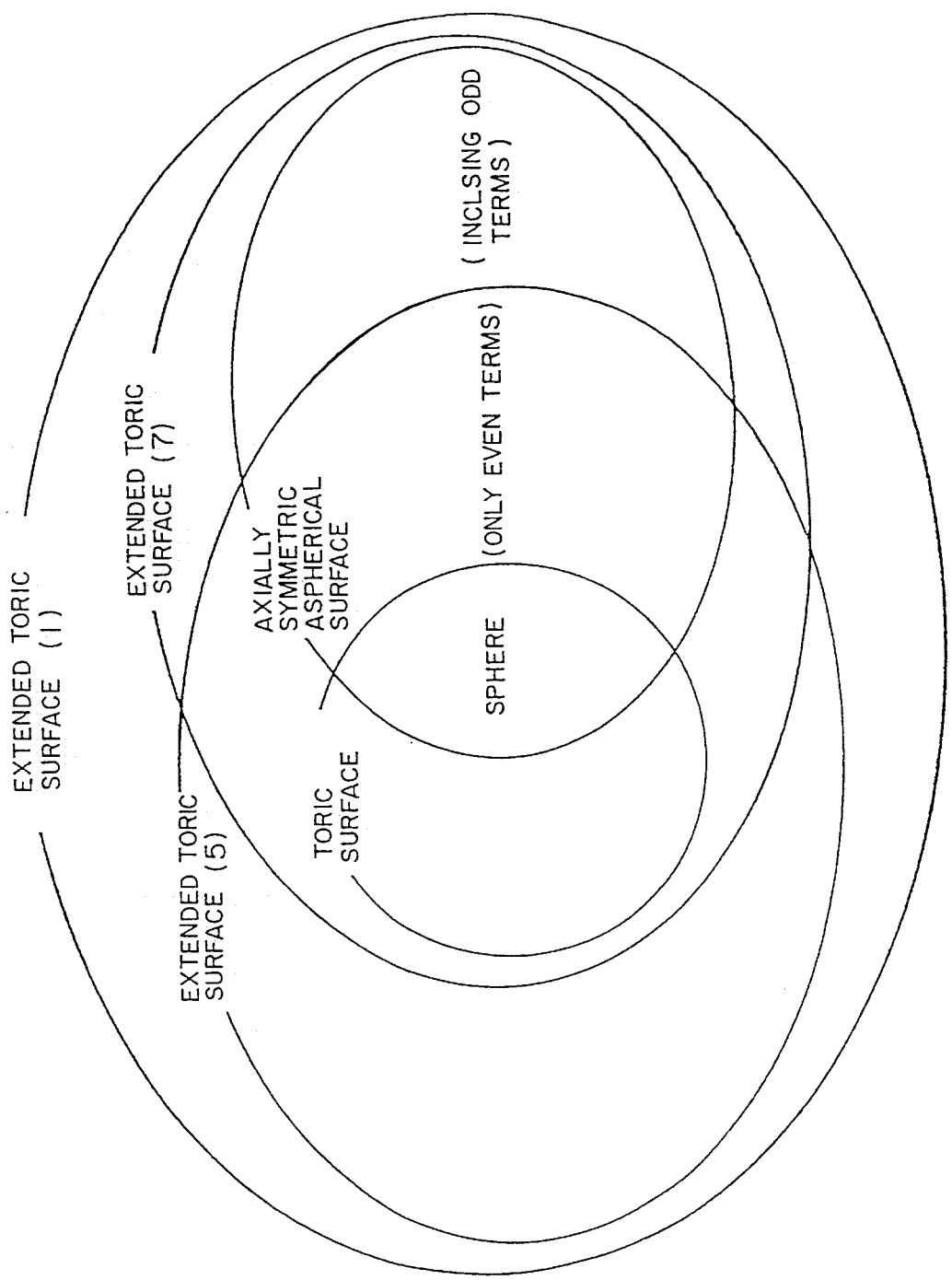
FIG. 7 is an explanatory drawing to show the inclusion relation of curved surfaces.
Figure 8A:
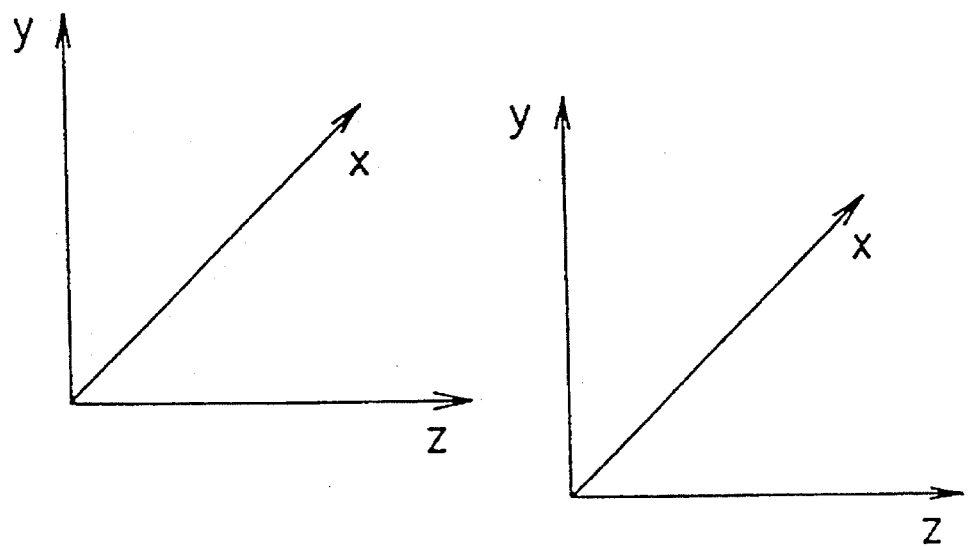
FIG. 8 is a drawing to show a positional relation between coordinate axes of first surface and those of second surface.
Figure 8B:
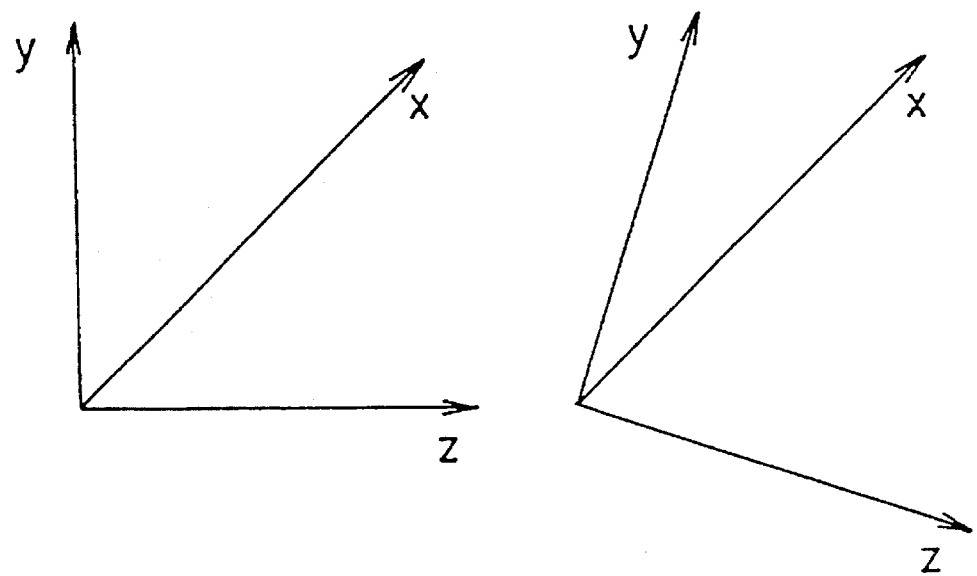
Figure 8C:
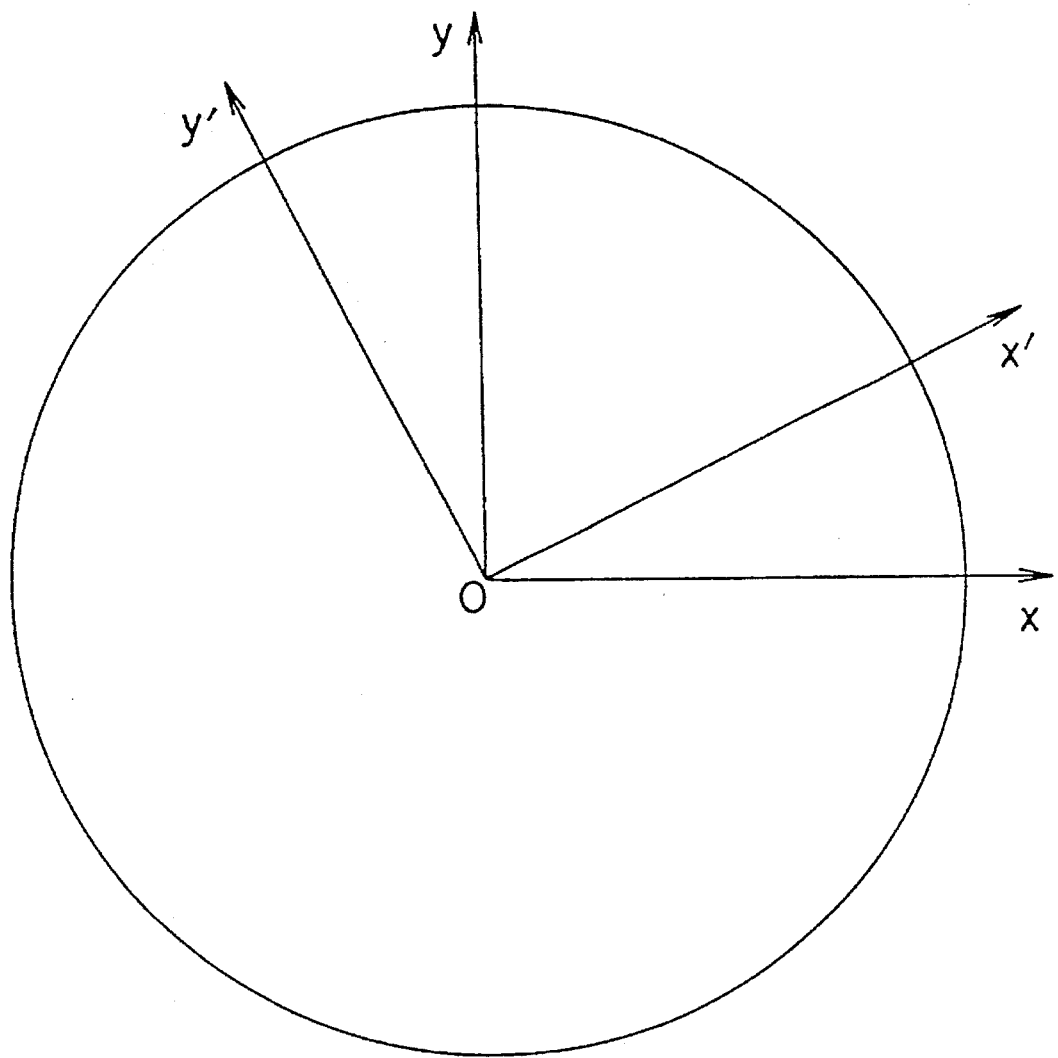

The following examples are described to illustrate the effectiveness of the present invention. A range is, however, very wide where the performance of lens may be improved based on the present invention, and it is not too much to mention that there are infinite combinations among the spherical power, the astigmatic power, the direction of astigmatic axis, prisms, the additional power, and so on. It is practically impossible to show all examples concerning those combinations. Therefore, it should be noted that the following examples are only a part of specific examples of the present invention, and that the present invention is not limited only to the scope of the examples.

The following examples employ Equation (1) as the representation equation of the extended toric surface. It is because Equation (1) can include the broadest range. It is also easy to transform the coefficients $A_{n,m,j}$ in Equation (1) into the coefficients $B_{m,j}$ in Equation (5) or into the coefficients $D_n$ and $E_n$ in Equation (7).

EXAMPLE 1

A positive lens corresponding to claim 4 in which the first surface (surface on the object side) is an extended toric surface and the second surface (surface on the eyeball side) is a spherical surface.

The following table shows paraxial data common to the example of the present invention and a prior art example.

| Surface No. | Type | Radius of curvature R (mm) (S) | Distance T (mm) | Index N |
|---|---|---|---|---|
| 1 | AST | x 70.086 (7.1) y 102.077 (4.9) | 10.0 (10.0) | 1.500 |
| 2 | SPH | 220.000 (2.3) | | |

(In the above table AST represents an astigmatic surface, SPH a spherical surface, R a radius of curvature, S a refracting power, T an interplanar-distance, and values in parentheses corresponding values in the prior art example. Further, N denotes an index of refraction.)

(1) Example of the Invention

The following table shows aspherical coefficients of the extended toric surface of the first surface. FIGS. 9 show aberration diagrams of this lens.

| Surface No. | Coefficient | Value of coefficient |
|---|---|---|
| 1 | $K_X$ | −0.85 |
| 1 | $K_Y$ | −1.00 |

(2) Prior Art Example

The astigmatic surface of the first surface is a conventional toric surface. FIGS. 10 show aberration diagrams of this lens.

The vertical axis of aberration diagram represents a rotation angle (visual angle) D of eye. The horizontal axis represents a difference of average power P from the value at visual angle of 0 degree in unit of diopter in each figure denoted by A, and a difference of astigmatism A from the value at visual angle of 0 degree in unit of diopter in each figure denoted by B.

It is clearly seen from the drawings that changes in average power and astigmatism in the example of the present invention are smaller than those in the prior art example, and thus that the lens of the example of the present invention has uniform optical characteristics all over the surfaces of lens.

EXAMPLE 2

A positive lens corresponding to claim 4 in which the first surface is an extended toric surface and the second surface is a spherical surface.

The following table shows paraxial data common to the example of the present invention and a prior art example.

| Surface No. | Type | Radius of curvature R (mm) (S) | Distance T (mm) | Index N |
|---|---|---|---|---|
| 1 | AST | x 71.429 (7.0) y 100.000 (5.0) | 9.0 (10.1) | 1.500 |
| 2 | SPH | 250.000 (2.0) | | |

(1) Example of the Invention

Figures 11A, 11B:
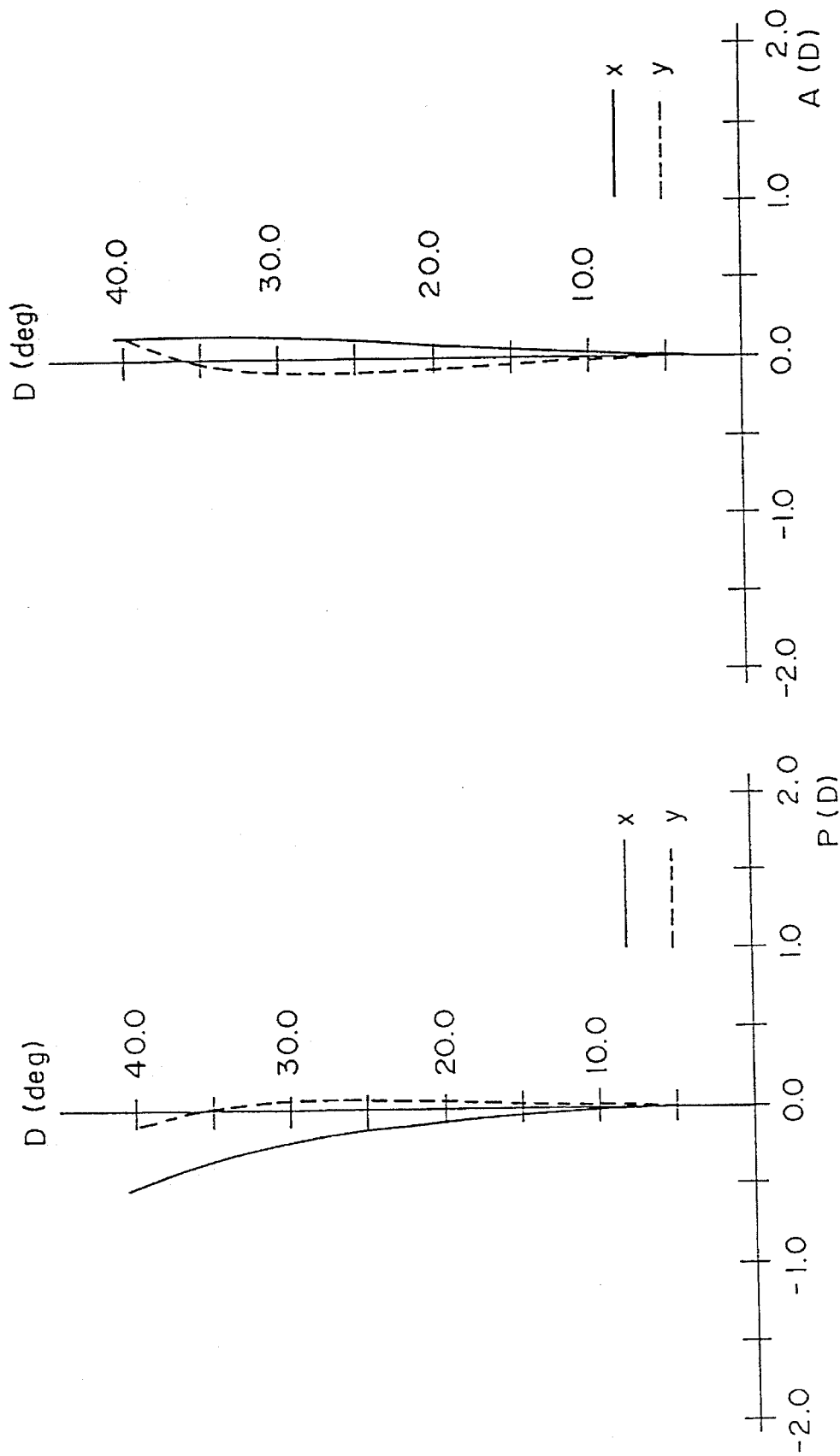
FIG. 11A is an aberration diagram to show a change of average power in the second example of the present invention.
FIG. 11B is an aberration diagram to show a change of astigmatism in the second example.

The following table shows aspherical coefficients of the extended toric surface of the first surface. FIGS. 11 show aberration diagrams of this lens.

| Surface No. | Coefficient | Value of coefficient |
|---|---|---|
| 1 | $K_X$ | −1.08 |
| 1 | $K_Y$ | −1.08 |
| 1 | $A_{6,1,0}$ | 1.73 E-11 |
| 1 | $A_{6,0,1}$ | −4.83 E-11 |

(In the above table, 1.73 E-11 stands for $1.73 \times 10^{-11}$, and this notation is also used in the following tables.)

(2) Prior Art Example

Figures 12A, 12B:
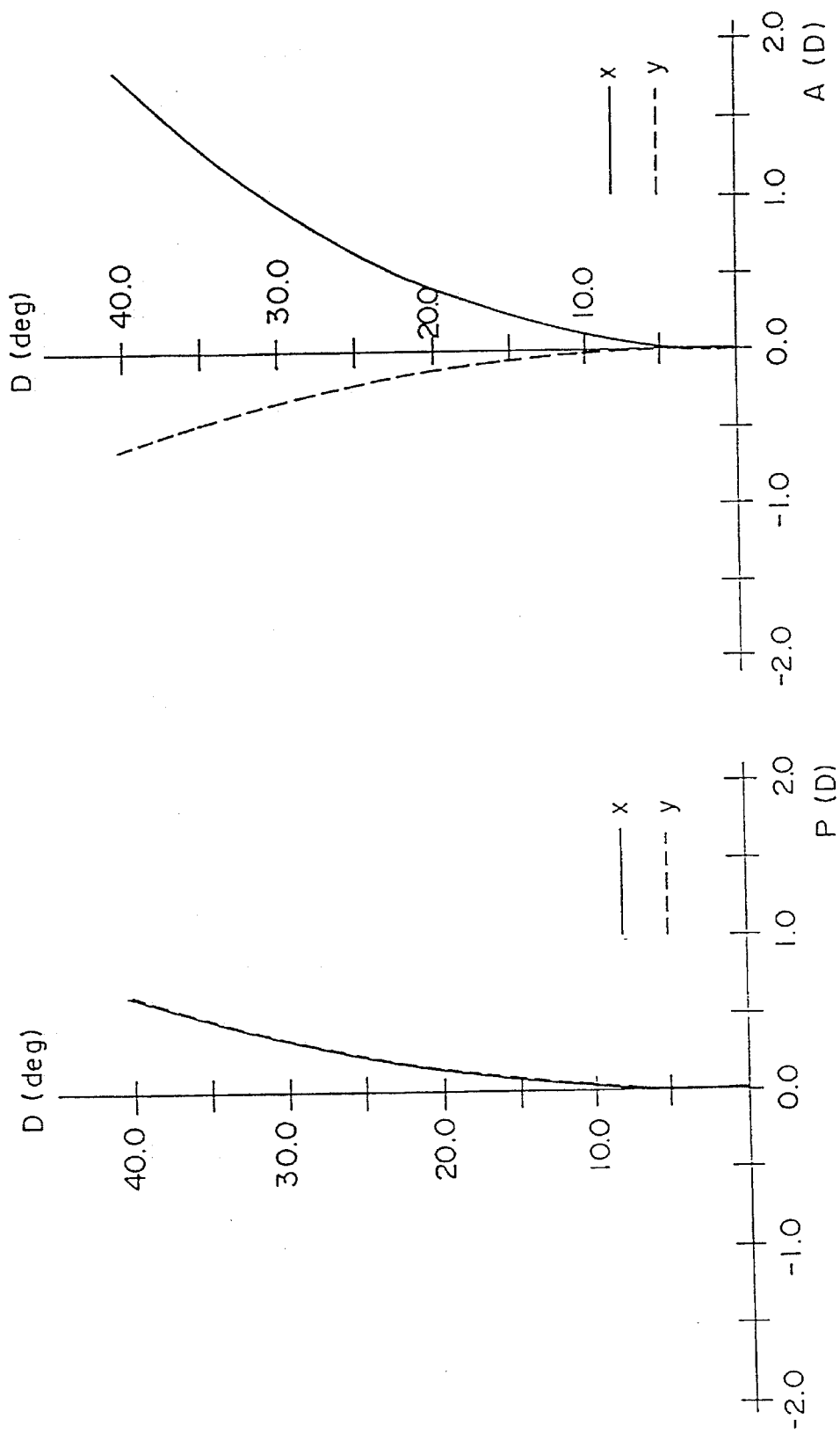
FIG. 12A is a diagram to show a change of average power in a prior art example corresponding to Example 2.
FIG. 12B is a diagram to show a change of astigmatism in the prior art example.

The astigmatic surface of the first surface is a conventional toric surface. FIGS. 12 show aberration diagrams of this lens.

EXAMPLE 3

A positive lens corresponding to claim 5 in which the first surface is a spherical surface and the second surface is an extended toric surface.

The following table shows paraxial data common to the example of the present invention and a prior art example.

| Surface No. | Type | Radius of curvature R (mm) (S) | Distance T (mm) | Index N |
|---|---|---|---|---|
| 1 | SPH | 83.333 (6.0) | 8.9 | 1.500 |
| 2 | AST | x 500.000 (1.0) y 166.667 (3.0) | (9.7) | |

(1) Example of the Invention

Figures 13A, 13B:
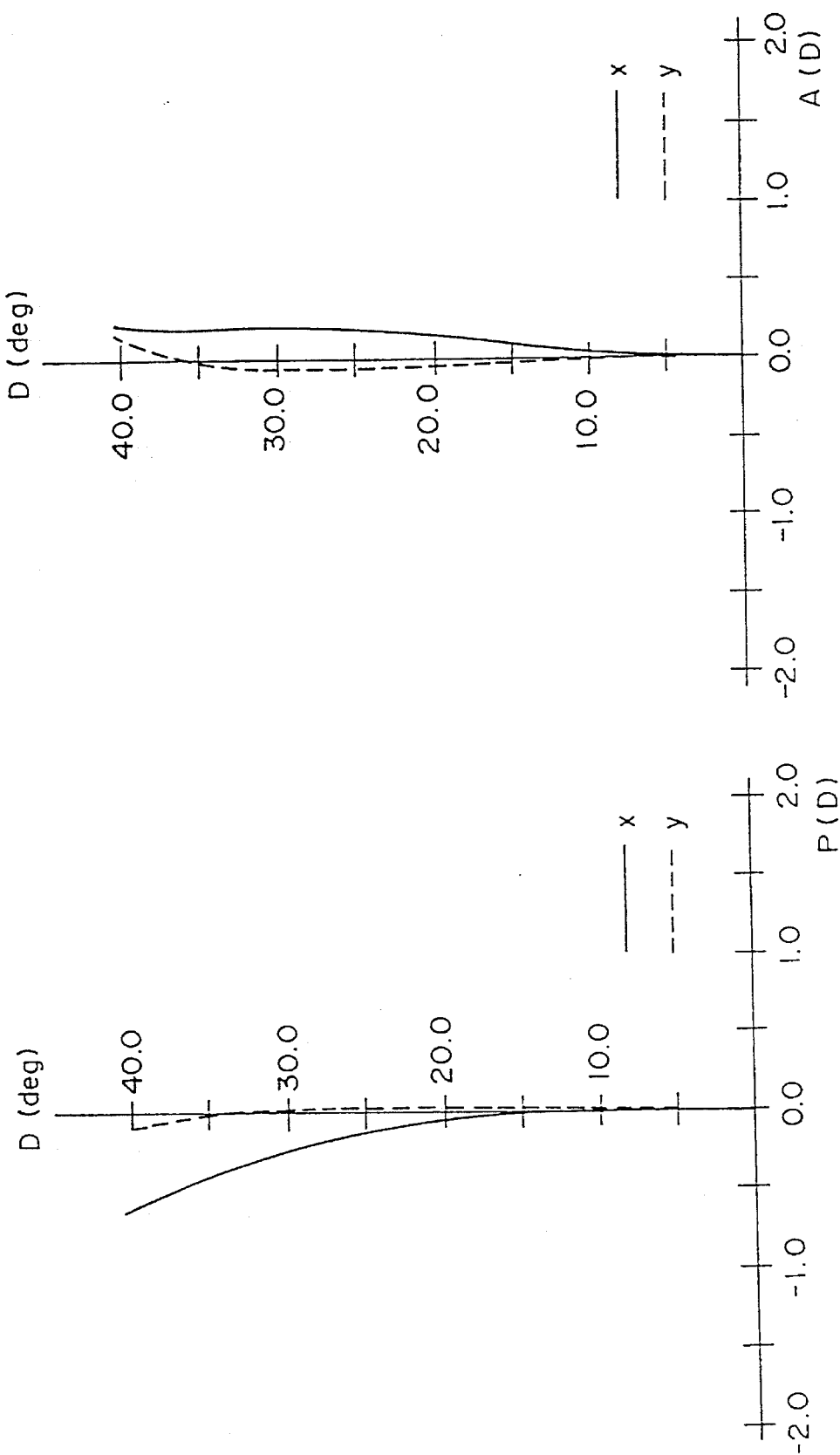
FIG. 13A is an aberration diagram to show a change of average power in the third example of the present invention.
FIG. 13B is an aberration diagram to show a change of astigmatism in the third example.

The following table shows aspherical coefficients of the extended toric surface of the second surface. FIGS. 13 show aberration diagrams of this lens.

| Surface No. | Coefficient | Value of coefficient |
|---|---|---|
| 2 | $K_Y$ | 4.28 |
| 2 | $A_{4,1,0}$ | 7.55 E-7 |
| 2 | $A_{6,1,0}$ | −2.74 E-11 |

(2) Prior Art Example

Figure 14B:
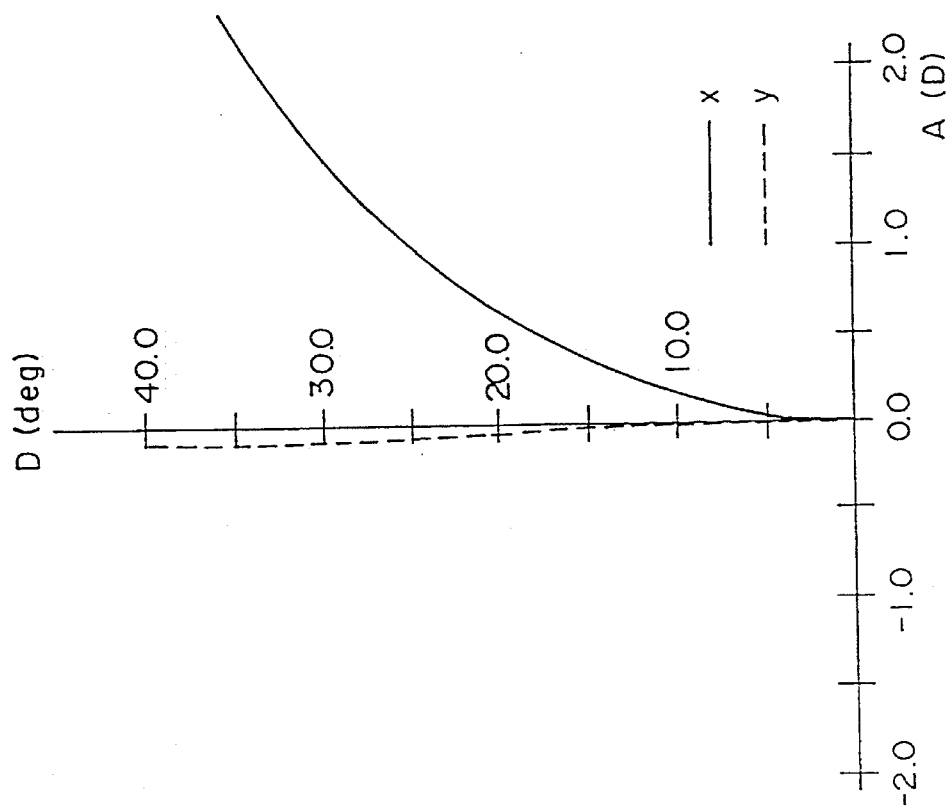
FIG. 14B is an aberration diagram to show a change of astigmatism in the prior art example.
Figure 14A:
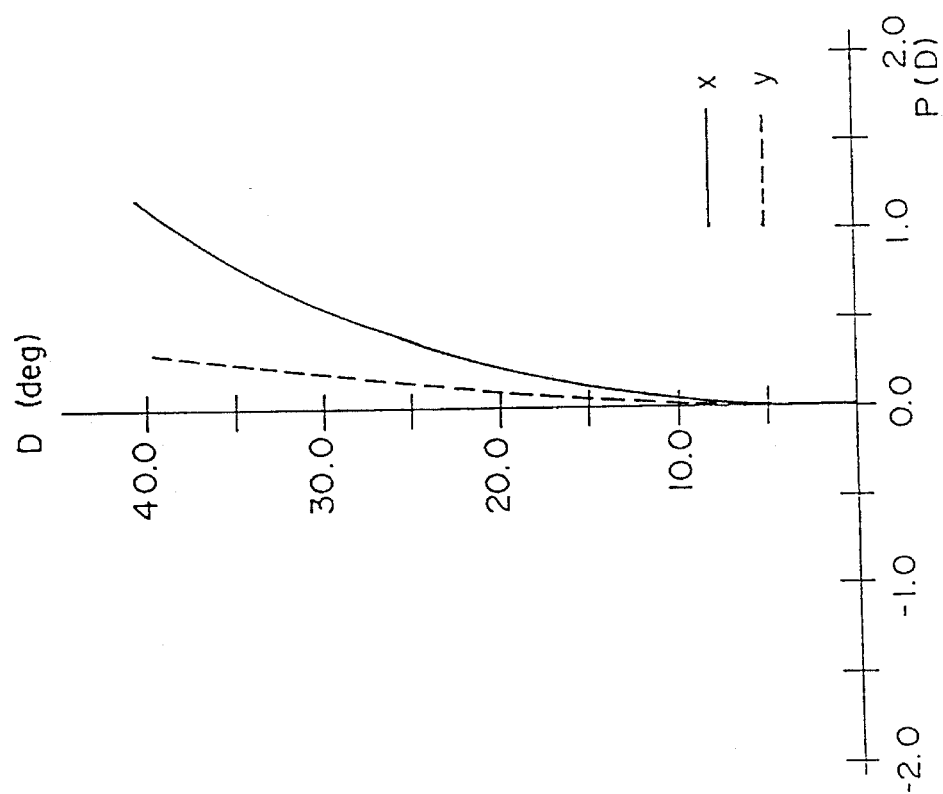
FIG. 14A is an aberration diagram to show a change of average power in a prior art example corresponding to Example 3.

The astigmatic surface of the second surface is a conventional toric surface. FIGS. 14 show aberration diagrams of this lens.

EXAMPLE 4

A negative lens corresponding to claim 6 in which the first surface is an extended toric surface and the second surface is a spherical surface.

The following table shows paraxial data common to the example of the present invention and a prior art example.

| Surface No. | Type | Radius of curvature R (mm) (S) | Distance T (mm) | Index N |
|---|---|---|---|---|
| 1 | AST | x 250.000 (2.0) y infinite (0.0) | 1.5 (1.5) | 1.500 |

-continued

| Surface No. | Type | Radius of curvature R (mm) (S) | Distance T (mm) | Index N |
|---|---|---|---|---|
| 2 | SPH | 62.500 (8.0) | | |

(1) Example of the Invention

The following table shows aspherical coefficients of the extended toric surface of the first surface. FIGS. 15 show aberration diagrams of this lens.

| Surface No. | Coefficient | Value of coefficient |
|---|---|---|
| 1 | $A_{4,1,0}$ | 3.75 E-8 |
| 1 | $A_{4,0,1}$ | 2.25 E-7 |
| 1 | $A_{6,1,0}$ | 4.35 E-10 |
| 1 | $A_{6,0,1}$ | 1.11 E-9 |
| 1 | $A_{8,1,0}$ | −6.10 E-13 |
| 1 | $A_{8,0,1}$ | −1.52 E-12 |
| 1 | $A_{10,1,0}$ | 2.05 E-16 |
| 1 | $A_{10,0,1}$ | 5.00 E-16 |

(2) Prior Art Example

The astigmatic surface of the first surface is a conventional toric surface. FIGS. 16 show aberration diagrams of this lens.

EXAMPLE 5

A negative lens corresponding to claim 7 in which the first surface is a spherical surface and the second surface is an extended toric surface.

The following table shows paraxial data common to the example of the present invention and a prior art example.

| Surface No. | Type | Radius of curvature R (mm) (S) | Distance T (mm) | Index N |
|---|---|---|---|---|
| 1 | SPH | infinite (0.0) | 1.5 | 1.500 |
| 2 | AST | x 83.333 (6.0) y 62.500 (8.0) | (1.5) | |

(1) Example of the Invention

The following table shows aspherical coefficients of the extended toric surface of the second surface. FIGS. 17 show aberration diagrams of this lens.

| Surface No. | Coefficient | Value of coefficient |
|---|---|---|
| 2 | $K_X$ | −0.98 |
| 2 | $K_Y$ | −1.35 |
| 2 | $A_{6,1,0}$ | −2.24 E-9 |
| 2 | $A_{6,0,1}$ | −8.03 E-10 |
| 2 | $A_{8,1,0}$ | 2.96 E-12 |
| 2 | $A_{8,0,1}$ | 1.07 E-12 |
| 2 | $A_{10,1,0}$ | −1.00 E-15 |
| 2 | $A_{10,0,1}$ | −5.00 E-16 |

(2) Prior Art Example

Figures 18A, 18B:
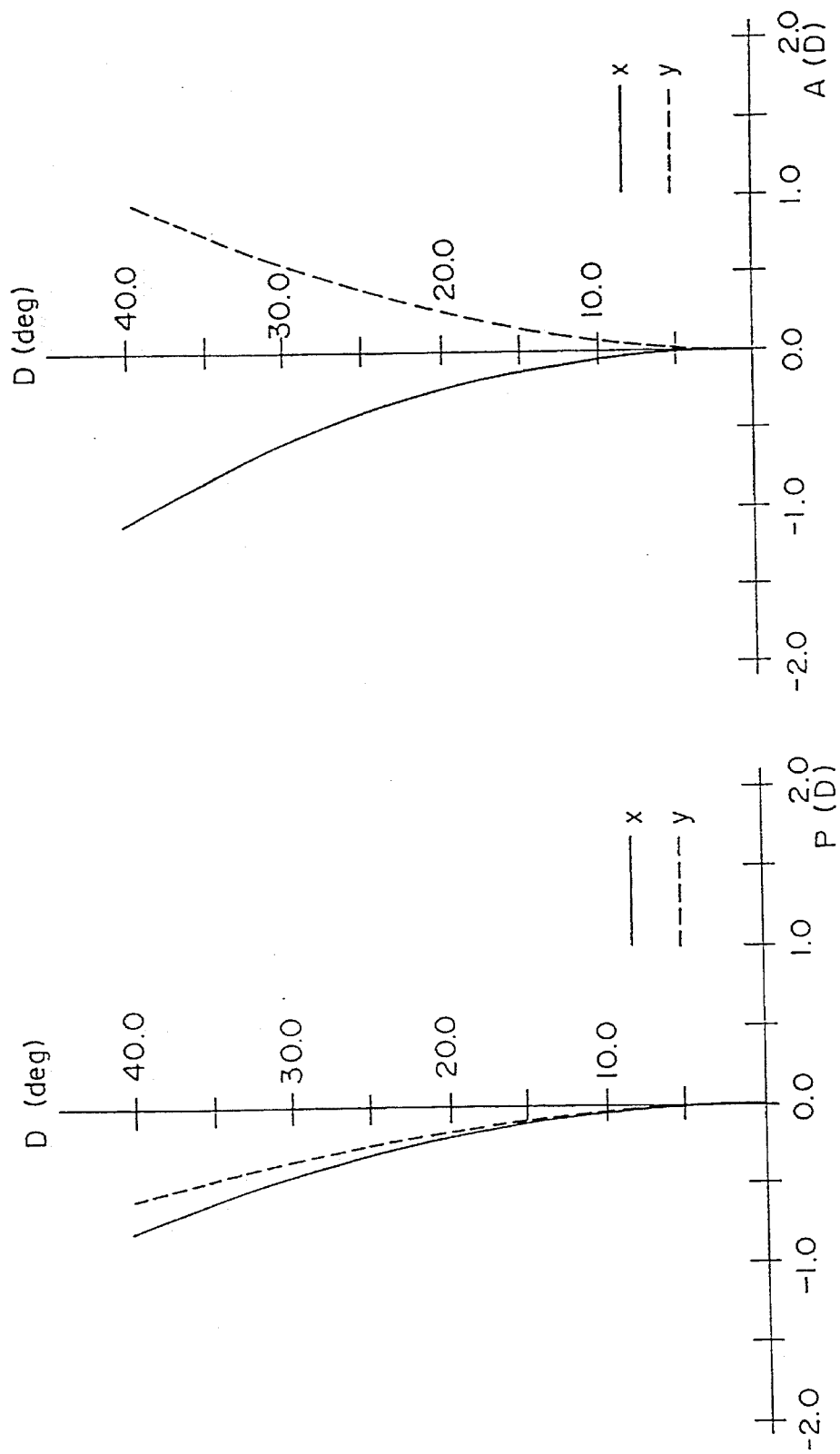
FIG. 18A is an aberration diagram to show a change of average power in a prior art example corresponding to Example 5.
FIG. 18B is an aberration diagram to show a change of astigmatism in the prior art example.

The astigmatic surface of the second surface is a conventional toric surface. FIGS. 18 show aberration diagrams of this lens.

EXAMPLE 6

A positive lens corresponding to claim 8 in which the first surface is an extended toric surface and the second surface is an axially symmetric aspherical surface.

The following table shows paraxial data common to the example of the present invention and a prior art example.

| Surface No. | Type | Radius of curvature R (mm) (S) | Distance T (mm) | Index N |
|---|---|---|---|---|
| 1 | AST | x 71.429 (2.0) <br> y 100.000 (5.0) | 6.7 <br> (9.6) | 1.500 |
| 2 | ASP | 250.000 (2.0) | | |

(In the above table ASP represents an axially symmetric aspherical surface.)

(1) Example of the Invention

The first surface is the extended toric surface, and the following table shows aspherical coefficients of the first surface and the second surface. FIGS. 19 show aberration diagrams of this lens.

| Surface No. | Coefficient | Value of coefficient |
|---|---|---|
| 1 | $K_X$ | −2.27 |
| 1 | $K_Y$ | −2.88 |
| 1 | $A_{6,1,0}$ | −1.17 E-9 |
| 1 | $A_{6,0,1}$ | −1.49 E-9 |
| 1 | $A_{8,1,0}$ | 2.30 E-13 |
| 1 | $A_{8,0,1}$ | 6.42 E-13 |
| 1 | $A_4$ | −6.75 E-7 |
| 1 | $A_6$ | −1.00 E-9 |
| 1 | $A_8$ | 6.00 E-13 |

(2) Prior Art Example

Figures 20A, 20B:
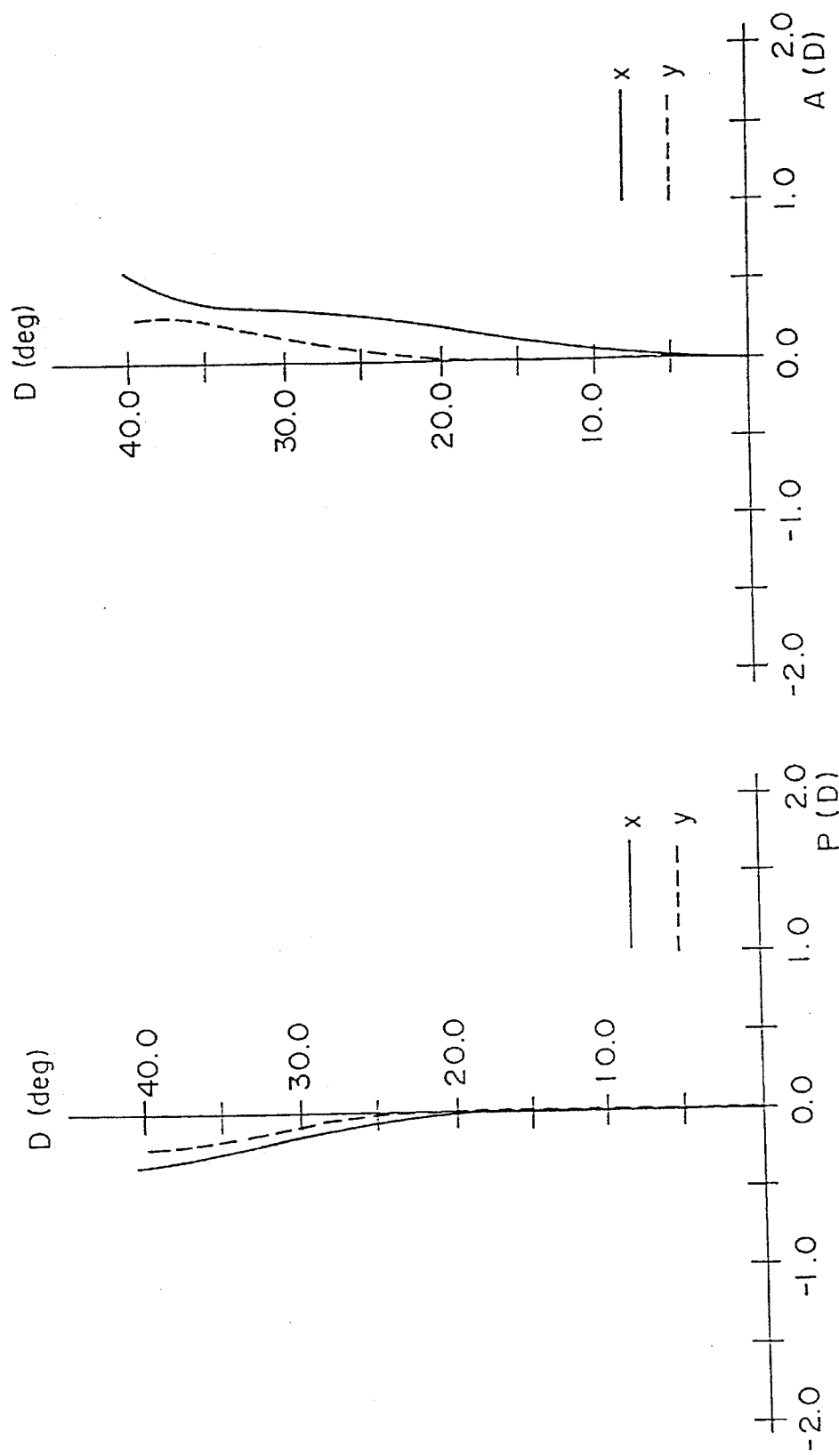
FIG. 20A is an aberration diagram to show a change of average power in a prior art example corresponding to Example 6.
FIG. 20B is an aberration diagram to show a change of astigmatism in the prior art example.

The astigmatic surface of the first surface is a conventional toric surface, and the following table shows aspherical coefficients of the second surface. FIGS. 20 show aberration diagrams of this lens.

| Surface No. | Coefficient | Value of coefficient |
|---|---|---|
| 2 | $A_4$ | 3.20 E-7 |
| 2 | $A_6$ | 2.28 E-10 |
| 2 | $A_8$ | −5.13 E-13 |
| 2 | $A_{10}$ | 2.00 E-16 |

EXAMPLE 7

A positive lens corresponding to claim 8 in which the first surface is an axially symmetric aspherical surface and the second surface is an extended toric surface. The following table shows paraxial data common to the example of the present invention and a prior art example.

| Surface No. | Type | Radius of curvature R (mm) (S) | Distance T (mm) | Index N |
|---|---|---|---|---|
| 1 | ASP | 83.333 (6.0) | 7.2 <br> (8.8) | 1.500 |
| 2 | AST | x 500.000 (1.0) <br> y 166.667 (3.0) | | |

(1) Example of the Invention

Figures 21A, 21B:
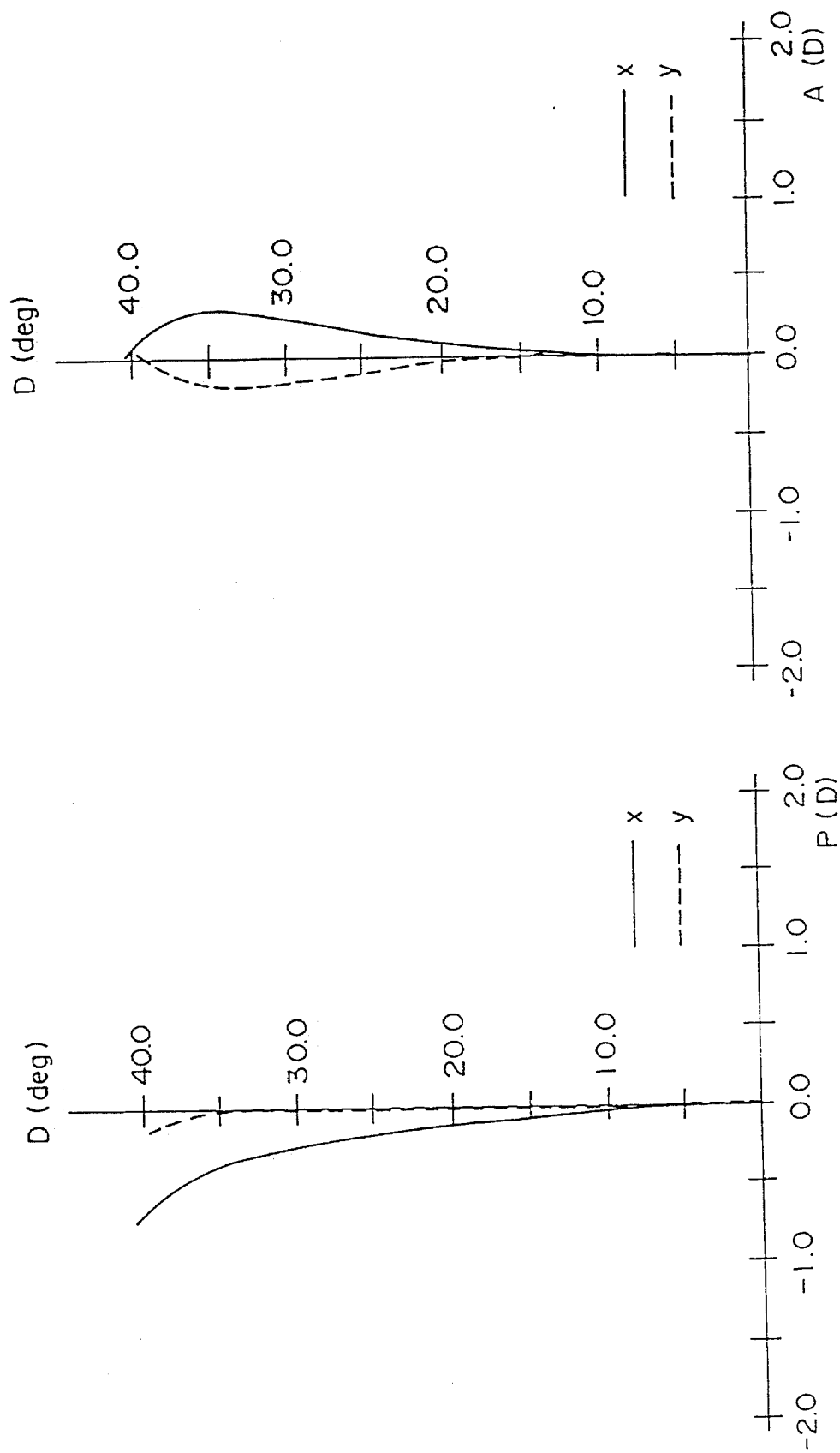
FIG. 21A is an aberration diagram to show a change of average power in the seventh example of the present invention.
FIG. 21B is an aberration diagram to show a change of astigmatism in the seventh example.

The astigmatic surface of the second surface is the extended toric surface, and the following table shows aspherical coefficients of the first surface and the second surface. FIGS. 21 show aberration diagrams of this lens.

| Surface No. | Coefficient | Value of coefficient |
|---|---|---|
| 1 | K | −5.55 |
| 1 | $A_6$ | −2.00 E-10 |
| 1 | $A_8$ | −1.00 E-13 |
| 2 | $A_{4,1,0}$ | −7.12 E-7 |
| 2 | $A_{4,0,1}$ | −1.44 E-6 |
| 2 | $A_{6,1,0}$ | 1.29 E-10 |
| 2 | $A_{6,0,1}$ | 3.21 E-10 |

(2) Prior Art Example

The astigmatic surface of the second surface is a conventional toric surface, and the following table shows aspherical coefficients of the first surface. FIGS. 22 show aberration diagrams of this lens.

| Surface No. | Coefficient | Value of coefficient |
|---|---|---|
| 1 | K | −1.38 |
| 1 | $A_6$ | −1.53 E-10 |
| 1 | $A_8$ | 9.58 E-14 |

EXAMPLE 8

A positive lens corresponding to claim 9 in which the first surface and the second surface both are extended toric surfaces. The following table shows paraxial data common to the example of the present invention and a prior art example.

| Surface No. | Type | Radius of curvature R (mm) (S) | Distance T (mm) | Index N |
|---|---|---|---|---|
| 1 | AST | x 83.333 (6.0) <br> y 100.000 (5.0) | 6.3 <br> (9.7) | 1.500 |
| 2 | AST | x 500.000 (1.0) <br> y 250.000 (2.0) | | |

(1) Example of the Invention

The first surface and the second surface are the extended toric surfaces, and the following table shows aspherical coefficients of the two surfaces. FIGS. 23 show aberration diagrams of this lens.

| Surface No. | Coefficient | Value of coefficient |
|---|---|---|
| 1 | $K_X$ | −5.66 |
| 1 | $K_Y$ | −1.79 |
| 1 | $A_{6,1,0}$ | −1.00 E-9 |
| 1 | $A_{6,0,1}$ | −1.50 E-9 |
| 1 | $A_{8,1,0}$ | −4.00 E-13 |
| 1 | $A_{8,0,1}$ | −5.00 E-13 |
| 1 | $A_{10,1,0}$ | 3.00 E-16 |
| 1 | $A_{10,0,1}$ | 5.00 E-16 |
| 2 | $A_{4,1,0}$ | −1.03 E-6 |
| 2 | $A_{4,0,1}$ | −1.22 E-7 |
| 2 | $A_{6,1,0}$ | −2.09 E-10 |
| 2 | $A_{6,0,1}$ | −2.58 E-9 |
| 2 | $A_{8,1,0}$ | −5.73 E-13 |
| 2 | $A_{8,0,1}$ | 1.06 E-12 |

-continued

| Surface No. | Coefficient | Value of coefficient |
|---|---|---|
| 2 | $A_{10,1,0}$ | 4.50 E-16 |

(1) Prior Art Example

Figures 24A, 24B:
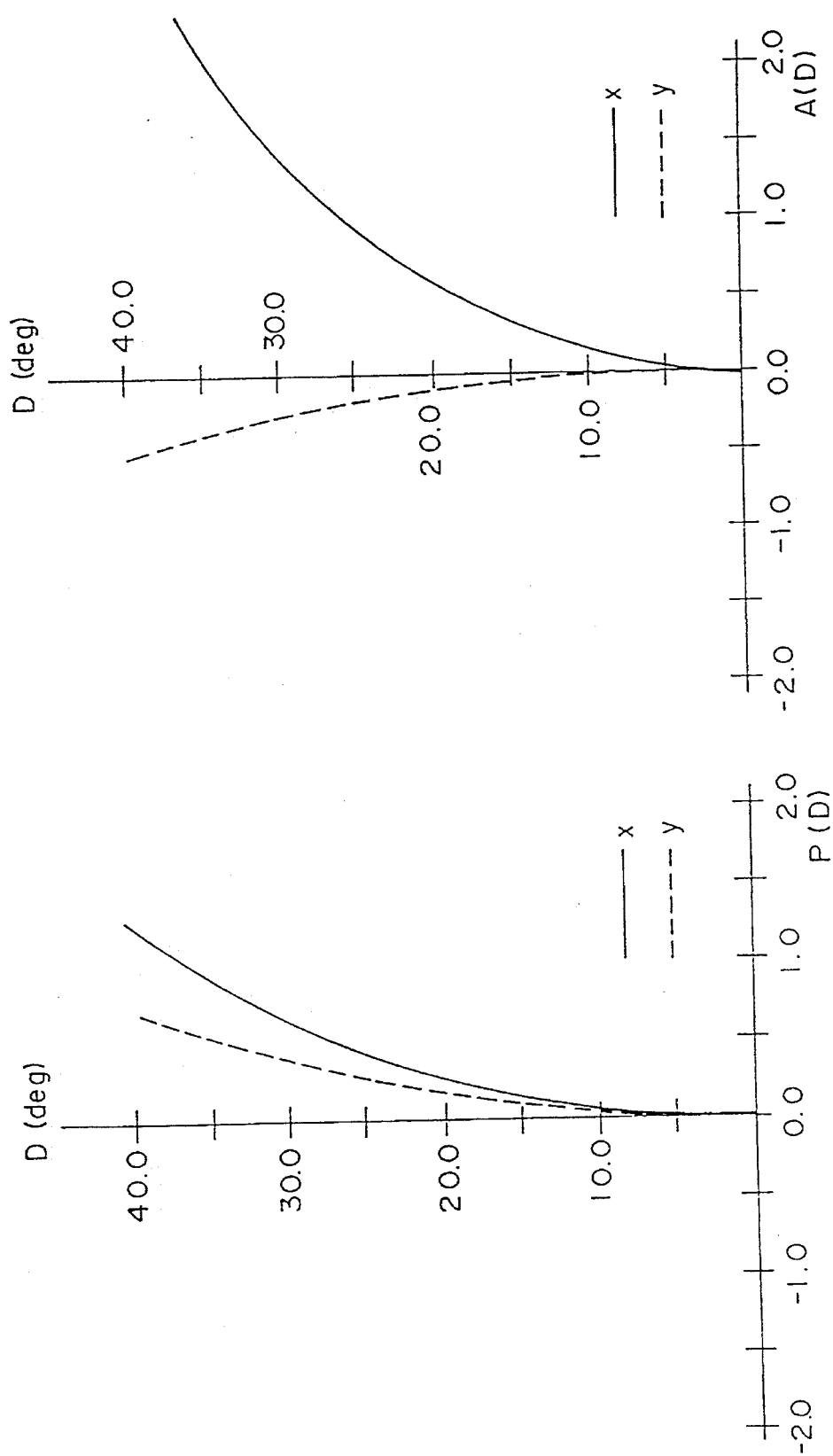
FIG. 24A is an aberration diagram to show a change of average power in a prior art example corresponding to Example 8.
FIG. 24B is an aberration diagram to show a change of astigmatism in the prior art example.

The first and the second surfaces are conventional toric surfaces. FIGS. 24 show aberration diagrams of this lens.

EXAMPLE 9

A negative lens corresponding to claim 9 in which the first surface and the second surface both are extended toric surfaces.

The following table shows paraxial data common to the example of the present invention and a prior art example.

| Surface No. | Type | Radius of curvature R (mm) (S) | Distance T (mm) | Index N |
|---|---|---|---|---|
| 1 | AST | x 166.667 (3.0) <br> y 250.000 (2.0) | 1.5 <br> (1.5) | 1.500 |
| 2 | AST | x 55.556 (9.0) <br> y 50.000 (10.0) | | |

(1) Example of the Invention

The first surface and the second surface are the extended toric surfaces, and the following table shows aspherical coefficients of the two surfaces. FIGS. 25 show aberration diagrams of this lens.

| Surface No. | Coefficient | Value of coefficient |
|---|---|---|
| 1 | $A_{4,1,0}$ | −2.00 E-6 |
| 1 | $A_{4,0,1}$ | −1.50 E-6 |
| 2 | $A_{4,1,0}$ | −1.88 E-6 |
| 2 | $A_{4,0,1}$ | −1.02 E-6 |
| 2 | $A_{6,1,0}$ | −3.10 E-9 |
| 2 | $A_{6,0,1}$ | −4.80 E-9 |
| 2 | $A_{8,1,0}$ | 6.31 E-13 |
| 2 | $A_{8,0,1}$ | 2.00 E-12 |
| 2 | $A_{10,0,1}$ | −4.00 E-16 |

(2) Prior Art Example

Figures 26A, 26B:
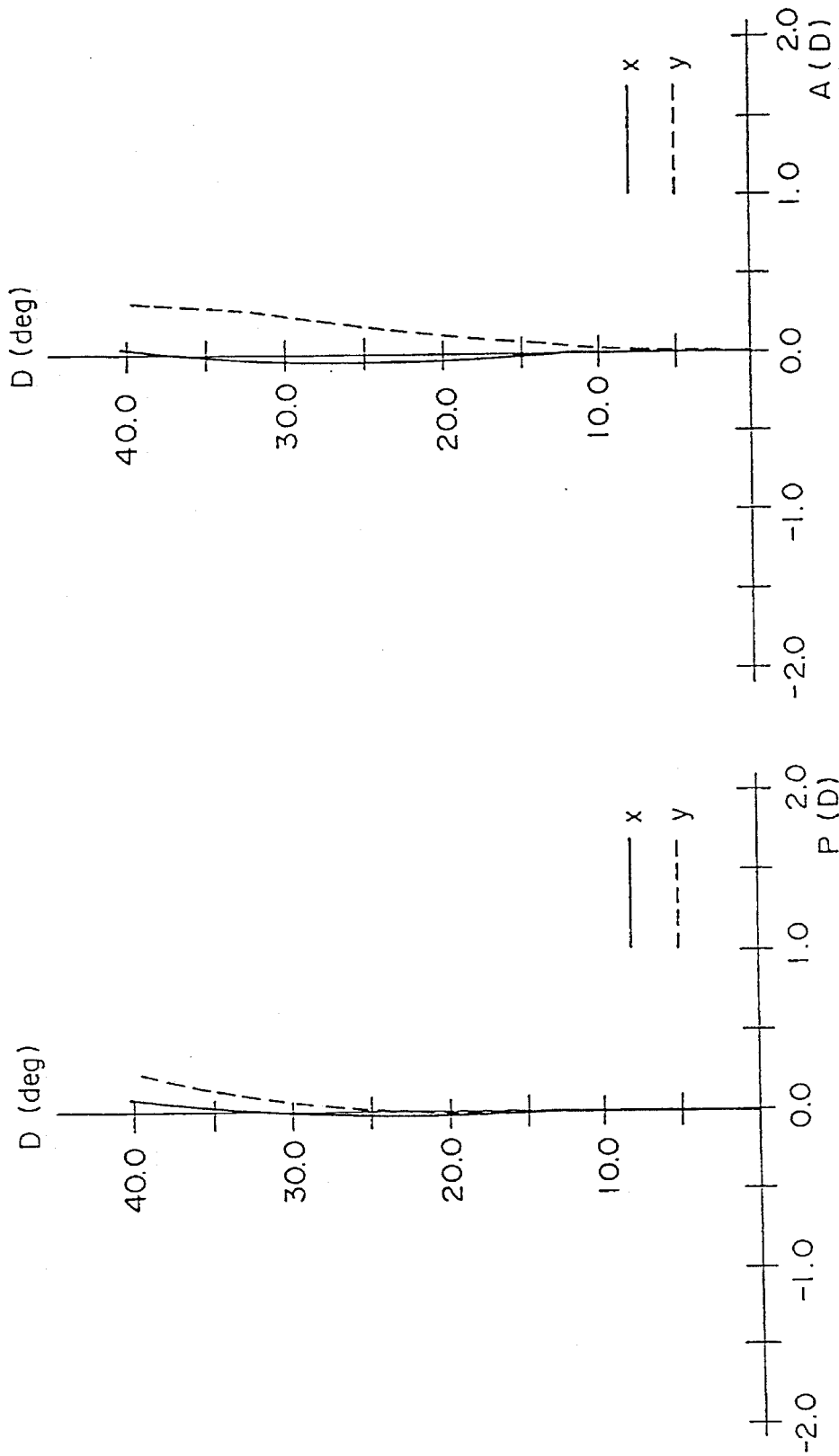
FIG. 26A is an aberration diagram to show a change of average power in a prior art example corresponding to Example 9.
FIG. 26B is an aberration diagram to show a change of astigmatism in the prior art example.

The first surface and the second surface are conventional toric surfaces. FIGS. 26 show aberration diagrams of this lens.

The below table shows optical characteristics in Examples 1 to 9 as described. In the below table the average power and the astigmatism are values at visual angle of 35- in each example. The center thickness of each positive lens in Example 2, 3, 6, 7, or 8 is so determined that the minimum edge thickness is 1 mm. For each of the negative lenses, a maximum edge thickness is listed instead of the center thickness (as given with *). The volume and the edge thickness are values when the lens diameter is 80 mm.

| Example No. | Lens | Ave. Power (D) X | Y | Astigmatism (D) X | Y | Ctr/Max Edge T | Vol. (CC) |
|---|---|---|---|---|---|---|---|
| 1 | Invent. | −0.31 | 0.06 | 0.08 | −0.04 | 10.0 | 34.1 |
| | Pr. Art | 0.36 | 0.41 | 1.18 | −0.26 | 10.0 | 35.1 |
| 2 | Invent. | −0.31 | 0.02 | 0.17 | −0.02 | 9.0 | 29.3 |
| | Pr. Art | 0.48 | 0.05 | 1.35 | −0.45 | 10.1 | 33.6 |
| 3 | Invent. | −0.41 | −0.02 | 0.20 | −0.01 | 8.9 | 28.8 |
| | Pr. Art | 0.83 | 0.29 | 2.20 | −0.09 | 9.7 | 31.7 |
| 4 | Invent. | 0.05 | 0.30 | −0.03 | 0.08 | *15.6 | 37.7 |
| | Pr. Art | −0.17 | −1.54 | −0.16 | 0.99 | *16.0 | 38.3 |
| 5 | Invent. | 0.07 | 0.15 | 0.01 | 0.08 | *12.4 | 34.2 |
| | Pr. Art | −0.59 | −0.45 | −0.84 | 0.73 | *16.0 | 37.4 |
| 6 | Invent. | −0.25 | −0.02 | 0.14 | 0.04 | 6.7 | 18.8 |
| | Pr. Art | −0.25 | −0.16 | 0.39 | 0.27 | 9.6 | 32.1 |
| 7 | Invent. | −0.38 | −0.02 | 0.31 | −0.15 | 7.2 | 21.5 |
| | Pr. Art | −0.13 | −0.53 | 0.91 | 0.79 | 8.8 | 28.7 |
| 8 | Invent. | −0.25 | −0.10 | 0.09 | −0.04 | 6.3 | 17.2 |
| | Pr. Art | 0.89 | 0.54 | 2.09 | −0.39 | 9.7 | 31.9 |
| 9 | Invent. | 0.08 | 0.21 | −0.04 | 0.06 | *8.7 | 28.3 |
| | Pr. Art | 0.04 | 0.15 | −0.03 | 0.31 | *18.3 | 40.5 |

As also apparent from the above table, all lenses in the examples of the present invention have aberrations within 0.41D, and therefore have excellent optical performance. In all the examples of the invention, the center thickness or the maximum edge thickness is reduced as well as the volume, which is effective to improve appearance and wearing feeling of user.

Figure 27B:
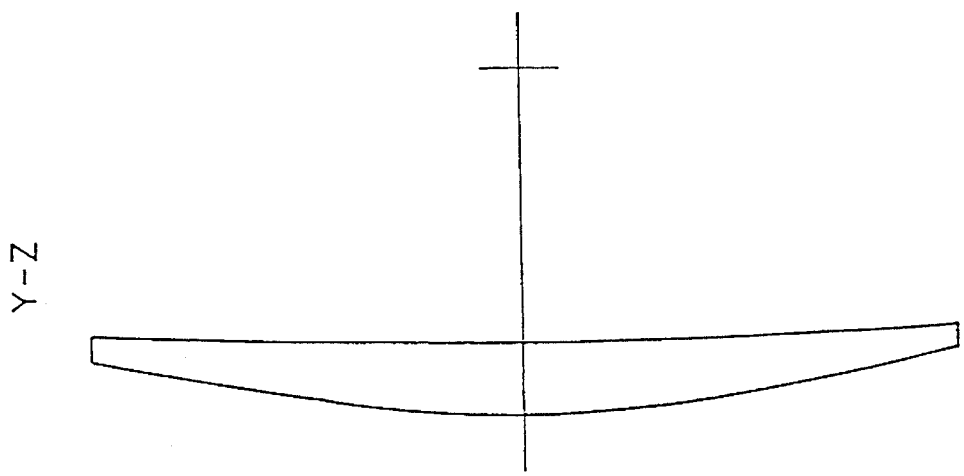
FIG. 27B is a vertical cross section of the lens on the YZ plane.
Figure 27A:
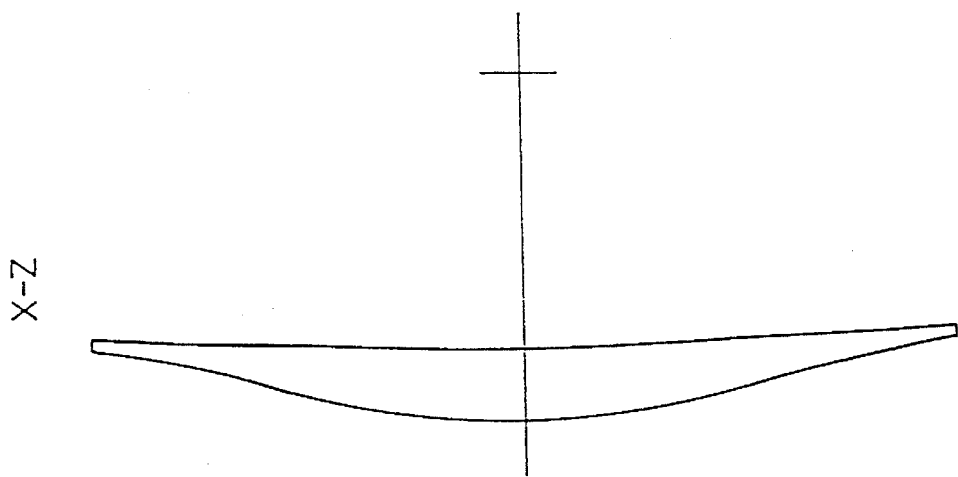
FIG. 27A is a vertical cross section of the lens in Example 6 on the XZ plane.
Figure 28B:
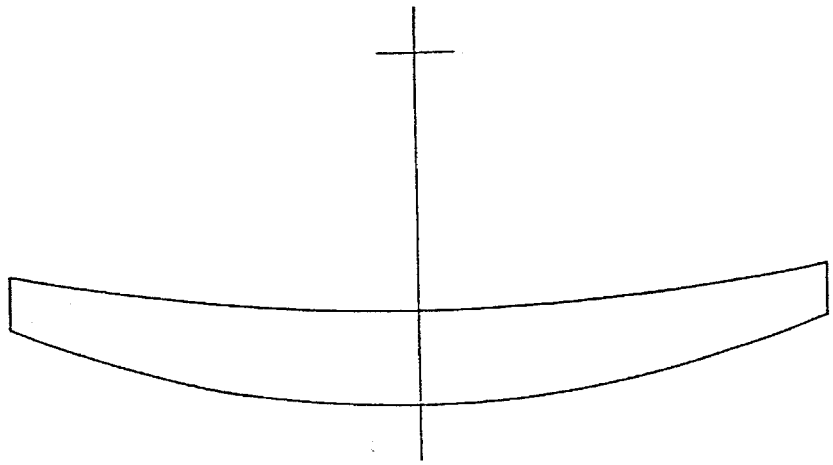
FIG. 28B is a vertical cross section of the lens on the YZ plane.
Figure 28A:
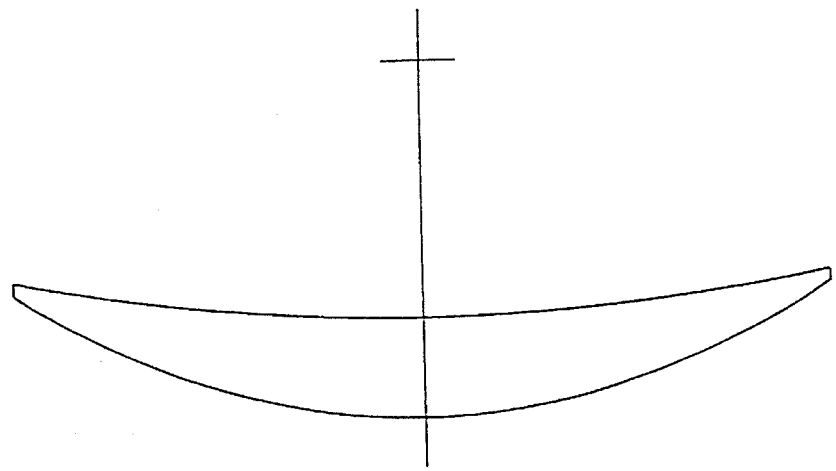
FIG. 28A is a vertical cross section of the lens in the prior art example corresponding to Example 6, on the XZ plane.
Figure 29A:
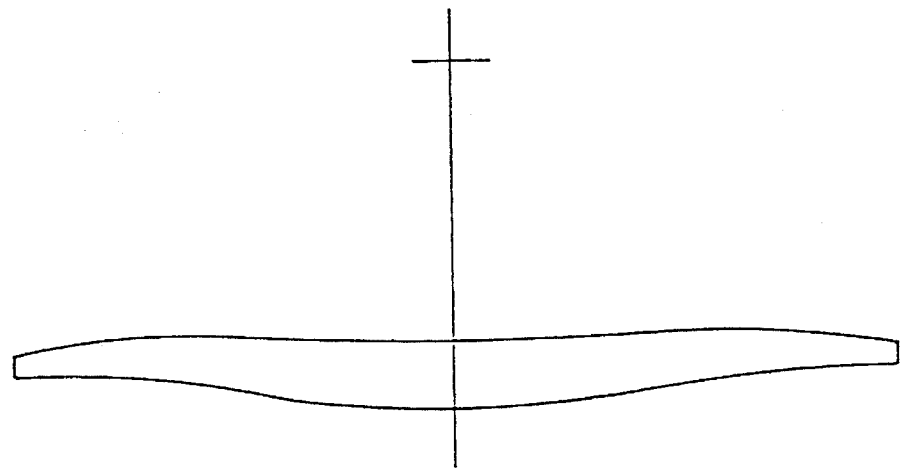
FIG. 29A is a vertical cross section of the lens in Example 8 on the XZ plane.
Figure 29B:
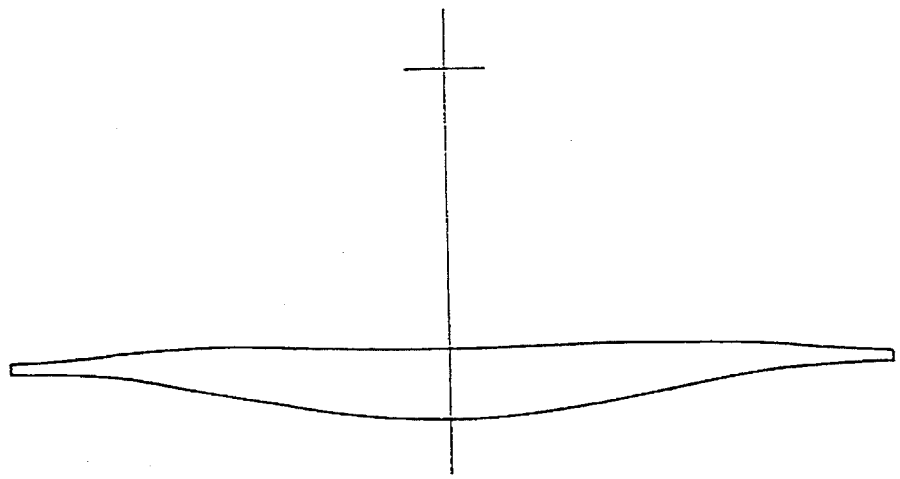
FIG. 29B is a vertical cross section of the lens on the YZ plane.
Figure 30B:
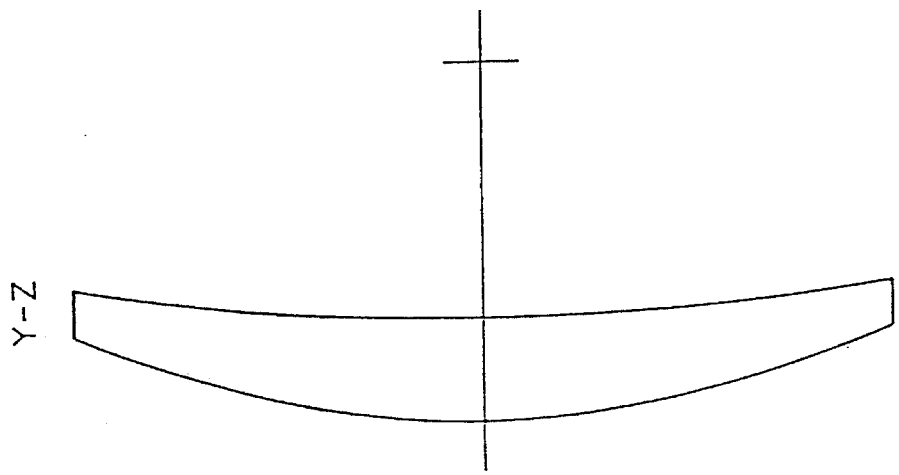
FIG. 30B is a vertical cross section of the lens on the YZ plane.
Figure 30A:
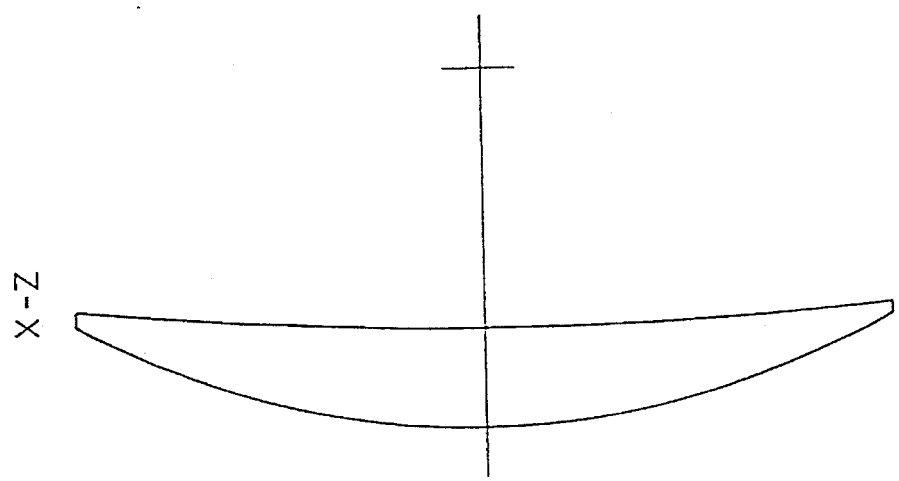
FIG. 30A is a vertical cross section of the lens in the prior art example corresponding to Example 8, on the XZ plane.
Figure 31B:
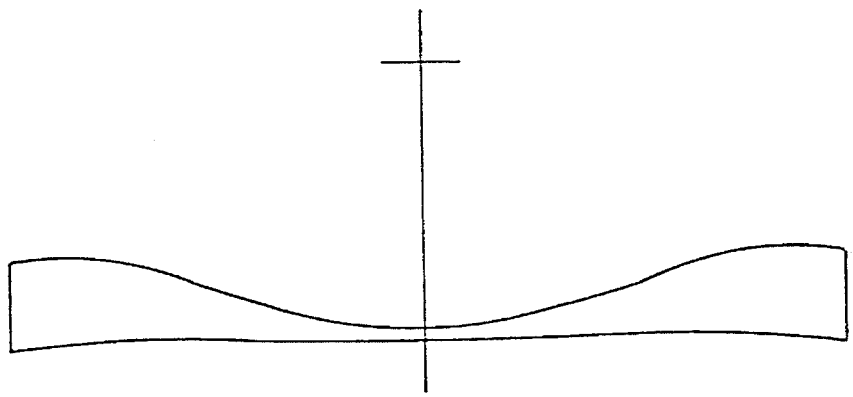
FIG. 31B is a vertical cross section of the lens on the YZ plane.
Figure 31A:
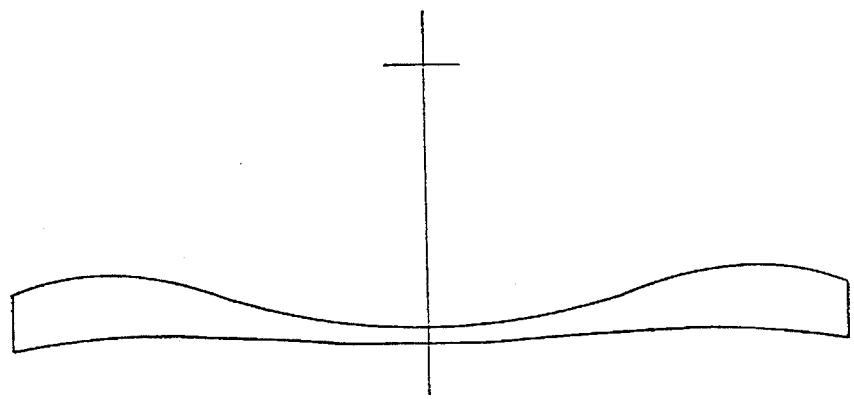
FIG. 31A is a vertical cross section of the lens in Example 9 on the XZ plane.
Figure 32B:
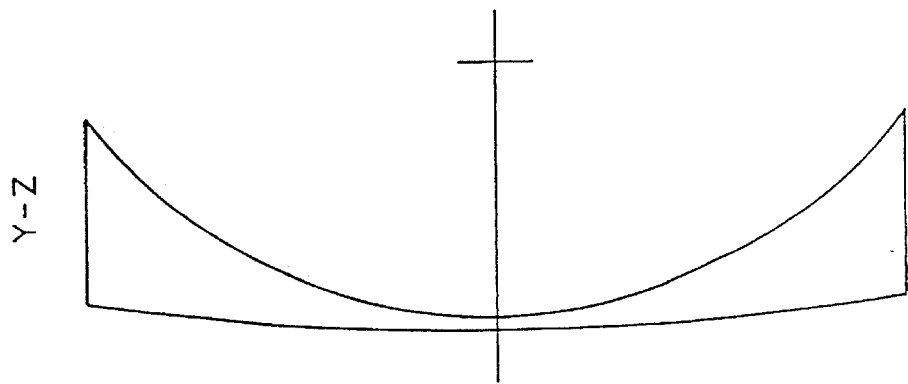
FIG. 32B is a vertical cross section of the lens on the YZ plane.
Figure 32A:
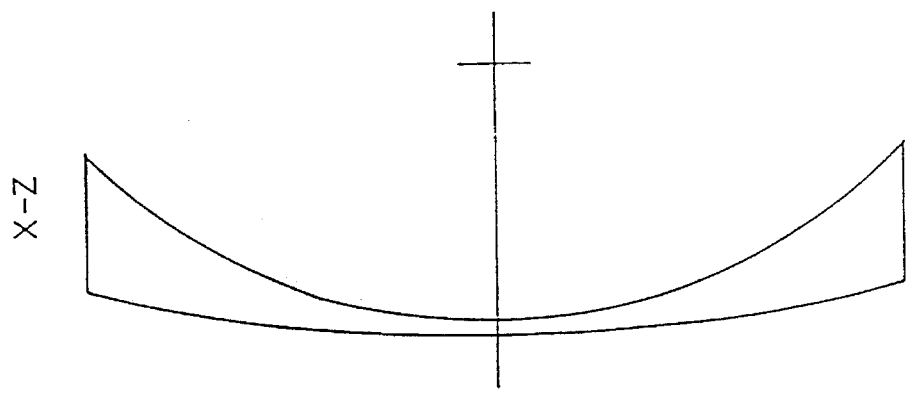
FIG. 32A is a vertical cross section of the lens in the prior art example corresponding to Example 9, on the XZ plane.

Specifically, in Example 6 of combination with axially symmetric aspherical surface and in Example 8 with the both surfaces being the extended toric surfaces, a great volume reduction rate is achieved, i.e., 41% and 46%, respectively, which ensures the advantage of the present invention. For reference, figures are given to show cross sections of the lenses in Examples 6, 8, and 9 each showing a big difference of shape. FIGS. 27 show Example 6, FIGS. 28 the prior art example corresponding to Example 6, FIGS. 29 Example 8, FIGS. 30 the prior art example corresponding to Example 8, FIGS. 31 Example 9, and FIGS. 32 the prior art example corresponding to Example 9, each in cross section.

The above description concerns the single-focal lens, and the effects of the present invention may be enjoyed with progressive power lens.

EXAMPLE 10

A progressive power lens corresponding to claim 10 in which the first surface is a progressive surface and the second surface is an axially symmetric refracting surface. The following tables show prescription data and paraxial data common to the example of the present invention and a prior art example.

Prescription data of lens

| Prescription | Value |
|---|---|
| Far range power | 3.5 (D) |
| Additional power | 2.0 (D) |
| Astigmatic power | 0.0 (D) |
| Direction of astigmatism axis | 0° |

Paraxial data

| Surface No. | Type | Radius of curvature R (mm) (S) | Distance T (mm) | Index N |
|---|---|---|---|---|
| 1 | PRG | 83.333 (6.0) | 7.0 | 1.500 |
| 2 | ROL | x 200.000 (2.5) y 200.000 (2.5) | (7.0) | |

(In the above table PRG represents a progressive power surface and ROL an axially symmetric surface including a spherical surface in column of type of surface. R denotes a radius of curvature at origin.)

(1) Example of the Invention

Figure 33B:
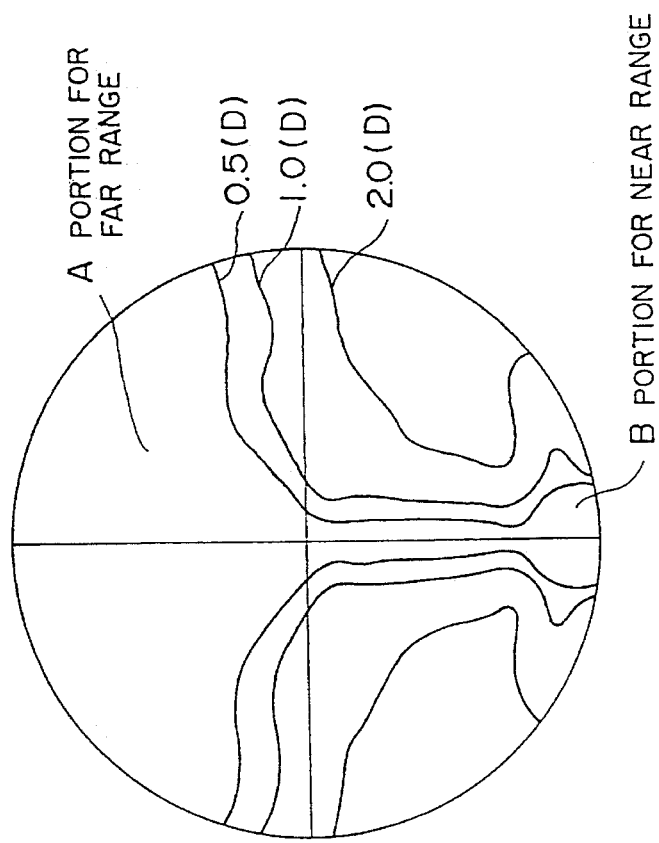
FIG. 33B is an iso-aberration curve diagram to show a change of astigmatism in the tenth example.
Figure 33A:
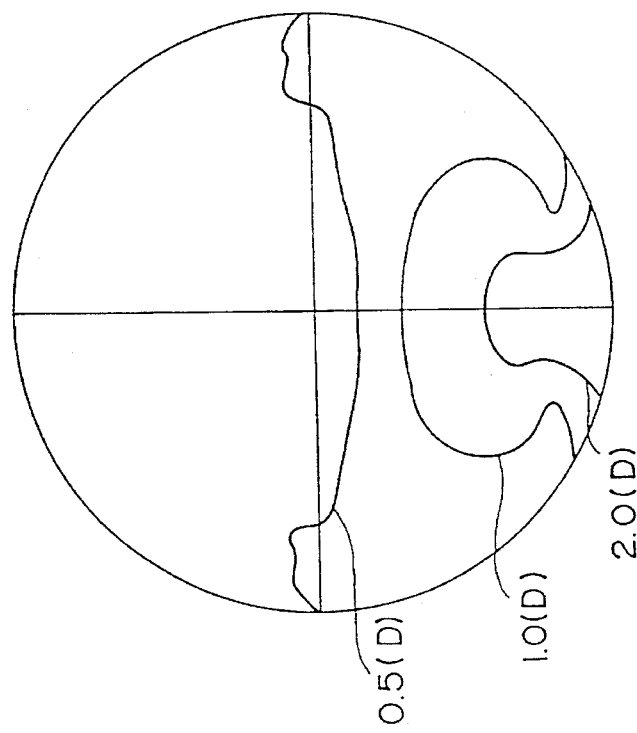
FIG. 33A is an iso-aberration curve diagram to show a change of average power in the tenth example of the present invention.

The axially symmetric surface of the second surface is an extended toric surface. In this example $K_x=K_y$ and $A_{n,1,0}=A_{n,0,1}$, so that the shape is axially symmetric, which coincides with the shape expressed by Equation (a). The following table shows aspherical coefficients of this lens, and FIGS. 33 show aberration diagrams thereof.

| Surface No. | Coefficient | Value of coefficient |
|---|---|---|
| 2 | $A_{4,1,0}$ | 5.121 E-7 |
| 2 | $A_{4,0,1}$ | 5.121 E-7 |
| 2 | $A_{6,1,0}$ | −1.546 E-10 |
| 2 | $A_{6,0,1}$ | −1.546 E-10 |

(2) Prior Art Example

Figure 34B:
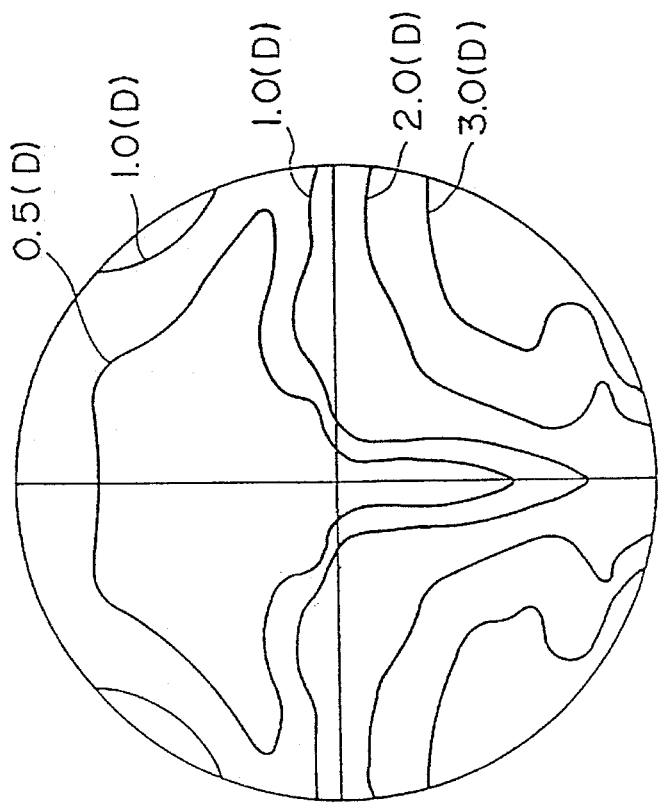
FIG. 34B is an iso-aberration curve diagram to show a change of astigmatism in the prior art example.
Figure 34A:
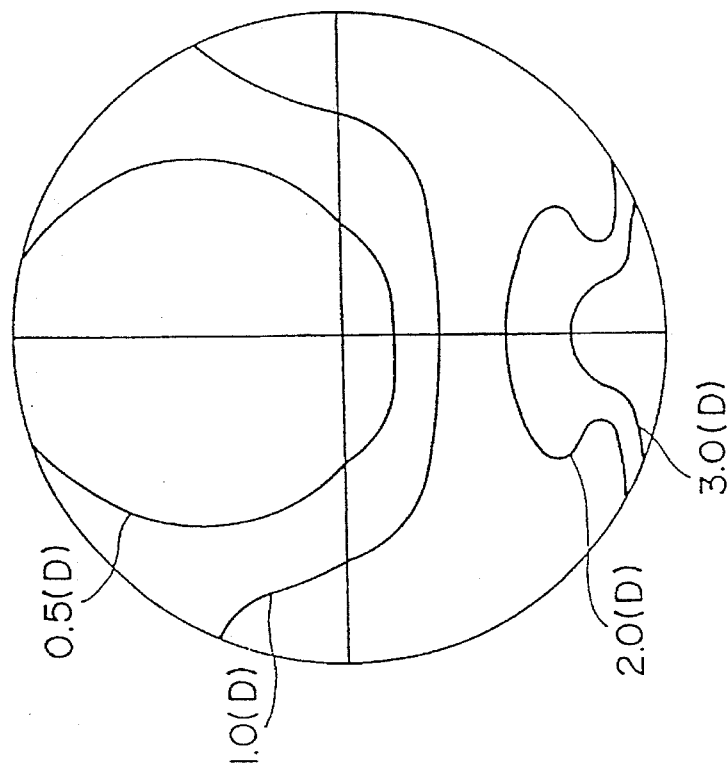
FIG. 34A is an iso-aberration curve diagram to show a change of average power of the lens in a prior art example corresponding to Example 10.

The axially symmetric surface of the second surface is a spherical surface. FIGS. 34 show aberration diagrams. (In aberration diagrams a figure denoted by A shows an iso-aberration curve of average power and a figure denoted by B an iso-aberration curve of astigmatism. A circle in each figure represents a range of visual angle of 40 degrees, and each curve represents a difference from the value at visual angle of 0 degree.)

EXAMPLE 11

A progressive power lens corresponding to claim 10 in which the first surface is a progressive power surface and the second surface is an extended toric surface. The following tables show prescription data and paraxial data common to the example of the present invention and a prior art example.

Prescription Data of Lens

| Prescription | Value |
|---|---|
| Far range power | 0.5 (D) |
| Additional power | 2.0 (D) |
| Astigmatic power | 3.0 (D) |
| Direction of astigmatism axis | 30.0° |

Paraxial Data

| Surface No. | Type | Radius of curvature R (mm) (S) | Distance T (mm) | Index N |
|---|---|---|---|---|
| 1 | PRG | 83.333 (6.0) | 7.0 | 1.500 |
| 2 | AST | x 90.909 (5.5) y 200.000 (2.5) | (7.0) | |

(In the above table AST represents an astigmatic surface in column of type of surface.)

(1) Example of the Invention

Figure 35B:
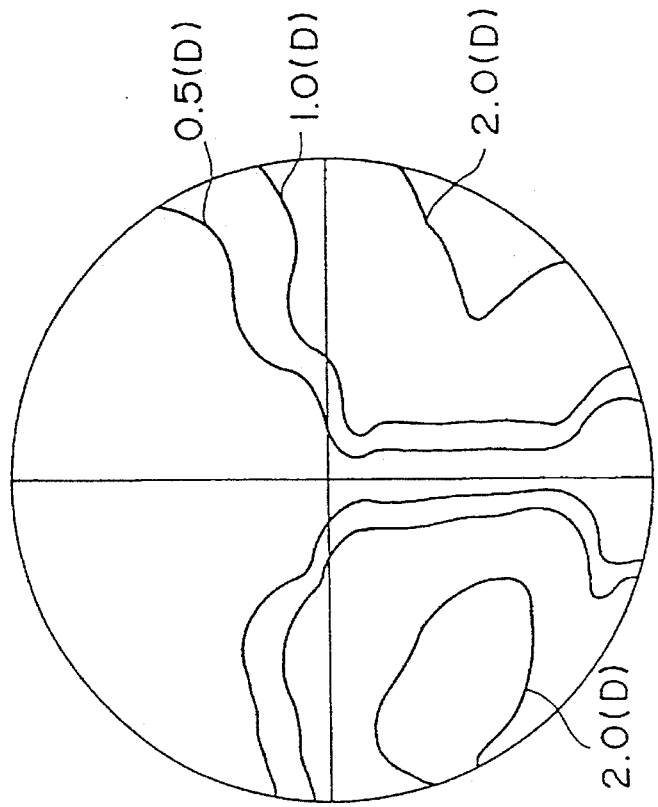
FIG. 35B is an iso-aberration curve diagram to show a change of astigmatism of the lens.
Figure 35A:
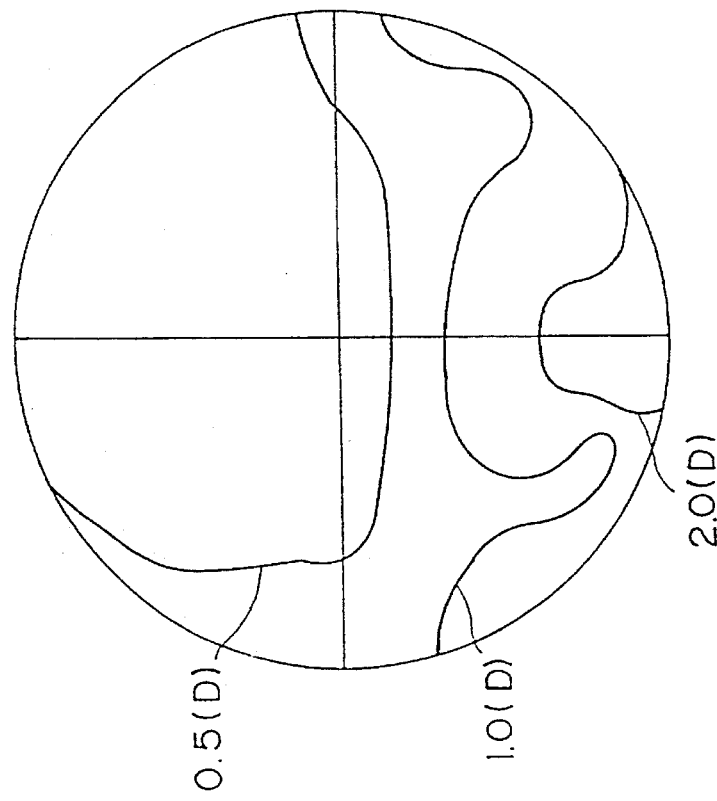
FIG. 35A is an iso-aberration curve diagram to show a change of average power of a lens in the eleventh example of the present invention.

The second surface is the extended toric surface, the following table shows aspherical coefficients of the second surface, and FIGS. 35 show aberration diagrams.

| Surface No. | Coefficient | Value of coefficient |
|---|---|---|
| 2 | $A_{4,1,0}$ | 6.300 E-9 |
| 2 | $A_{4,0,1}$ | 7.847 E-7 |
| 2 | $A_{6,1,0}$ | −4.135 E-10 |
| 2 | $A_{6,0,1}$ | −3.927 E-10 |
| 2 | $A_{8,1,0}$ | −5.564 E-15 |
| 2 | $A_{8,0,1}$ | 1.217 E-13 |

(2) Prior Art Example

Figures 36A, 36B:
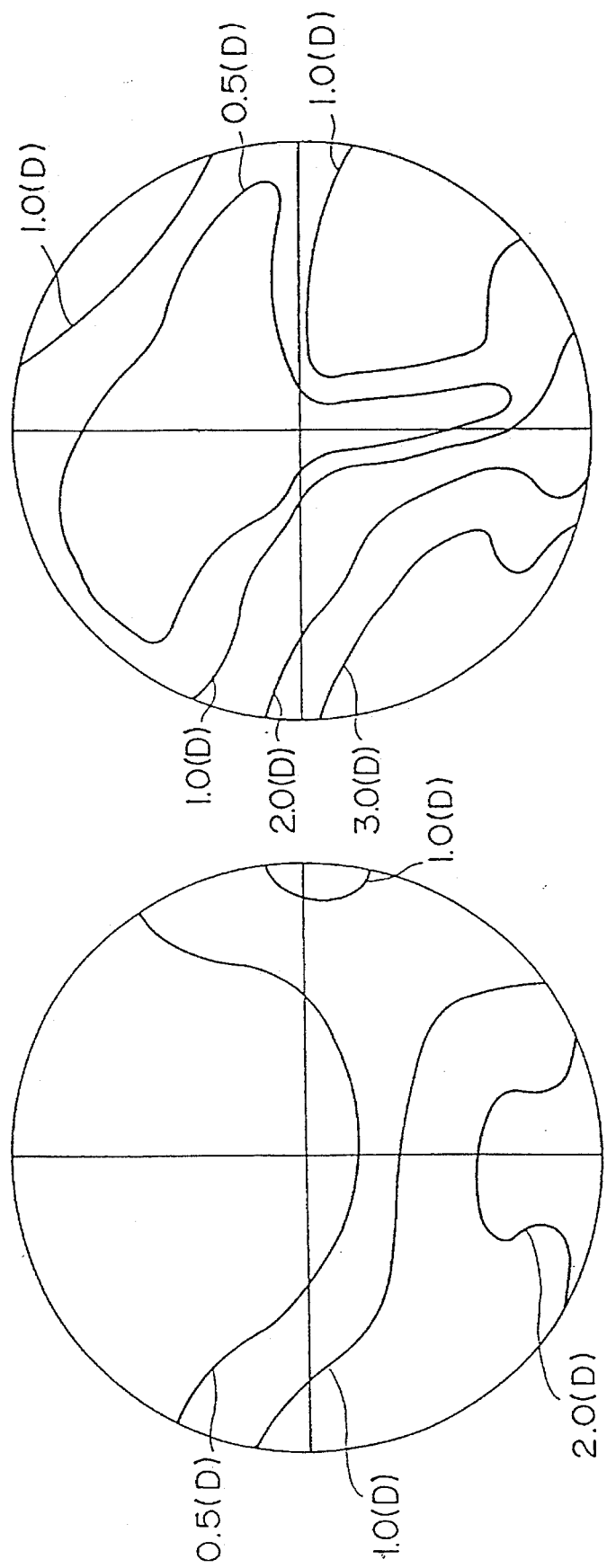
FIG. 36A is an iso-aberration curve diagram to show a change of average power of a lens in a prior art example corresponding to Example 11.
FIG. 36B is an iso-aberration curve diagram to show a change of astigmatism of the lens.

The astigmatic surface of the second surface is a conventional toric surface. FIGS. 36 show aberration diagrams.

EXAMPLE 12

A progressive lens corresponding to claim 10 in which the first surface is an axially symmetric refracting surface and the second power surface is a progressive surface. The following tables show prescription data and paraxial data common to the example of the present invention and a prior art example.

Prescription data of lens

| Prescription | Value |
|---|---|
| Far range power | −6.0 (D) |
| Additional power | 2.0 (D) |
| Astigmatic power | 0.0 (D) |
| Direction of astigmatism axis | 0° |

Paraxial data

| Surface No. | Type | Radius of curvature R (mm) (S) | Distance T (mm) | Index N |
|---|---|---|---|---|
| 1 | ROL | x infinite (0.0) y infinite (0.0) | 1.5 (1.5) | 1.500 |
| 2 | PRG | 83.333 (6.0) | | |

(1) Example of the Invention

Figure 37B:
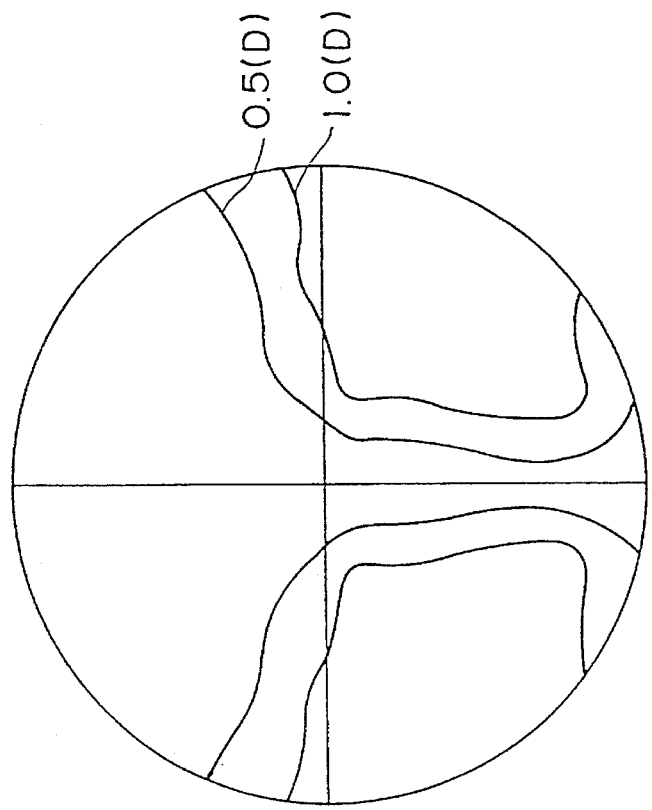
FIG. 37B is an iso-aberration curve diagram to show a change of astigmatism of the lens.
Figure 37A:
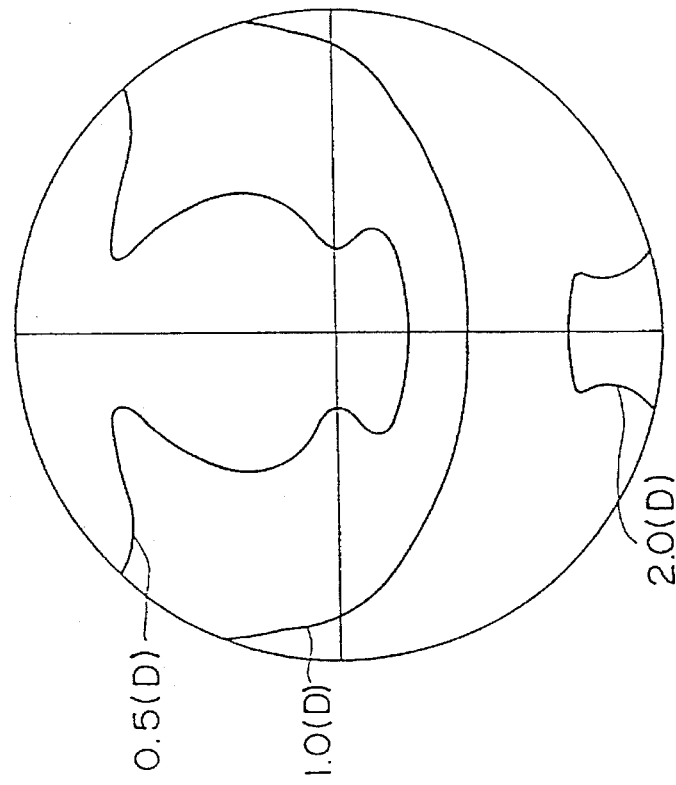
FIG. 37A is an iso-aberration curve diagram to show a change of average power of a lens in the twelfth example of the present invention.

The axially symmetric surface of the first surface is the extended toric surface. In this example $K_x=K_y$ and $A_{n,1,0}=A_{n,0,1}$, so that the shape is axially symmetric, which coincides with the shape expressed by Equation (a). The following table shows aspherical coefficients of this lens, and FIGS. 37 show aberration diagrams.

| Surface No. | Coefficient | Value of coefficient |
|---|---|---|
| 1 | $A_{4,1,0}$ | 1.977 E-9 |
| 1 | $A_{4,0,1}$ | 1.977 E-9 |
| 1 | $A_{6,1,0}$ | 3.275 E-10 |
| 1 | $A_{6,0,1}$ | 3.275 E-10 |
| 1 | $A_{8,1,0}$ | −1.396 E-13 |
| 1 | $A_{8,0,1}$ | −1.396 E-13 |

(2) Prior Art Example

Figure 38B:
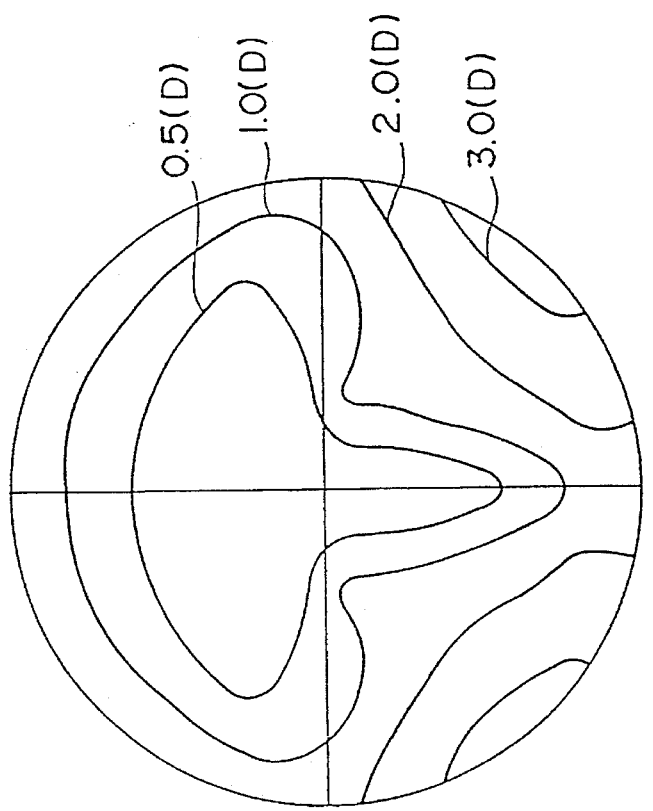
FIG. 38B is an iso-aberration curve diagram to show a change of astigmatism of the lens.
Figure 38A:
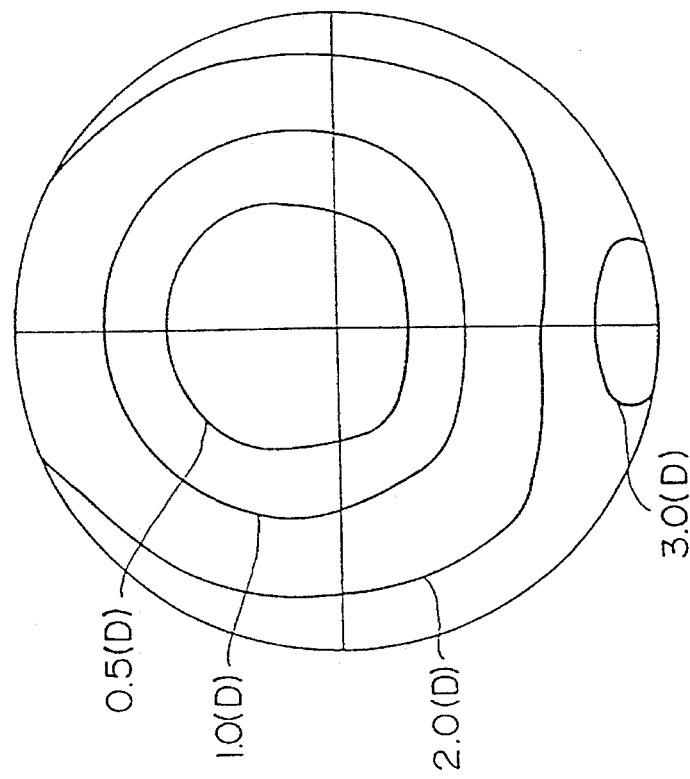
FIG. 38A is an iso-aberration curve diagram to show a change of average power of a prior art lens corresponding to Example 12.

The axially symmetric surface of the first surface is a spherical surface. FIGS. 38 show aberration diagrams.

EXAMPLE 13

A progressive power lens corresponding to claim 10 in which the first surface is an extended toric surface and the second surface is a progressive surface. The following tables show prescription data and paraxial data common to the example of the present invention and a prior art example.

Prescription data of lens

| Prescription | Value |
| --- | --- |
| Far range power | −2.0 (D) |
| Additional power | 1.5 (D) |
| Astigmatic power | −4.0 (D) |
| Direction of astigmatism axis | 50.0° |

Paraxial data

| Surface No. | Type | Radius of curvature R (mm) (S) | Distance T (mm) | Index N |
| --- | --- | --- | --- | --- |
| 1 | AST | x 125.000 (4.0) y infinite (0.0) | 1.5 (1.5) | 1.500 |
| 2 | PRG | 83.333 (6.0) | | |

(1) Example of the Invention

Figure 39B:
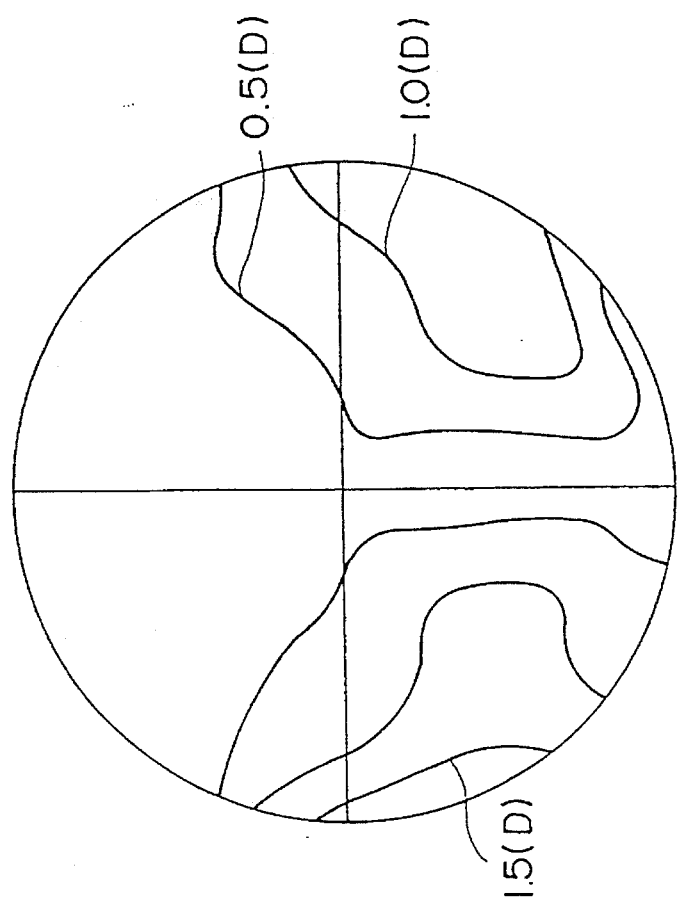
FIG. 39B is an iso-aberration curve diagram to show a change of astigmatism of the lens.
Figure 39A:
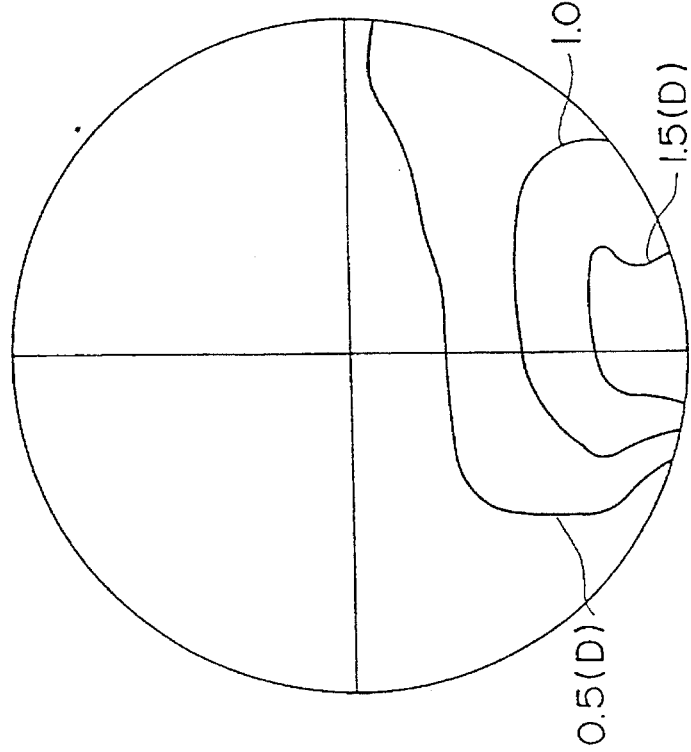
FIG. 39A is an iso-aberration curve diagram to show a change of average power of a lens in the thirteenth example of the present invention.

The first surface is the extended toric surface, the following table shows aspherical coefficients of the first surface, and odd numbers are also employed for n in this example. FIGS. 39 show aberration diagrams.

| Surface No. | Coefficient | Value of coefficient |
| --- | --- | --- |
| 1 | $A_{3,1,0}$ | 4.477 E-9 |
| 1 | $A_{3,0,1}$ | 7.701 E-6 |
| 1 | $A_{4,1,0}$ | −5.787 E-11 |
| 1 | $A_{4,0,1}$ | −2.318 E-9 |
| 1 | $A_{5,1,0}$ | 9.742 E-12 |
| 1 | $A_{5,0,1}$ | 1.805 E-12 |

(1) Prior Art Example

Figures 40A, 40B:
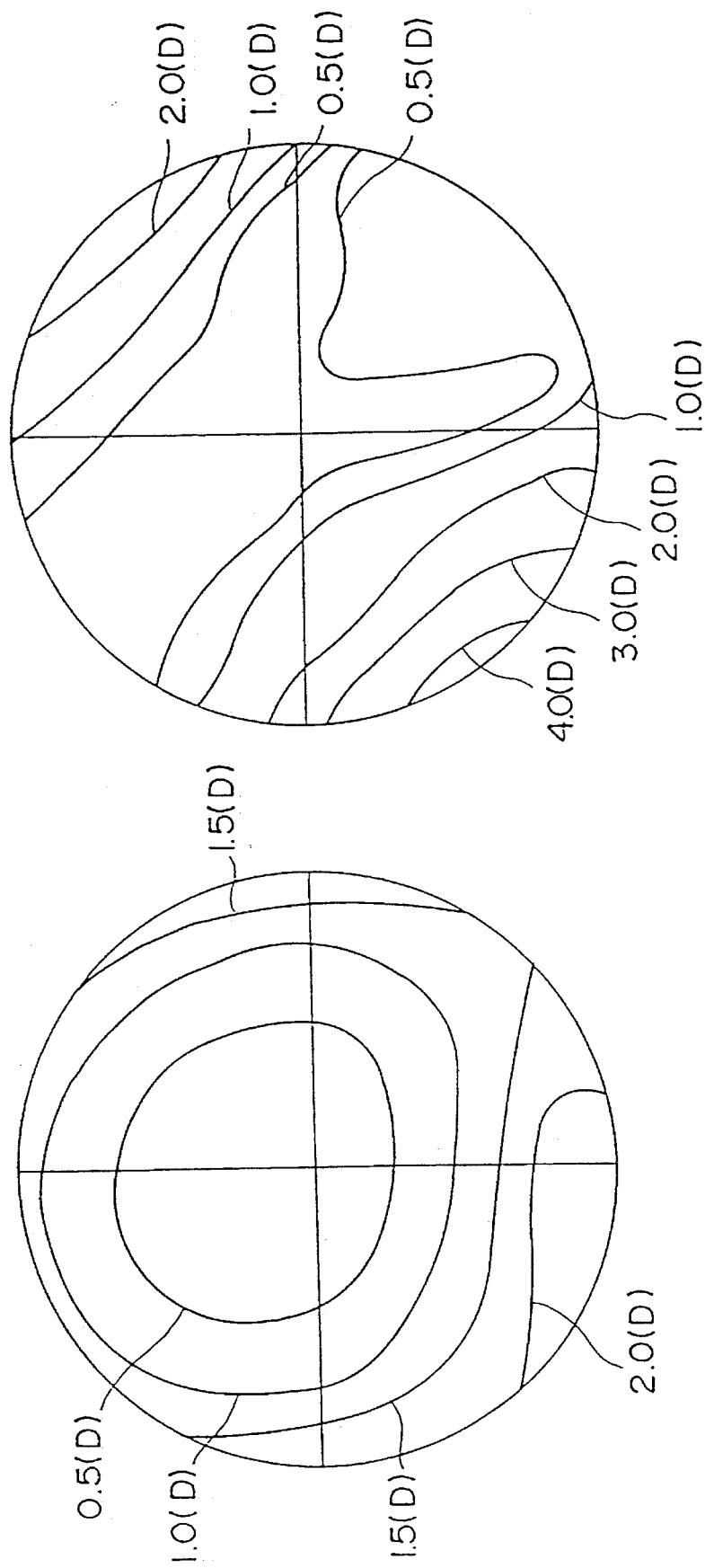
FIG. 40A is an iso-aberration curve diagram to show a change of average power of a prior art lens corresponding to Example 13.
FIG. 40B is an iso-aberration curve diagram to show a change of astigmatism of the lens.

The astigmatic surface of the first surface is a conventional toric surface. FIGS. 40 show aberration diagrams.

EXAMPLE 14

A negative lens corresponding to claim 10 in which the first surface is an extended toric surface and the second surface is a progressive surface.

The following tables show prescription data and paraxial data common to the example of the present invention and a prior art example.

Prescription data of lens

| Prescription | Value |
| --- | --- |
| Far range power | −3.0 (D) |
| Additional power | 0.5 (D) |
| Astigmatic power | −2.0 (D) |
| Direction of astigmatism axis | 0° |

Paraxial data

| Surface No. | Type | Radius of curvature R (mm) (S) | Distance T (mm) | Index N |
| --- | --- | --- | --- | --- |
| 1 | AST | x 125.000 (2.0) y infinite (0.0) | 1.5 (1.5) | 1.500 |
| 2 | PRG | 100.000 (5.0) | | |

(1) Example of the Invention

Figure 41B:
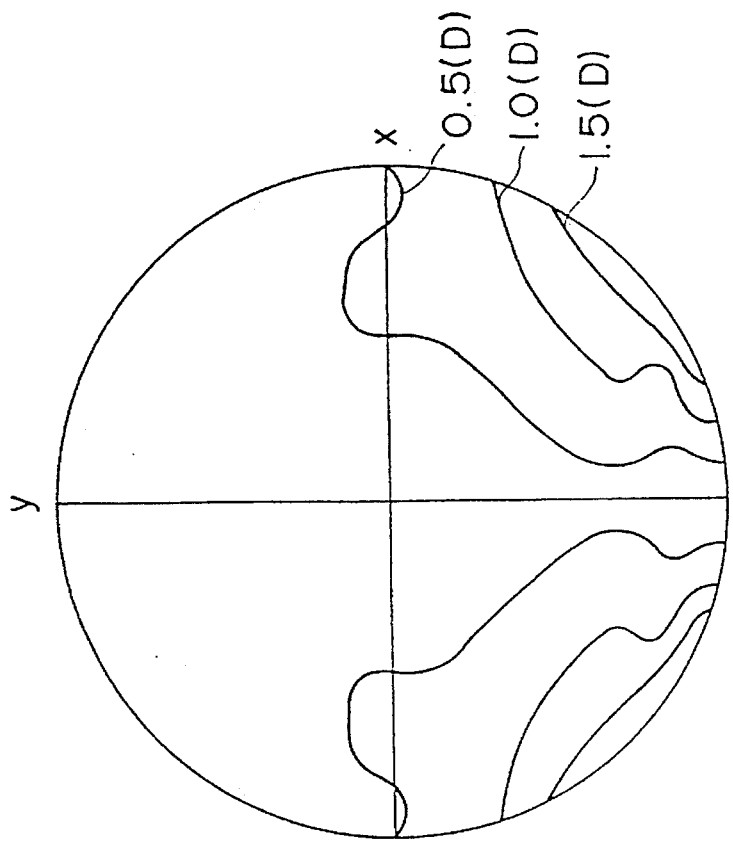
FIG. 41B is an iso-aberration curve diagram to show a change of astigmatism of the lens.
Figure 41A:
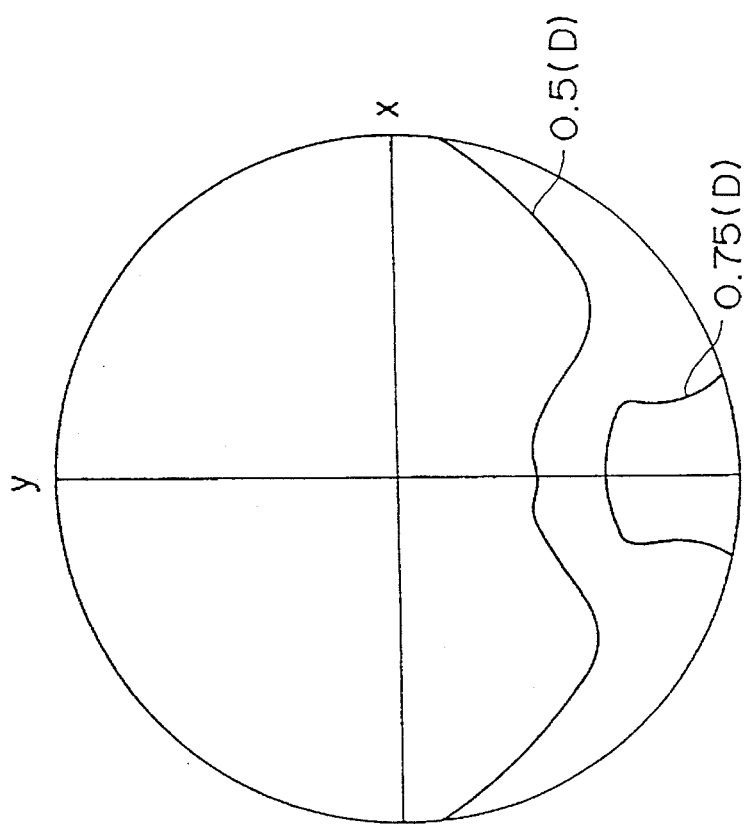
FIG. 41A is an iso-aberration curve diagram to show a change of average power of a lens in the fourteenth example of the present invention.

The first surface is the extended toric surface, and the following table shows aspherical coefficients of the first surface. FIGS. 41 show aberration diagrams.

| Surface No. | Coefficient | Value of coefficient |
| --- | --- | --- |
| 1 | $A_{2,1,0}$ | 1.15 E-7 |
| 1 | $A_{2,0,1}$ | −1.18 E-7 |
| 1 | $A_{3,1,0}$ | 1.17 E-10 |
| 1 | $A_{3,0,1}$ | 1.57 E-9 |
| 1 | $A_{4,1,0}$ | −2.07 E-14 |
| 1 | $A_{4,0,1}$ | −1.31 E-12 |

(2) Prior Art Example

Figure 42B:
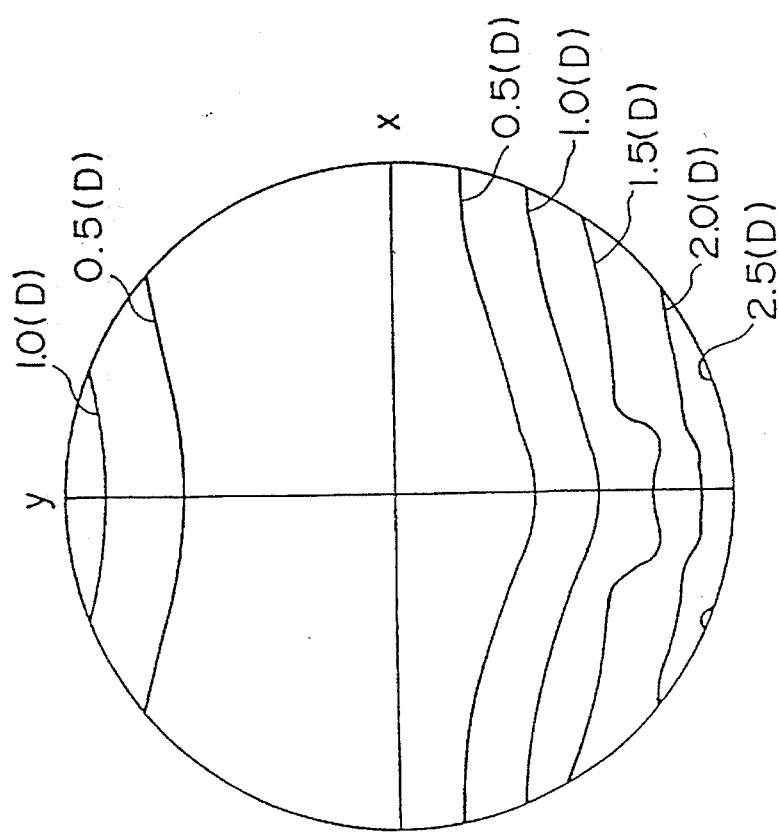
FIG. 42B is an iso-aberration curve diagram to show a change of astigmatism of the lens.
Figure 42A:
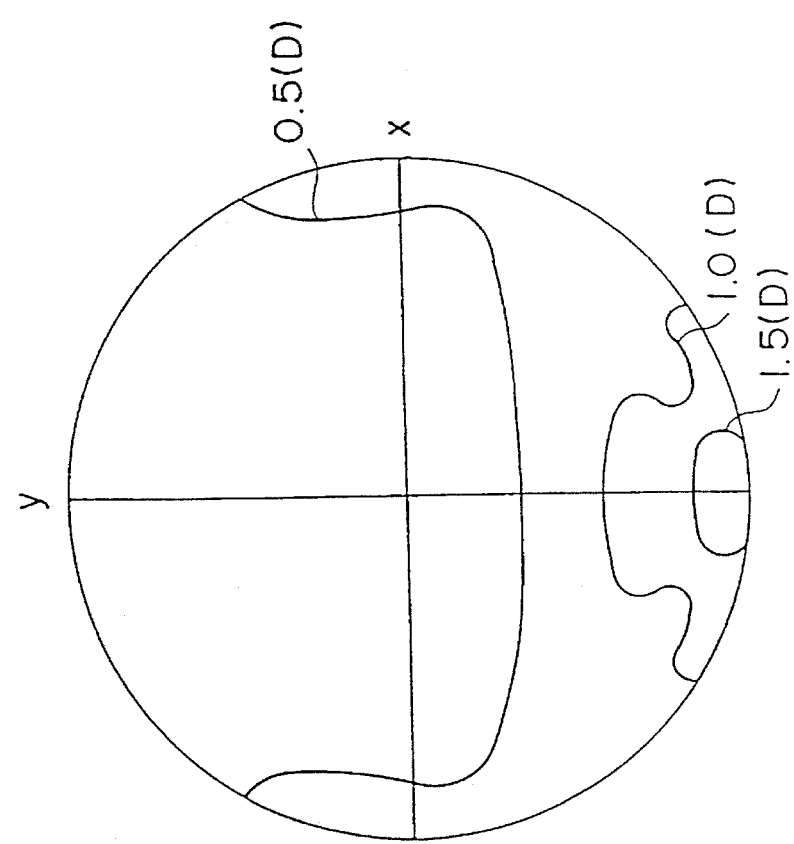
FIG. 42A is an iso-aberration curve diagram to show a change of average power of a prior art lens corresponding to Example 14.

The astigmatic surface of the first surface is a conventional toric surface. FIGS. 42 show aberration diagrams of this lens.

EXAMPLE 15

A positive lens corresponding to claim 10 in which the first surface is a progressive surface and the second surface is an extended toric surface.

The following tables show prescription data and paraxial data common to the example of the present invention and a prior art example.

Prescription data of lens

| Prescription | Value |
| --- | --- |
| Far range power | 1.0 (D) |
| Additional power | 0.75 (D) |
| Astigmatic power | 2.0 (D) |
| Direction of astigmatism axis | 0° |

Paraxial data

| Surface No. | Type | Radius of curvature R (mm) (S) | Distance T (mm) | Index N |
| --- | --- | --- | --- | --- |
| 1 | PRG | 100.000 (5.0) | 6.0 (6.0) | 1.500 |
| 2 | AST | x 125.000 (4.0) y 250.000 (2.0) | | |

(1) Example of the Invention

Figure 43B:
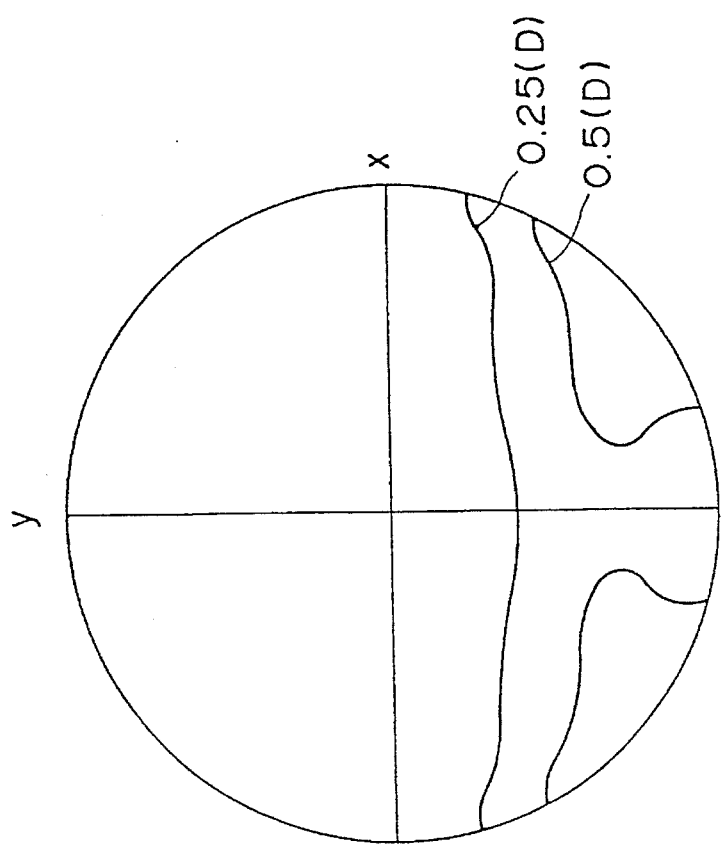
FIG. 43B is an iso-aberration curve diagram to show a change of astigmatism of the lens.
Figure 43A:
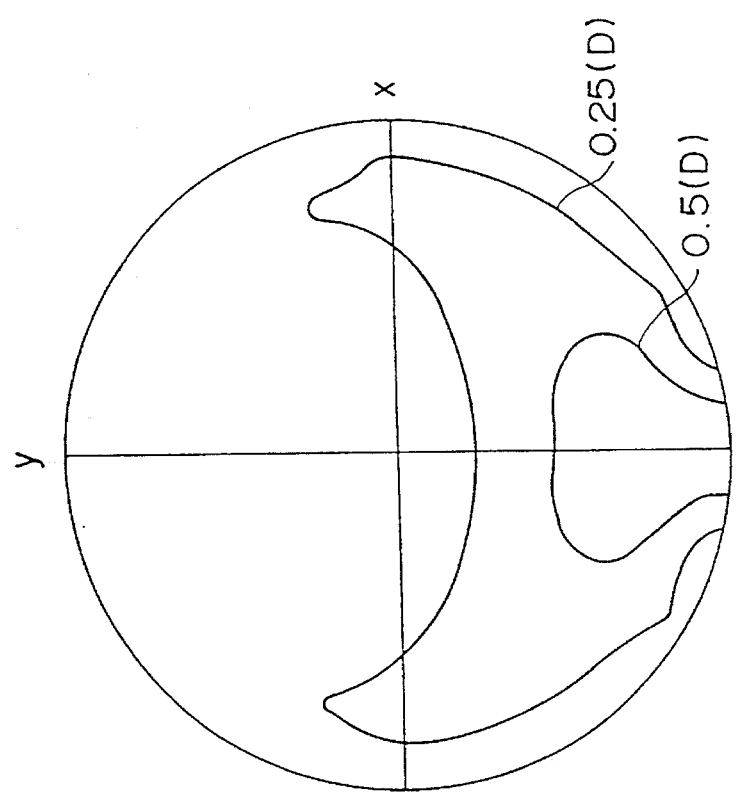
FIG. 43A is an iso-aberration curve diagram to show a change of average power of a lens in the fifteenth example of the present invention.

The second surface is the extended toric surface and the following table shows aspherical coefficients of the second surface. FIGS. 43 show aberration diagrams.

| Surface No. | Coefficient | Value of coefficient |
|---|---|---|
| 2 | $K_x$ | 1.72 |
| 2 | $A_{2,0,1}$ | 5.10 E-7 |
| 2 | $A_{3,1,0}$ | −2.26 E-9 |
| 2 | $A_{3,0,1}$ | −1.54 E-11 |
| 2 | $A_{4,1,0}$ | −1.46 E-13 |
| 2 | $A_{4,0,1}$ | −3.20 E-13 |

(2) Prior Art Example

Figure 44B:
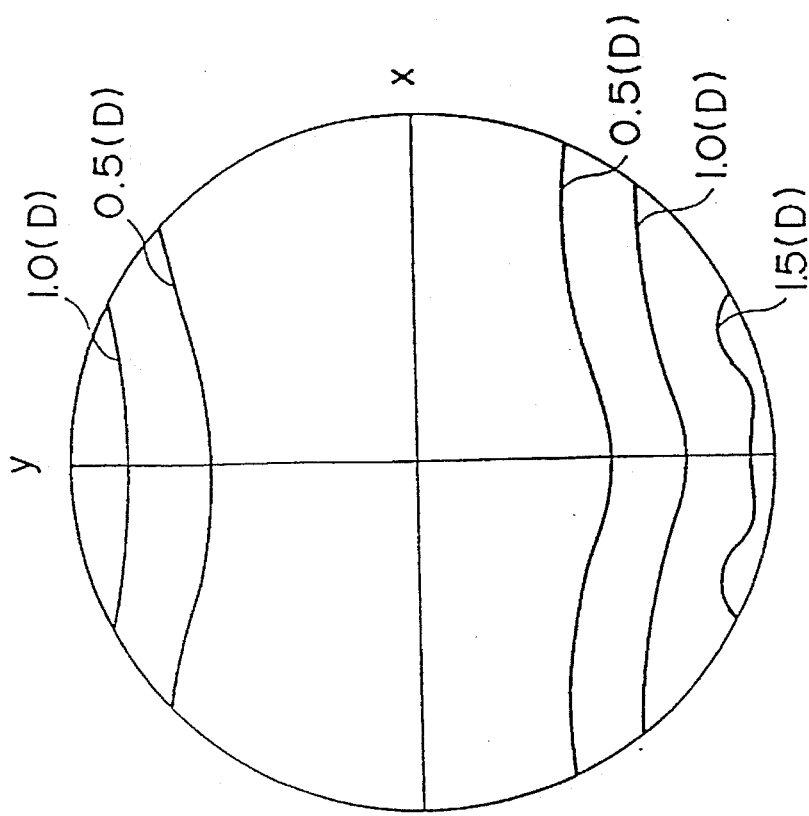
FIG. 44B is an iso-aberration curve diagram to show a change of astigmatism of the lens.
Figure 44A:
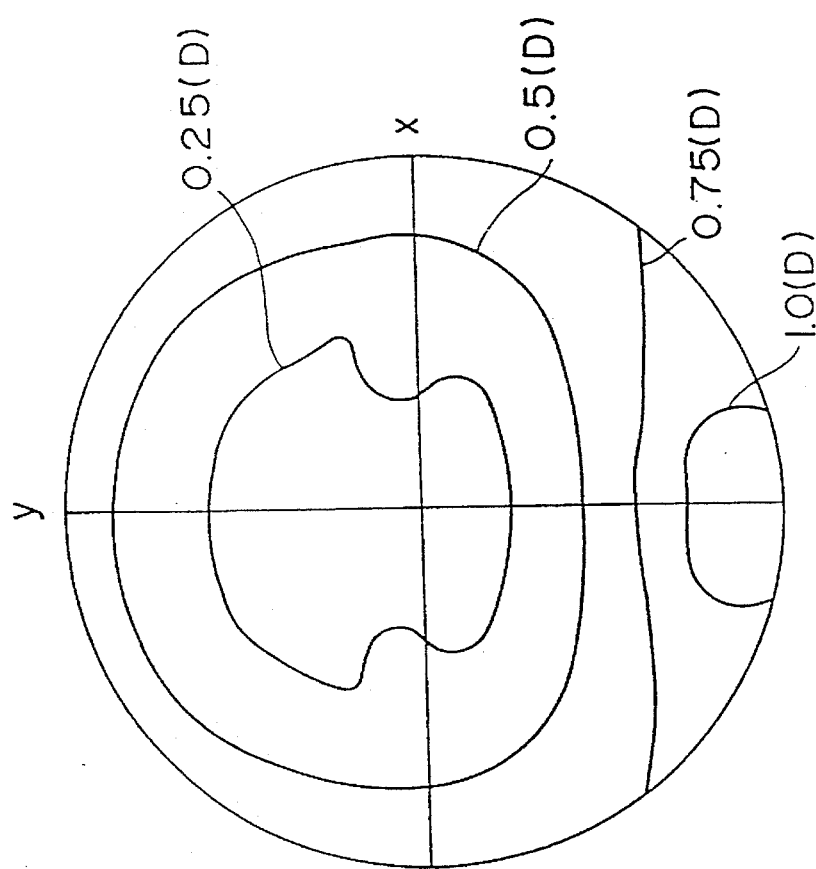
FIG. 44A is an iso-aberration curve diagram to show a change of average power of a prior art lens corresponding to Example 15.

The astigmatic surface of the second surface is a conventional toric surface. FIGS. 44 show aberration diagrams of this lens.

As seen in the examples as described, the portion for near range in each of the prior art examples has the astigmatism of not less than 1.0 (D), while that in each of the examples of the invention has the astigmatism within 0.5 (D), ensuring the effectiveness of the present invention.

Such aberration was conventionally untreated, because there was no means to correct the aberration. However, the aberration correction becomes possible by using the extended toric surface of the present invention.

Also, a multi-focal lens may be produced by combining some lenses as described and dividing the first surface or the second surface of lens into several zones each of which is made as a pseudo-toric surface. In this case, it is not necessary to employ the same coordinate axes to express the respective divided surfaces, for example one coordinate system may be moved in parallel or inclined to others. In such an arrangement the features of the invention such as excellent optical performance and excellent appearance may be maintained.

It is also possible to divide a lens into an upper half and a lower half, while effecting the aberration correction for far range on the upper half and the aberration correction for near range on the lower half. In this arrangement, the X axis is taken in the horizontal direction, and common $C_x$, $K_x$ and $A_{n,1,0}$ are used to the upper and lower surfaces, whereby the refracting surface may be smoothly connected at the border. Since the slope of surface is continuous, there is no step in image, and a user even recognizes no border at all, though the lens is aberration-corrected with respect to an object distance in the upper half different from that in the lower half.

As described, an optimum lens to any user can be freely designed by using the extended toric surface.

Industrial Application

The eyeglass lens according to the present invention is suitable for application to a lens for correcting astigmatism, and also applicable to a lens for correcting nearsightedness or for long-distance glasses.

We claim:

1. An eyeglass lens at least one surface of which is a refracting surface arranged such that two coordinate axes X and Y are set to contact with the refracting surface at a determined point thereon while directions of the coordinate axes and an XY plane including the two axes are determined, that a perpendicular line is dropped toward the XY plane from an arbitrary point on the refracting surface, and then X, Y coordinates of an intersecting point between the perpendicular line and the XY plane are denoted by x and y, respectively, and the length of the perpendicular line by z, and that a value of z is expressed as follows:

$$z = \frac{C_x x^2 + C_y y^2}{1 + \sqrt{1 - (1+K_x)C_x^2 x^2 - (1+K_y)C_y^2 y^2}} + \sum_n r^n \left\{ \sum_m \sum_j A_{n,m,j} \left(\frac{x^2}{r^2}\right)^m \left(\frac{y^2}{r^2}\right)^j \right\} \quad (1)$$

where $r^2 = x^2 + y^2$;

$C_x$, $C_y$, $K_x$, $K_y$, $A_{n,m,j}$ are constants to define the shape of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left| \sum_m A_{n,m,0} \right| \leq 10^{-n}, \quad (3)$$

$$\left| \sum_j A_{n,0,j} \right| \leq -10^{-n}, \quad (4)$$

which cannot be simultaneously zero.

2. An eyeglass lens according to claim 1, wherein the first surface and the second surface both are extended toric surfaces.

3. An eyeglass lens according to claim 1, wherein, out of the two refracting surfaces, one surface is a progressive power surface and the other surface is an extended toric surface comprising an axially symmetrical aspherical surface.

4. An eyeglass lens at least one surface of which is a refracting surface arranged such that two coordinate axes x and Y are set to contact with the refracting surface at a determined point thereon while directions of the coordinate axes and an XY plane including the two axes are determined, that a perpendicular line is dropped toward the XY plane from an arbitrary point on the refracting surface, and then X, Y coordinates of an intersecting point between the perpendicular line and the XY plane are denoted by x and y, respectively, and the length of the perpendicular line by z, and that a value of z is expressed as follows:

$$z = \frac{C_x x^2 + C_y y^2}{1 + \sqrt{1 - (1+K_x)C_x^2 x^2 - (1+K_y)C_y^2 y^2}} + \sum_m \sum_j B_{m,j} x^{2m} y^{2j} \quad (5)$$

where $C_x$, $C_y$, $K_x$, $K_y$, $B_{m,j}$ are constants to define the shape of lens;

m, j are integers satisfying conditions of $0 \leq m$, $0 \leq j$, and $1 \leq m+j$;

coefficients satisfy the following conditions:

$$|B_{m,j}| \leq 10^{-2(m+j)} \quad (6)$$

which cannot be simultaneously zero.

5. An eyeglass lens at least one surface of which is a refracting surface arranged such that two coordinate axes X and Y are set to contact with the refracting surface at a determined point thereon while directions of the coordinate axes and an XY plane including the two axes are determined, that a perpendicular line is dropped toward the XY plane from an arbitrary point on the refracting surface, and then X, Y coordinates of an intersecting point between the perpendicular line and the XY plane are denoted by x and y, respectively, and the length of the perpendicular line by z, and that a value of z is expressed as follows:

$$z = \frac{C_x x^2 + C_y y^2}{1 + \sqrt{1 - (1+K_x)C_x^2 x^2 - (1+K_y)C_y^2 y^2}} + \sum_n (D_n x^2 + E_n y^2) r^{n-2} \quad (7)$$

where $r^2 = x^2 + y^2$;

$C_x, C_y, K_x, K_y, D_n, E_n$ are constants to define the shape of lens;

n is an integer satisfying a condition of $2 \leq n$;

coefficients satisfy the following conditions:

$$|D_n| \leq 10^{-n} \quad (8),$$

$$|E_n| \leq 10^{-n} \quad (9),$$

which cannot be simultaneously zero.

6. An eyeglass lens in which a front refracting surface on the object side (as will be referred to as a first surface) is a refracting surface having a shape as expressed by Equation (1), (5), or (7)

$$z = \frac{C_x x^2 + C_y y^2}{1 + \sqrt{1 - (1+K_x)C_x^2 x^2 - (1+K_y)C_y^2 y^2}} + \sum_n r^n \left\{ \sum_m \sum_j A_{n,m,j} \left( \frac{x^2}{r^2} \right)^m \left( \frac{y^2}{r^2} \right)^j \right\} \quad (1)$$

where $r^2 = x^2 + y^2$;

$C_x, C_y, K_x, K_y, A_{n,m,j}$ are constants to define the shape of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left| \sum_m A_{n,m,0} \right| \leq 10^{-n}, \quad (3)$$

$$\left| \sum_j A_{n,0,j} \right| \leq -10^{-n}, \quad (4)$$

which cannot be simultaneously zero, $$z = \frac{C_x x^2 + C_y y^2}{1 + \sqrt{1 - (1+K_x)C_x^2 x^2 - (1+K_y)C_y^2 y^2}} + \sum_m \sum_j B_{m,j} x^{2m} y^{2j} \quad (5)$$

where $C_x, C_y, K_x, K_y, B_{m,j}$ are constants to define the shape of lens;

m, j are integers satisfying conditions of $0 \leq m$, $0 \leq j$, and $1 \leq m+j$;

coefficients satisfy the following conditions:

$$|B_{m,j}| \leq 10^{-2(m+j)} \quad (6),$$

which cannot be simultaneously zero), or $$z = \frac{C_x x^2 + C_y y^2}{1 + \sqrt{1 - (1+K_x)C_x^2 x^2 - (1+K_y)C_y^2 y^2}} + \sum_n (D_n x^2 + E_n y^2) r^{n-2} \quad (7)$$

where $r^2 = x^2 + y^2$;

$C_x, C_y, K_x, K_y, D_n, E_n$ are constants to define the shape of lens;

n is an integer satisfying a condition of $2 \leq n$;

coefficients satisfy the following conditions:

$$|D_n| \leq 10^{-n} \quad (8),$$

$$|E_n| \leq 10^{-n} \quad (9),$$

which cannot be simultaneously zero (as will be referred to as an extended toric surface) and a rear refracting surface on the eyeball side (as will be referred to as a second surface) is a spherical or toric surface, which has a positive refracting power defined as follows:

when the first surface is cut by a plane including the X axis and the Z axis a curve appearing in a cut surface has a radius of curvature $R1_x$ (mm) at the coordinate origin, and when the first surface is cut by a plane including the Y axis and the Z axis a curve appearing in a cut surface has a radius of curvature $R1_y$ (mm) at the coordinate origin;

similarly, when the second surface is cut by a plane including the X axis and the Z axis a curve appearing in a cut surface has a radius of curvature $R2_x$ (mm) at the coordinate origin, and when the second surface is cut by a plane including the Y axis and the Z axis a curve appearing in a cut surface has a radius of curvature $R2_y$ (mm) at the coordinate origin;

(where signs are determined as "+" when the curvature center is on the eyeball side with respect to the refracting surface and "−" when it is on the object side;)

an index of refraction of lens medium is N;

refracting powers of the first surface, $S1_x$ (Diopter as will be abbreviated as "D") and $S1_y$ (D), and refracting powers of the second surface, $S2_x$ (D) and $S2_y$ (D) are defined by the following equations:

$$S1_x = \frac{1000 \times (N-1)}{R1_x} ; \quad (10)$$

$$S1_y = \frac{1000 \times (N-1)}{R1_y} ; \quad (11)$$

$$S2_x = \frac{1000 \times (N-1)}{R2_x} ; \quad (12)$$

$$S2_y = \frac{1000 \times (N-1)}{R2_y} ; \quad (13)$$

in which max $$(S2_x, S2_y) \leq \min(S1_x, S1_y) \quad (14)$$

(where max (a, b) represents a larger one of a and b and min (a, b) is a smaller one of a and b);

and further in which, defining $G_x$ and $G_y$ as follows depending upon the representation equation of the extended toric surface of the lens:

$$G_x = \Sigma A_{4,m,0}, G_y = \Sigma A_{4,0,j} \quad (15); \text{ or}$$

$$G_x = B_{2,0}, G_y = B_{0,2} \quad (16); \text{ or}$$

$$G_x = D_4, G_y = E_4 \quad (17),$$

the following conditions are satisfied:

$$K_x + 8R1_x^3 G_x \leq 1.0 \quad (18);$$

$$K_y + 8R1_y^3 G_y \leq 1.0 \quad (19).$$

7. An eyeglass lens in which the first surface is a spherical or toric surface and the second surface is an extended toric surface as expressed by Equation (1), (5), or (7)

$$z = \frac{C_x x^2 + C_y y^2}{1 + \sqrt{1 - (1 + K_x) C_x^2 x^2 - (1 + K_y) C_y^2 y^2}} + \sum_n r^n \left\{ \sum_m \sum_j A_{n,m,j} \left(\frac{x^2}{r^2}\right)^m \left(\frac{y^2}{r^2}\right)^j \right\} \quad (1)$$

where $r^2 = x^2 + y^2$;

$C_x, C_y, K_x, K_y, A_{n,m,j}$ are constants to define the shape of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left| \sum_m A_{n,m,0} \right| \leq 10^{-n}, \quad (3)$$

$$\left| \sum_j A_{n,0,j} \right| \leq -10^{-n}, \quad (4)$$

which cannot be simultaneously zero, $$z = \frac{C_x x^2 + C_y y^2}{1 + \sqrt{1 - (1 + K_x) C_x^2 x^2 - (1 - K_y) C_y^2 y^2}} + \sum_m \sum_j B_{m,j} x^{2m} y^{2j} \quad (5)$$

where $C_x, C_y, K_x, K_y, B_{m,j}$ are constants to define the shape of lens;

m, j are integers satisfying conditions of $0 \leq m$, $0 \leq j$, and $1 \leq m+j$;

coefficients satisfy the following conditions:

$$|B_{m,j}| \leq 10^{-2(m+j)} \quad (6),$$

which cannot be simultaneously zero, or $$z = \frac{C_x x^2 + C_y y^2}{1 + \sqrt{1 - (1 + K_x) C_x^2 x^2 - (1 + K_y) C_y^2 y^2}} + \quad (7)$$

-continued $$\sum_n (D_n x^2 + E_n y^2) r^{n-2}$$

where $r^2 = x^2 + y^2$;

$C_x, C_y, K_x, K_y, D_n, E_n$ are constants to define the shape of lens;

n is an integer satisfying a condition of $2 \leq n$;

coefficients satisfy the following conditions:

$$|D_n| \leq 10^{-n} \quad (8),$$

$$|E_n| \leq 10^{-n} \quad (9),$$

which cannot be simultaneously zero which has such a positive refracting power that refracting powers $S1_x$ (D) and $S1_y$ (D) of the first surface and refracting powers $S2_x$ (D) and $S2_y$ (D) of the second surface are defined by Equations (10) to (13)

$$S1_x = \frac{1000 \times (N-1)}{R1_x}; \quad (10)$$

$$S1_y = \frac{1000 \times (N-1)}{R1_y}; \quad (11)$$

$$S2_x = \frac{1000 \times (N-1)}{R2_x}; \quad (12)$$

$$S2_y = \frac{1000 \times (N-1)}{R2_y}; \quad (13)$$

and that Equation (14)
in which max $$(S2_x, S2_y) \leq \min(S1_x, S1_y) \quad (14)$$

(where max (a, b) represents a larger one of a and b and min (a,b) is a smaller one of a and b); stands, and in which, defining $G_x$ and $G_y$ by Equations (15) to (17)

$$G_x = \Sigma A_{4,m,0}, G_y = \Sigma A_{4,0,j} \quad (15); \text{ or}$$

$$G_x = B_{2,0}, G_y = B_{0,2} \quad (16); \text{ or}$$

$$G_x = D_4, G_y = E_4 \quad (17),$$

the following conditions are satisfied:

$$K_x + 8R1_x^3 G_x \leq 1.0 \quad (18);$$

$$K_y + 8R1_y^3 G_y \leq 1.0 \quad (19)$$

depending upon the representation equation of the extended toric surface of the lens, the following conditions are satisfied:

$$-1.0 \leq K_x + 8R2_x^3 G_x \quad (20);$$

$$-1.0 \leq K_y + 8R2_y^3 G_y \quad (21).$$

8. An eyeglass lens in which a first surface is an extended toric surface of the shape as expressed by Equation (1), (5), or (7)

$$z = \frac{C_x x^2 + C_y y^2}{1 + \sqrt{1 - (1 + K_x) C_x^2 x^2 - (1 + K_y) C_y^2 y^2}} + \quad (1)$$

-continued $$\sum_n r^n \left\{ \sum_m \sum_j A_{n,m,j} \left(\frac{x^2}{r^2}\right)^m \left(\frac{y^2}{r^2}\right)^j \right\} \quad (5)$$

where $r^2 = x^2 + y^2$;

$C_x$, $C_y$, $K_x$, $K_y$, $A_{n,m,j}$ are constants to define the shade of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left| \sum_m A_{n,m,0} \right| \leq 10^{-n}, \quad (3)$$

$$\left| \sum_j A_{n,0,j} \right| \leq -10^{-n}, \quad (4)$$

which cannot be simultaneously zero, $$z = \frac{C_x x^2 + C_y y^2}{1 + \sqrt{1 - (1 + K_x)C_x^2 x^2 - (1 - K_y)C_y^2 y^2}} + \quad (5)$$

$$\sum_m \sum_j B_{m,j} x^{2m} y^{2j}$$

where $C_x$, $C_y$, $K_x$, $K_y$, $B_{m,j}$ are constants to define the shape of lens;

m, j are integers satisfying conditions of $0 \leq m$, $0 \leq j$, and $1 \leq m+j$;

coefficients satisfy the following conditions:

$$|B_{m,j}| \leq 10^{-2(m+j)} \quad (6),$$

which cannot be simultaneously zero, or $$z = \frac{C_x x^2 + C_y y^2}{1 + \sqrt{1 - (1 + K_x)C_x^2 x^2 - (1 + K_y)C_y^2 y^2}} + \quad (7)$$

$$\sum_n (D_n x^2 + E_n y^2) r^{n-2}$$

where $r^2 = x^2 + y^2$;

$C_x$, $C_y$, $K_x$, $K_y$, $D_n$, $E_n$ are constants to define the shape of lens;

n is an integer satisfying a condition of $2 \leq n$;

coefficients satisfy the following conditions:

$$|D_n| \leq 10^{-n} \quad (8),$$

$$|E_n| \leq 10^{-n} \quad (9),$$

which cannot be simultaneously zero and a second surface is a spherical or toric surface, which has such a negative refracting power that refracting powers $S1_x$ (D) and $S1_y$ (D) of the first surface and refracting powers $S2_x$ (D) and $S2_y$ (D) of the second surface are defined by Equation (10) to (13)

$$S1_x = \frac{1000 \times (N-1)}{R1_x}; \quad (10)$$

-continued $$S1_y = \frac{1000 \times (N-1)}{R1_y}; \quad (11)$$

$$S2_x = \frac{1000 \times (N-1)}{R2_x}; \quad (12)$$

$$S2_y = \frac{1000 \times (N-1)}{R2_y}; \quad (13)$$

and that the following equation stands:

$$\max(S1_x, S1_y) \leq \min(S2_x, S2_y) \quad (22),$$

and in which, defining $G_x$ and $G_y$ by Equations (15) to (17)

$$G_x = \Sigma A_{4,m,0}, G_y = \Sigma A_{4,0,j} \quad (15);$$

$$G_x = B_{2,0}, G_y = B_{0,2} \quad (16); \text{ or}$$

$$G_x = D_4, G_y = E_4 \quad (17),$$

depending upon the representation equation of the extended toric surface of the lens, the following conditions are satisfied:

$$-1.0 \leq K_x + 8R1_x^3 G_x \quad (23);$$

$$-1.0 \leq K_y + 8R1_y^3 G_y \quad (24).$$

9. An eyeglass lens in which a first surface is a spherical or toric surface and a second surface is an extended toric surface of the shape as expressed by Equation (1), (5), or (7)

$$z = \frac{C_x x^2 + C_y y^2}{1 + \sqrt{1 - (1 + K_x)C_x^2 x^2 - (1 + K_y)C_y^2 y^2}} + \quad (1)$$

$$\sum_n r^n \left\{ \sum_m \sum_j A_{n,m,j} \left(\frac{x^2}{r^2}\right)^m \left(\frac{y^2}{r^2}\right)^j \right\}$$

where $r^2 = x^2 + y^2$;

$C_x$, $C_y$, $K_x$, $K_y$, $A_{n,m,j}$ are constants to define the shape of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left| \sum_m A_{n,m,0} \right| \leq 10^{-n}, \quad (3)$$

$$\left| \sum_j A_{n,0,j} \right| \leq -10^{-n}, \quad (4)$$

which cannot be simultaneously zero, $$z = \frac{C_x x^2 + C_y y^2}{1 + \sqrt{1 - (1 + K_x)C_x^2 x^2 - (1 - K_y)C_y^2 y^2}} + \quad (5)$$

$$\sum_m \sum_j B_{m,j} x^{2m} y^{2j}$$

where $C_x$, $C_y$, $K_x$, $K_y$, $B_{m,j}$ are constants to define the shape of lens;

m, j are integers satisfying conditions of $0 \leq m$, $0 \leq j$, and $1 \leq m+j$;

coefficients satisfy the following conditions:

$$|B_{m,j}| \leq 10^{-2(m+j)} \qquad (6),$$

which cannot be simultaneously zero, or $$z = \frac{C_x x^2 + C_y y^2}{1 + \sqrt{1 - (1+K_x)C_x^2 x^2 - (1+K_y)C_y^2 y^2}} + \qquad (7)$$

$$\sum_n (D_n x^2 + E_n y^2) r^{n-2}$$

where $r^2 = x^2 + y^2$;
$C_x$, $C_y$, $K_x$, $K_y$, $D_n$, $E_n$ are constants to define the shape of lens;
n is an integer satisfying a condition of $2 \leq n$;
coefficients satisfy the following conditions:

$$|D_n| \leq 10^{-n} \qquad (8),$$

$$|E_n| \leq 10^{-n} \qquad (9),$$

which cannot be simultaneously zero which has such a negative refracting power that refracting powers $S1_x(D)$ and $S1_y(D)$ of the first surface and refracting powers $S2_x(D)$ and $S2_y(D)$ of the second surface are defined by Equations (10) to (13)

$$S1_x = \frac{1000 \times (N-1)}{R1_x} ; \qquad (10)$$

$$S1_y = \frac{1000 \times (N-1)}{R1_y} ; \qquad (11)$$

$$S2_x = \frac{1000 \times (N-1)}{R2_x} ; \qquad (12)$$

$$S2_y = \frac{1000 \times (N-1)}{R2_y} ; \qquad (13)$$

and that Equation (22)

$$\max(S1_x, S1_y) \leq \min(S2_x, S2_y) \qquad (22)$$

stands, and in which, defining $G_x$ and $G_y$ by Equations (15) to (17)

$$G_x = \Sigma A_{4,m,0}, G_y = \Sigma A_{4,0,j} \qquad (15); \text{ or}$$

$$G_x = B_{2,0}, G_y = B_{0,2} \qquad (16); \text{ or}$$

$$G_x = D_4, G_y = E_4 \qquad (17),$$

depending upon the representation equation of the extended toric surface of the lens, the following conditions are satisfied:

$$K_x + 8R2_x^3 G_x \leq 1.0 \qquad (25);$$

$$K_y + 8R2_y^3 G_y \leq 1.0 \qquad (26).$$

10. An eyeglass lens having two refracting surfaces, one of which is an extended toric surface of the shape as expressed by Equation (1), (5), or (7)

$$z = \frac{C_x x^2 + C_y y^2}{1 + \sqrt{1 - (1+K_x)C_x^2 x^2 - (1+K_y)C_y^2 y^2}} + \qquad (1)$$

-continued $$\sum_n r^n \left\{ \sum_m \sum_j A_{n,m,j} \left( \frac{x^2}{r^2} \right)^m \left( \frac{y^2}{r^2} \right)^j \right\}$$

where $r^2 = x^2 + y^2$;
$C_x$, $C_y$, $K_x$, $K_y$, $A_{n,m,j}$ are constants to define the shape of lens;
n, m, j are integers satisfying conditions of $2 \leq n$, $0 \leq m$, $0 \leq j$, and $1 \leq m+j$;
coefficients satisfy the following conditions:

$$|A_{n,m,j}| \leq 2.0 \times 10^{-n}, \qquad (2)$$

$$\left| \sum_m A_{n,m,o} \right| \leq 10^{-n}, \qquad (3)$$

$$\left| \sum_j A_{n,o,j} \right| \leq -10^{-n}, \qquad (4)$$

which cannot be simultaneously zero, $$z = \frac{C_x x^2 + C_y y^2}{1 + \sqrt{1 - (1+K_x)C_x^2 x^2 - (1-K_y)C_y^2 y^2}} + \qquad (5)$$

$$\sum_m \sum_j B_{m,j} x^{2m} y^{2j}$$

where $C_x$, $C_y$, $K_x$, $K_y$, $B_{m,j}$ are constants to define the shape of lens;
m, j are integers satisfying conditions of $0 \leq m$, $0 \leq j$, and $1 \leq m+j$;
coefficients satisfy the following conditions:

$$|B_{m,j}| \leq 10^{-2(m+j)} \qquad (6),$$

which cannot be simultaneously zero, or $$z = \frac{C_x x^2 + C_y y^2}{1 + \sqrt{1 - (1+K_x)C_x^2 x^2 - (1+K_y)C_y^2 y^2}} + \qquad (7)$$

$$\sum_n (D_n x^2 + E_n y^2) r^{n-2}$$

where $r^2 = x^2 + y^2$;
$C_x$, $C_y$, $K_x$, $K_y$, $D_n$, $E_n$ are constants to define the shade of lens;
n is an integer satisfying a condition of $2 \leq n$;
coefficients satisfy the following conditions:

$$|D_n| \leq 10^{-n} \qquad (8),$$

$$|E_n| \leq 10^{-n} \qquad (9),$$

which cannot be simultaneously zero and the other of which is an axially symmetric aspherical surface, said extended toric surface having at the origin a radius of curvature $R_x$ in the X direction and a radius of curvature $R_y$ in the Y direction which satisfy the following conditions:

$$K_y + 8R_x^3 G_x \leq 2.0 \qquad (27); \text{ or}$$

$$K_y + 8R_y^3 G_y \leq 2.0 \qquad (28),$$

where $G_x$ and $G_y$ are defined by Equations (15) to (17)

$$G_x = \Sigma A_{4,m,0}, G_y = \Sigma A_{4,0,j} \quad (15); \text{ or}$$

$$G_x = B_{2,0}, G_y = B_{0,2} \quad (16); \text{ or}$$

$$G_x = D_4, G_y = E_4 \quad (17),$$

11. An eyeglass lens in which at least one of a first surface and a second, opposite-side surface of the lens is divided into a plurality of regions, each of the regions being constructed by an extended toric surface of the shape as expressed by $$z = \frac{C_x x^2 + C_y y^2}{1 + \sqrt{1 - (1+K_x)C_x^2 x^2 - (1+K_y)C_y^2 y^2}} + \sum_n r^n \left\{ \sum_m \sum_j A_{n,m,j} \left(\frac{x^2}{r^2}\right)^m \left(\frac{y^2}{r^2}\right)^j \right\} \quad (1)$$

where $r^2 = x^2 + y^2$;

$C_x$, $C_y$, $K_x$, $K_y$, $A_{n,m,j}$ are constants to define the shape of lens;

n, m, j are integers satisfying conditions of $2 \leq n$, $0 \leq m$, $0 \leq j$, and $1 \leq m+j$;

coefficients satisfy the following conditions:

$$|A_{n,m,j}| \leq 2.0 \times 10^{-n}, \quad (2)$$

$$\left| \sum_m A_{n,m,0} \right| \leq 10^{-n}, \quad (3)$$

$$\left| \sum_j A_{n,0,j} \right| \leq -10^{-n}, \quad (4)$$

which cannot be simultaneously zero, $$z = \frac{C_x x^2 + C_y y^2}{1 + \sqrt{1 - (1+K_x)C_x^2 x^2 - (1-K_y)C_y^2 y^2}} + \quad (5)$$

-continued $$\sum_m \sum_j B_{m,j} x^{2m} y^{2j}$$

where $C_x$, $C_y$, $K_x$, $K_y$, $B_{m,j}$ are constants to define the shape of lens;

m, j are integers satisfying conditions of $0 \leq m$, $0 \leq j$, and $1 \leq m+j$;

coefficients satisfy the following conditions:

$$|B_{m,j}| \leq 10^{-2(m+j)} \quad (6),$$

which cannot be simultaneously zero, or $$z = \frac{C_x x^2 + C_y y^2}{1 + \sqrt{1 - (1+K_x)C_x^2 x^2 - (1+K_y)C_y^2 y^2}} + \quad (7)$$

$$\sum_n (D_n x^2 + E_n y^2) r^{n-2}$$

where $r^2 = x^2 + y^2$;

$C_x$, $C_y$, $K_x$, $K_y$, $D_n$, $E_n$ are constants to define the shape of lens;

n is an integer satisfying a condition of $2 \leq n$;

coefficients satisfy the following conditions:

$$|D_n| \leq 10^{-n} \quad (8),$$

$$|E_n| \leq 10^{-n} \quad (9),$$

which cannot be simultaneously zero at least one of the coefficients in the equations (1), (5) and (7) having a different value in each of the regions so that each divided region has different aberration.

\* \* \* \* \*